US012621404B2

(12) United States Patent
Ishikawa

(10) Patent No.: US 12,621,404 B2
(45) Date of Patent: May 5, 2026

(54) INFORMATION PROCESSING DEVICE, VIDEO PROCESSING METHOD, AND PROGRAM

(71) Applicant: Sony Group Corporation, Tokyo (JP)

(72) Inventor: Tsuyoshi Ishikawa, Kanagawa (JP)

(73) Assignee: SONY GROUP CORPORATION, Tokyo (JP)

( * ) Notice: Subject to any disclaimer, the term of this patent is extended or adjusted under 35 U.S.C. 154(b) by 111 days.

(21) Appl. No.: 18/697,017

(22) PCT Filed: Oct. 19, 2022

(86) PCT No.: PCT/JP2022/038981
§ 371 (c)(1),
(2) Date: Mar. 29, 2024

(87) PCT Pub. No.: WO2023/090038
PCT Pub. Date: May 25, 2023

(65) Prior Publication Data
US 2024/0406338 A1 Dec. 5, 2024

(30) Foreign Application Priority Data

Nov. 17, 2021 (JP) ................................. 2021-186952

(51) Int. Cl.
| | |
|---|---|
| *H04N 5/222* | (2006.01) |
| *G06T 15/10* | (2011.01) |
| *G06T 19/00* | (2011.01) |
| *G06V 20/40* | (2022.01) |
| *G11B 27/036* | (2006.01) |

(52) U.S. Cl.
CPC ........... *H04N 5/2224* (2013.01); *G06T 15/10* (2013.01); *G06T 19/006* (2013.01); *G06V 20/40* (2022.01); *G11B 27/036* (2013.01)

(58) Field of Classification Search
None
See application file for complete search history.

(56) References Cited

U.S. PATENT DOCUMENTS

| | | | | |
|---|---|---|---|---|
| 2010/0053164 | A1* | 3/2010 | Imai ........................ | G06F 3/147 |
| | | | | 345/1.3 |
| 2012/0081529 | A1 | 4/2012 | Seo | |
| 2013/0222647 | A1 | 8/2013 | Ishihara | |
| 2015/0348326 | A1 | 12/2015 | Sanders | |
| 2020/0143592 | A1 | 5/2020 | Cordes | |
| 2020/0145644 | A1 | 5/2020 | Cordes et al. | |
| 2021/0266613 | A1* | 8/2021 | da Silva Pratas Gabriel | .............. |
| | | | | H04N 21/23412 |

(Continued)

FOREIGN PATENT DOCUMENTS

| | | |
|---|---|---|
| JP | 2019-082680 A | 5/2019 |
| WO | WO-2020198823 A1 | 10/2020 |

*Primary Examiner* — Frank S Chen
(74) *Attorney, Agent, or Firm* — Paratus Law Group, PLLC

(57) ABSTRACT

It is assumed that a terminal device captures an image of an object and a video displayed on a display device in a state in which the display device and the terminal device having an imaging function are associated with each other. In this case, an information processing device includes a video processing unit configured to render a 3D model on the basis of relative position information between the display device and the terminal device to generate a video to be displayed on the display device.

20 Claims, 34 Drawing Sheets

(56) References Cited

U.S. PATENT DOCUMENTS

2021/0342971 A1    11/2021  Watkins et al.
2021/0392292 A1*  12/2021  Benman ................. H04N 7/157

* cited by examiner

*FIG. 4*

ST1 Asset Creation

ST2 Production

ST3 Post-Production

FIG. 8

FIRST EMBODIMENT

SECOND EMBODIMENT

THIRD EMBODIMENT

FOURTH EMBODIMENT

FIFTH EMBODIMENT

SIXTH EMBODIMENT

*FIG. 19*

FIRST EMBODIMENT

SECOND EMBODIMENT

*FIG. 22*

SECOND EMBODIMENT

INFORMATION PROCESSING DEVICE, VIDEO PROCESSING METHOD, AND PROGRAM

CROSS REFERENCE TO PRIOR APPLICATION

This application is a National Stage Patent Application of PCT International Patent Application No. PCT/JP2022/038981 (filed on Oct. 19, 2022) under 35 U.S.C. § 371, which claims priority to Japanese Patent Application No. 2021-186952 (filed on Nov. 17, 2021), which are all hereby incorporated by reference in their entirety.

TECHNICAL FIELD

The present technology relates to a video processing technology implemented as an information processing device, a video processing method, and a program.

BACKGROUND ART

As an imaging method for producing video content such as a movie, a technology is known in which a performer performs acting with a so-called green screen and then a background video is synthesized.

Furthermore, in recent years, instead of green screen imaging, an imaging system has been developed in which a background video is displayed on a display device and a performer performs acting in front of the background video in a studio provided with a large display device to thereby enable imaging of the performer and the background, and this imaging system is known as a so-called virtual production, in-camera VFX, or LED wall virtual production.

Patent Document 1 below discloses a technology of a system that images a performer performing acting in front of the background video.

CITATION LIST

Patent Document

Patent Document 1: US Patent Application Publication No. 2020/0145644 A

SUMMARY OF THE INVENTION

Problems to be Solved by the Invention

The background video is displayed on a large display device, and then the performer and the background video are captured with a camera, so that there is no need to prepare a background video to be separately synthesized, and the performer and staffs can visually understand the scene and determine the acting and whether the acting is good or bad, or the like, which are more advantageous than green screen imaging.

However, such an imaging system needs to use a dedicated studio set, and it is difficult for a general user to easily use a virtual production technology. For example, performing virtual production only with a device at home has not been realized.

Therefore, the present disclosure proposes a technology that enables easier execution of virtual production.

Solutions to Problems

An information processing device according to the present technology includes a video processing unit configured to render a 3D model on the basis of relative position information between a display device and a terminal device to generate a video to be displayed on the display device in a case where the terminal device captures an image of an object and the video displayed on the display device in a state in which the display device and the terminal device having an imaging function are associated with each other.

"Association" between the display device and the terminal device means that the display device and the terminal device are paired at least as a target of relative position detection. The information processing device performs at least processing of rendering the 3D model on the basis of the relative position information between the display device and the terminal device.

The information processing device of the present disclosure can be considered as a processor provided in the terminal device or the terminal device itself including such a processor. Alternatively, the information processing device of the present disclosure can be considered as a processor provided in the display device or the display device itself including such a processor. Moreover, the information processing device of the present disclosure can be considered as a processor provided in a device separate from the display device and the terminal device (for example, a cloud server or the like), or a device itself including such a processor.

BRIEF DESCRIPTION OF DRAWINGS

FIG. 4 is an explanatory diagram illustrating a video content production step.

FIG. 8 is a block diagram illustrating an information processing device according to an embodiment.

FIG. 19 is a block diagram illustrating a functional configuration according to the first embodiment.

FIG. 22 is a flowchart illustrating a processing example according to the second embodiment.

MODE FOR CARRYING OUT THE INVENTION

Hereinafter, embodiments will be described in the following order.
<1. Imaging system and video content production>
<2. Configuration of information processing device>
<3. Virtual production according to embodiment>
<4. First embodiment: Example by terminal device and display device>
<5. Second embodiment: Example by terminal device and display device>
<6. Third embodiment: Example of using cloud server>
<7. Fourth embodiment: Example of using cloud server>
<8. Fifth embodiment: Example of using cloud server>
<9. Sixth embodiment: Example of using cloud server>
<10. Seventh embodiment: Application of virtual video addition technology>
<11. Summary and modification example>
Note that, in the present disclosure, "video" or "image" includes both a still image and a moving image. Furthermore, "video" indicates not only video data displayed on a display, but also video data not displayed on the display.

Hereinafter, virtual production in the present disclosure will be described. First, an example of using a relatively large studio set will be described. As the embodiment to be described later, the technology is an example in which imaging for virtual production realized in a studio set to be described below is easily realized at home or the like.

1. Imaging System and Video Content Production

First, as virtual production, an imaging system using a studio set and video content production will be described.

Figure 1:
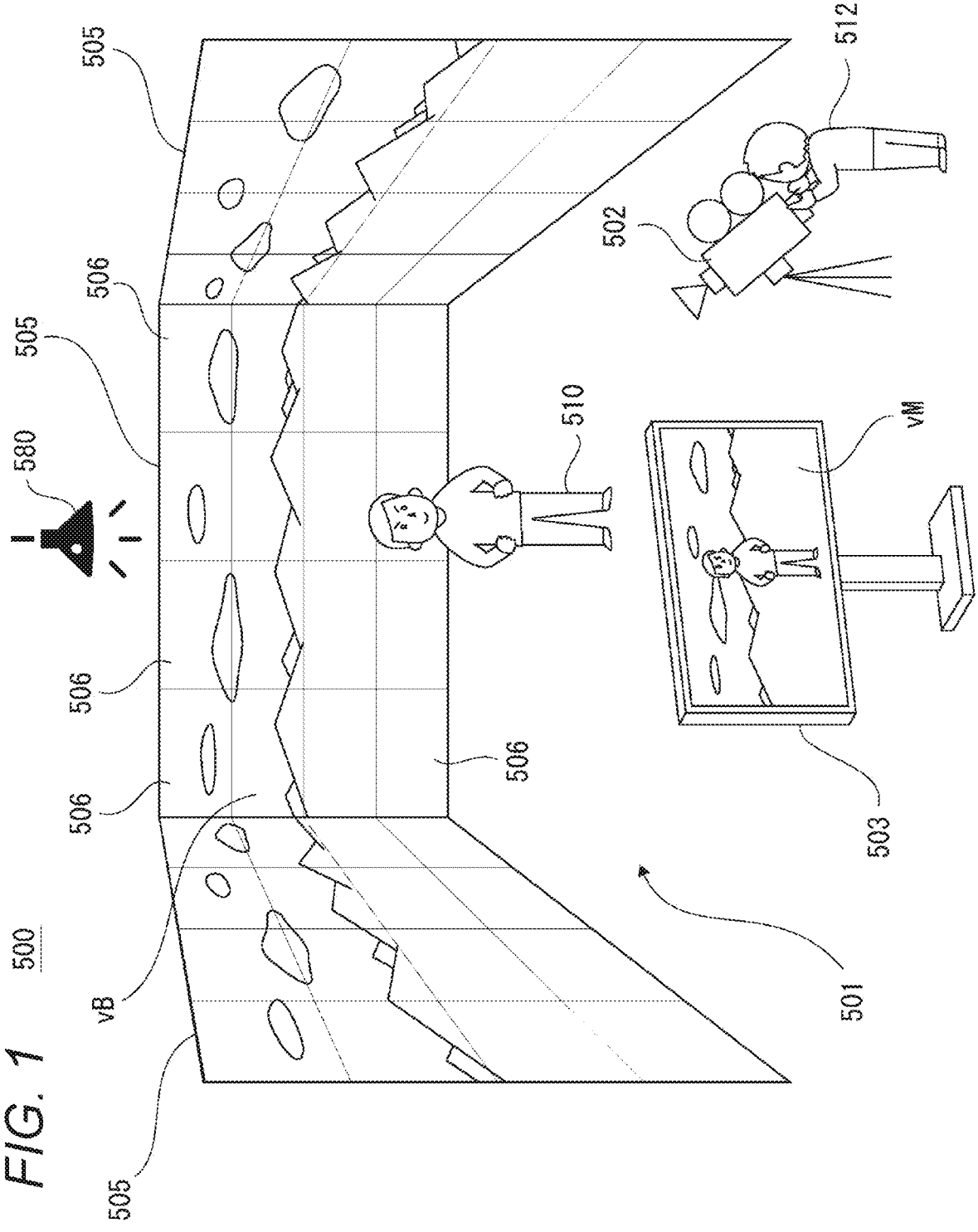
FIG. 1 is an explanatory diagram illustrating an imaging system for virtual production.

FIG. 1 schematically illustrates an imaging system 500. The imaging system 500 is a system that performs imaging for virtual production, and a part of equipment disposed in an imaging studio is illustrated in the drawing.

In the imaging studio, a performance area 501 in which a performer 510 performs performance such as acting is provided. A large display device is disposed on at least a back surface, left and right side surfaces, and an upper surface of the performance area 501. Although the device type of the display device is not limited, the drawing illustrates an example in which an LED wall 505 is used as an example of the large display device.

One LED wall 505 forms a large panel by vertically and horizontally connecting and disposing a plurality of LED panels 506. The size of the LED wall 505 is not particularly limited, but is only necessary to be a size that is necessary or sufficient as a size for displaying the background when the performer 510 is imaged.

A necessary number of lights 580 are disposed at a necessary position such as above or on the side of the performance area 501 to light the performance area 501.

In the vicinity of the performance area 501, for example, a camera 502 for capturing video content such as a movie is disposed. A camera operator 512 can move the position of the camera 502, and can perform an operation for an imaging direction, an angle of view, or the like. Of course, it is also conceivable that the movement, the angle-of-view operation, or the like of the camera 502 is performed by a remote operation. Furthermore, the camera 502 may automatically or autonomously move or change the angle of view. For this reason, the camera 502 may be mounted on a camera platform or a mobile body.

The camera 502 collectively captures the performer 510 in the performance area 501 and the video displayed on the LED wall 505. For example, by displaying a scene as a background video vB on the LED wall 505, it is possible to capture a video similar to that in a case where the performer 510 actually exists and performs acting at the place of the scene.

An output monitor 503 is disposed near the performance area 501. The video captured by the camera 502 is displayed on the output monitor 503 in real time as a monitor video vM. Thus, a director and a staff who produce video content can confirm the captured video.

As described above, the imaging system 500 that images the performance of the performer 510 in the background of the LED wall 505 in the imaging studio has various advantages as compared with the green screen imaging.

For example, in a case of the green screen imaging, it is difficult for the performer to imagine the background and the situation of the scene, which may affect the acting. On the other hand, by displaying the background video vB, the performer 510 can easily perform the acting, and the quality of acting is improved. Furthermore, it is easy for the director and other staffs to determine whether or not the acting of the performer 510 matches the background or the situation of the scene.

Furthermore, post-production after imaging is more efficient than that in the case of the green screen imaging. This is because so-called chroma key synthesis may be unnecessary or color correction or reflection synthesis may be unnecessary. Furthermore, even in a case where the chroma key synthesis is required at the time of imaging, the background screen does not need to be added, which is also helpful to improve efficiency.

In the case of the green screen imaging, the color of green increases on the performer's body, dress, and objects, and thus correction thereof is necessary. Furthermore, in the case of the green screen imaging, in a case where there is an object in which a surrounding scene is reflected, such as glass, a mirror, or a snowdome, it is necessary to generate and synthesize an image of the reflection, but this is troublesome work.

On the other hand, in a case of imaging by the imaging system 500 in FIG. 1, the hue of green does not increase, and thus the correction is unnecessary. Furthermore, by displaying the background video vB, the reflection on the actual article such as glass is naturally obtained and captured, and thus, it is also unnecessary to synthesize the reflection video.

Here, the background video vB will be described with reference to FIGS. 2 and 3. Even when the background video vB is displayed on the LED wall 505 and captured together with the performer 510, the background of the captured video becomes unnatural only by simply displaying the background video vB. This is because a background that is three-dimensional and has depth is actually used as the background video vB in a planar manner.

For example, the camera 502 can capture the performer 510 in the performance area 501 from various directions, and can also perform a zoom operation. The performer 510 also does not stop at one place. Then, the actual appearance of the performer 510 in the background is to change according to the position, the imaging direction, the angle of view, and the like of the camera 502, but such a change cannot be obtained in the background video vB as the planar video. Accordingly, the background video vB is changed so that the background is similar to the actual appearance including a parallax.

Figure 2:
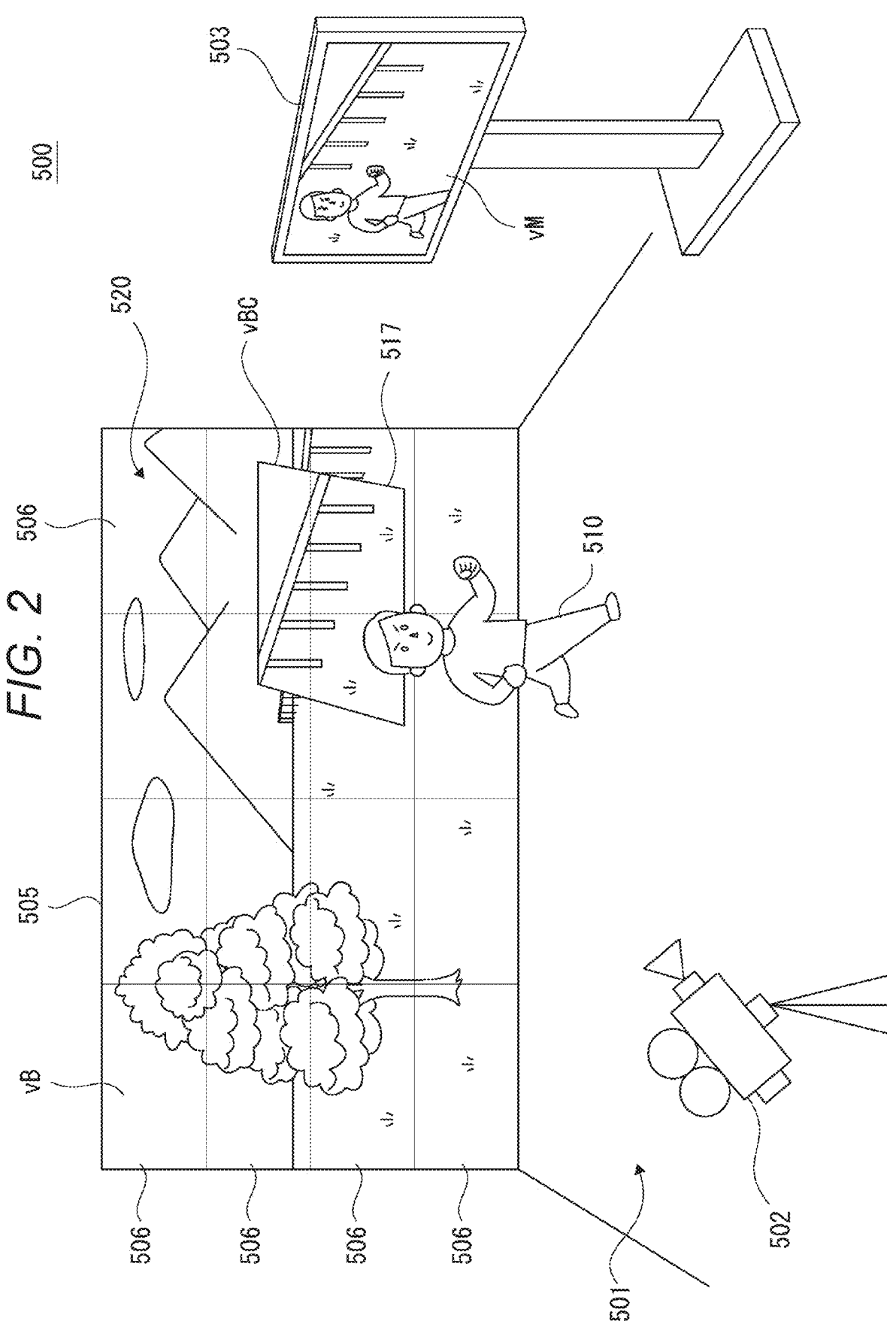
FIG. 2 is an explanatory diagram illustrating a background video according to a camera position in virtual production.
Figure 3:
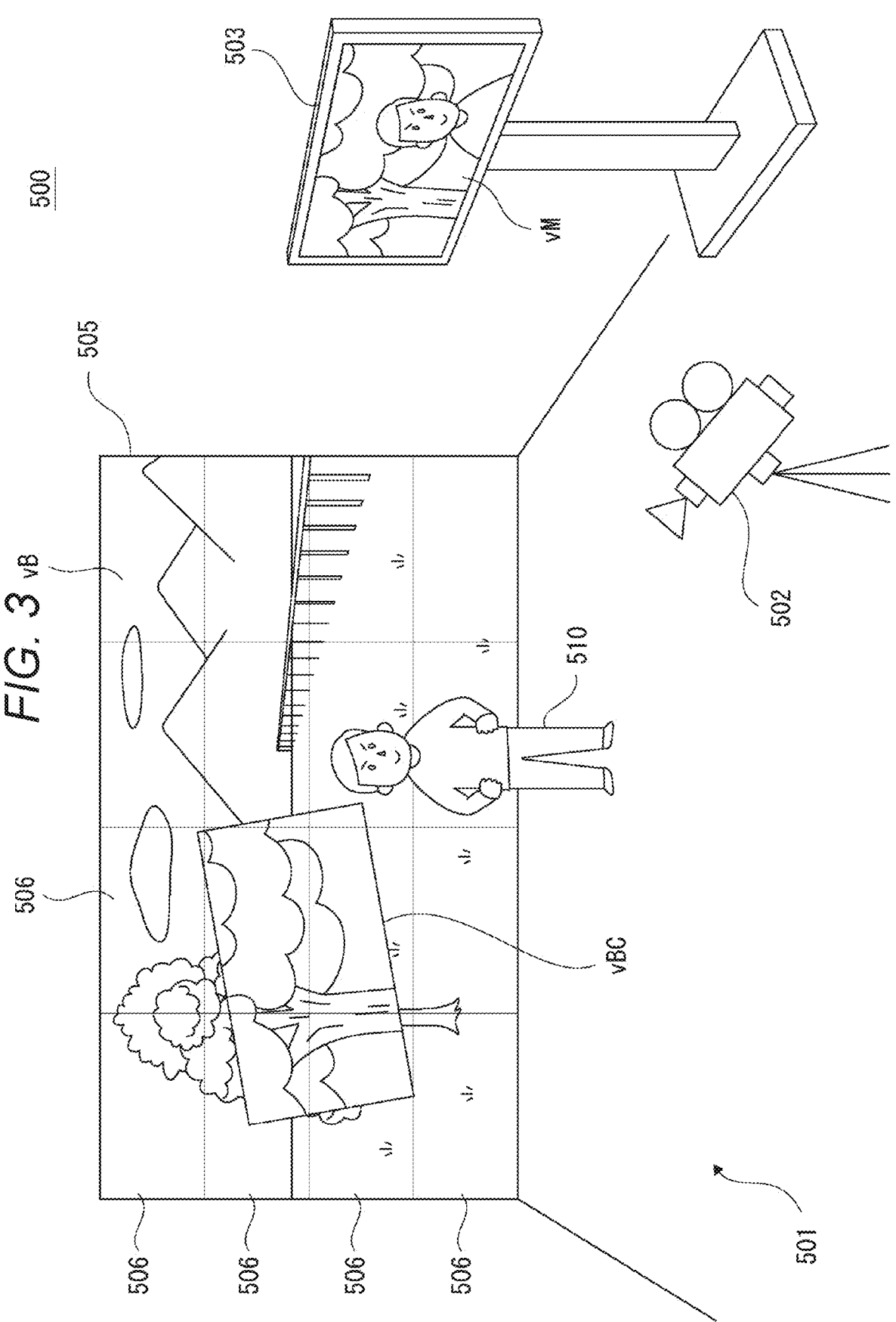
FIG. 3 is an explanatory diagram illustrating a background video according to a camera position in virtual production.

FIG. 2 illustrates a state in which the camera 502 is imaging the performer 510 from a position on the left side of the drawing, and FIG. 3 illustrates a state in which the camera 502 is imaging the performer 510 from a position on the right side of the drawing. In each drawing, a capturing region video vBC is illustrated in the background video vB.

Note that a portion of the background video vB excluding the capturing region video vBC is referred to as an "outer frustum", and the capturing region video vBC is referred to as an "inner frustum".

The background video vB described here indicates the entire video displayed as the background including the capturing region video vBC (inner frustum).

The range of the capturing region video vBC (inner frustum) corresponds to a range actually imaged by the camera 502 in the display surface of the LED wall 505. Then, the capturing region video vBC is a video that is transformed so as to express a scene that is actually viewed when the position of the camera 502 is set as a viewpoint according to the position, the imaging direction, the angle of view, and the like of the camera 502.

Specifically, 3D background data that is a three-dimensional (3D) model as a background is prepared, and the capturing region video vBC is sequentially rendered on the basis of the viewpoint position of the camera 502 with respect to the 3D background data in real time.

Note that the range of the capturing region video vBC is actually a range slightly wider than the range imaged by the camera 502 at that time. This is to prevent the video of the outer frustum from being reflected due to a draw delay and to avoid the influence of the diffracted light from the video of the outer frustum when the range of imaging is slightly changed by panning, tilting, zooming, or the like of the camera 502.

The video of the capturing region video vBC rendered in real time in this manner is synthesized with the video of the outer frustum. The video of the outer frustum used in the background video vB is rendered in advance on the basis of the 3D background data, and the video is incorporated as the capturing region video vBC rendered in real time into a part of the video of the outer frustum to generate the entire background video vB.

Thus, even when the camera 502 is moved back and forth, or left and right, or a zoom operation is performed, the background of the range imaged together with the performer 510 is imaged as a video corresponding to the viewpoint position change accompanying the actual movement of the camera 502.

As illustrated in FIGS. 2 and 3, the monitor video vM including the performer 510 and the background is displayed on the output monitor 503, and this is the captured video. The background of the monitor video vM is the capturing region video vBC. That is, the background included in the captured video is a real-time rendered video.

As described above, in the imaging system 500 of the embodiment, the background video vB including the capturing region video vBC is changed in real time so that not only the background video vB is simply displayed in a planar manner but also a video similar to that in a case of actually imaging on location can be captured.

Note that the processing load of the system is also reduced by rendering only the capturing region video vBC as a range reflected by the camera 502 in real time instead of the entire background video vB displayed on the LED wall 505.

Figure 4:
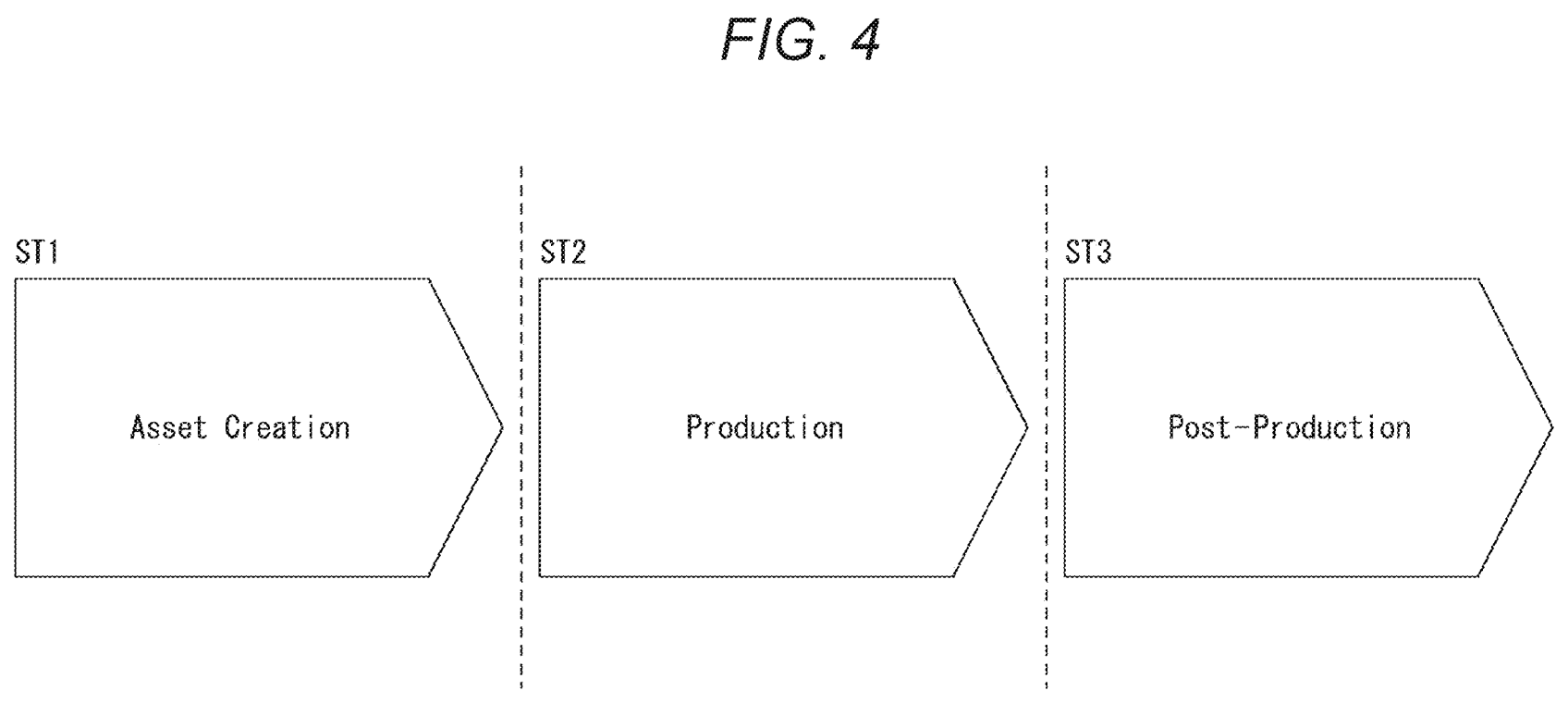

Here, a production step of video content as virtual production in which imaging is performed by the imaging system 500 will be described. As illustrated in FIG. 4, the video content production step is roughly divided into three stages. The stages are asset creation ST1, production ST2, and post-production ST3.

The asset creation ST1 is a step of producing 3D background data for displaying the background video vB. As described above, the background video vB is generated by performing rendering in real time using the 3D background data at the time of imaging. For this purpose, 3D background data as a 3D model is produced in advance.

Examples of a method of producing the 3D background data include full computer graphics (CG), point cloud data scanning, and photogrammetry.

The full CG is a method of producing a 3D model with computer graphics. Among the three methods, the method requires the most man-hours and time, but is preferably used in a case where an unrealistic video, a video that is difficult to capture in practice, or the like is desired to be the background video vB.

The point cloud data scanning is a method of generating a 3D model based on the point cloud data by performing distance measurement from a certain position using, for example, LiDAR, capturing an image of 360 degrees from the same position with a camera, and placing color data captured by the camera on a point measured by LiDAR. As compared with the full CG, the 3D model can be produced in a short time. Furthermore, it is easy to produce a 3D model with higher definition than that of photogrammetry.

The photogrammetry is a photogrammetry technology for analyzing parallax information from two-dimensional images obtained by imaging an object from a plurality of viewpoints to obtain dimensions and shapes. 3D model production can be performed in a short time.

Note that point cloud information acquired by LIDAR may be used in the 3D data generation by the photogrammetry.

In the asset creation ST1, for example, a 3D model to be 3D background data is produced by using these methods. Of course, the above-described methods may be used in combination. For example, a part of the 3D model produced by the point cloud data scanning or photogrammetry is produced by CG and synthesized.

The production ST2 is a step of performing imaging in the imaging studio as illustrated in FIG. 1. Element technologies in this case include real-time rendering, background display, camera tracking, lighting control, and the like.

The real-time rendering is rendering processing for obtaining the capturing region video vBC at each time point (each frame of the background video vB) as described with reference to FIGS. 2 and 3. This is to render the 3D background data produced in the asset creation ST1 from a viewpoint corresponding to the position of the camera 502 or the like at each time point.

In this way, the real-time rendering is performed to generate the background video vB of each frame including the capturing region video vBC, and the background video vB is displayed on the LED wall 505.

The camera tracking is performed to obtain imaging information with the camera 502, and tracks position information, an imaging direction, an angle of view, and the like of the camera 502 at each time point. By providing the imaging information including these to a rendering engine in association with each frame, real-time rendering according to the viewpoint position or the like of the camera 502 can be executed.

The imaging information is information linked with or associated with a video as metadata.

It is assumed that the imaging information includes position information of the camera 502 at each frame timing, a direction of the camera, an angle of view, a focal length, a F-number (aperture value), a shutter speed, and lens information.

The lighting control is to control the state of lighting in the imaging system 500, and specifically, to control the light amount, emission color, lighting direction, and the like of a light 580. For example, the lighting control is performed according to time setting of a scene to be imaged, setting of a place, and the like.

The post-production ST3 indicates various processing performed after imaging. For example, video correction, video adjustment, clip editing, video effect, and the like are performed.

As the video correction, color gamut conversion, color matching between cameras and materials, and the like may be performed.

As the video adjustment, color adjustment, luminance adjustment, contrast adjustment, and the like may be performed.

Cutting of clips, adjustment of order, adjustment of a time length, and the like may be performed as the clip editing.

As the video effect, the synthesis of a CG video or a special effect video or the like may be performed.

Next, a configuration of the imaging system 500 used in the production ST2 will be described.

Figure 5:
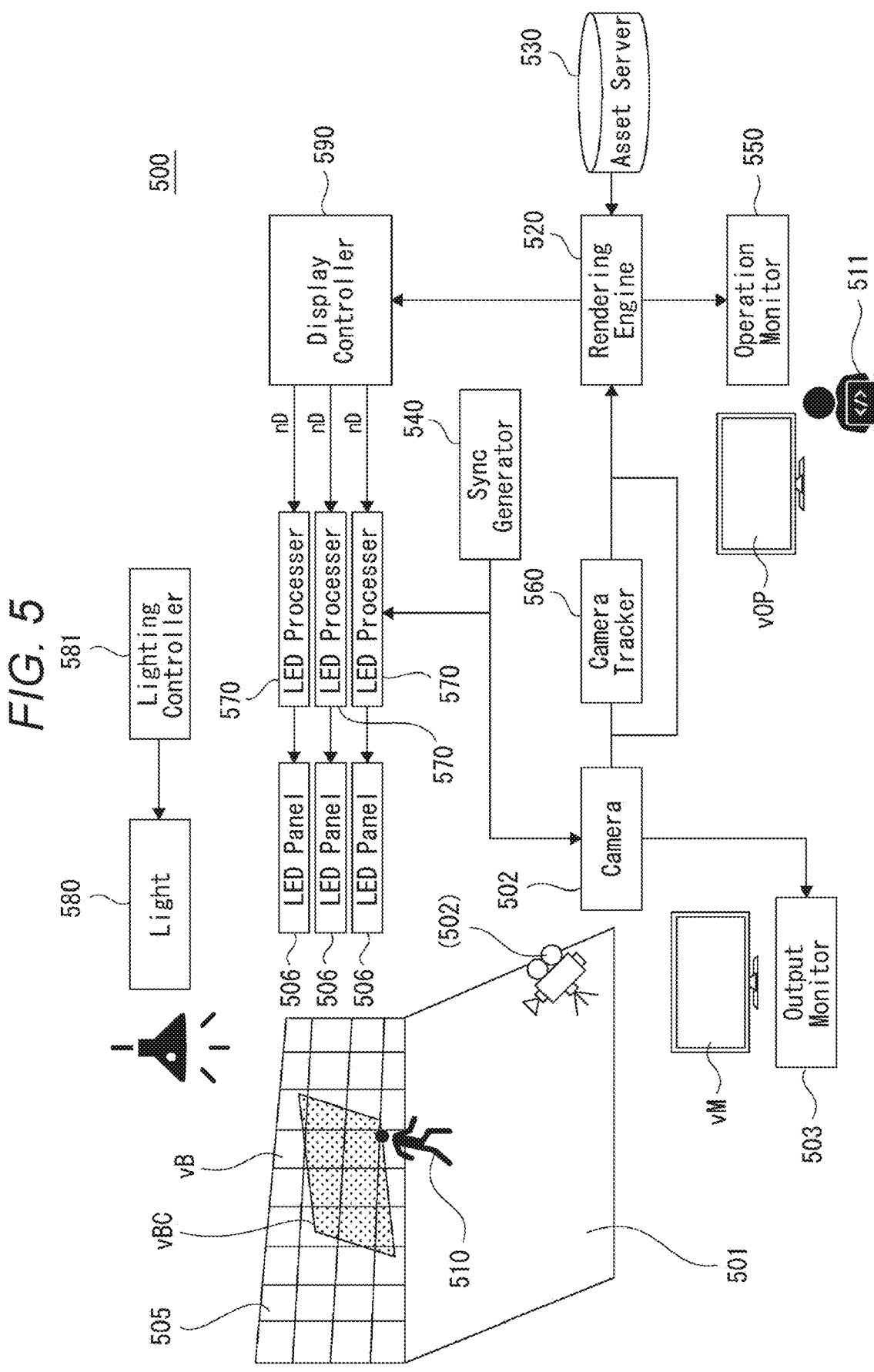
FIG. 5 is a block diagram illustrating an imaging system for virtual production.

FIG. 5 is a block diagram illustrating a configuration of the imaging system 500 whose outline has been described with reference to FIGS. 1, 2, and 3.

The imaging system 500 illustrated in FIG. 5 includes the above-described LED wall 505 including a plurality of the LED panels 506, the camera 502, the output monitor 503, and the light 580. As illustrated in FIG. 5, the imaging system 500 further includes a rendering engine 520, an asset server 530, a sync generator 540, an operation monitor 550, a camera tracker 560, LED processors 570, a lighting controller 581, and a display controller 590.

The LED processors 570 are provided respectively corresponding to the LED panels 506, and perform video display driving of the corresponding LED panels 506.

The sync generator 540 generates a synchronization signal for synchronizing a frame timing of a display video of each of the LED panels 506 and a frame timing of imaging by the camera 502, and supplies the synchronization signal to the respective LED processors 570 and the camera 502. However, this does not prevent output from the sync generator 540 from being supplied to the rendering engine 520.

The camera tracker 560 generates imaging information from the camera 502 at each frame timing and supplies the imaging information to the rendering engine 520. For example, the camera tracker 560 detects the position information of the camera 502 relative to the position of the LED wall 505 or a predetermined reference position and the imaging direction of the camera 502 as one of the imaging information, and supplies these information to the rendering engine 520.

As a specific detection method by the camera tracker 560, there is a method of randomly disposing a reflector on the ceiling and detecting a position from reflected light of infrared light emitted from the camera 502 side to the reflector. Furthermore, as the detection method, there is also a method of estimating a self-position of the camera 502 with information of a gyro mounted on a platform of the camera 502 or a body of the camera 502, or by image recognition of the captured video of the camera 502.

Furthermore, the angle of view, the focal length, the F-number, the shutter speed, the lens information, and the like may be supplied from the camera 502 to the rendering engine 520 as the imaging information.

The asset server 530 is a server that can store the 3D model produced in the asset creation ST1, that is, 3D background data on a recording medium and read the 3D model as necessary. That is, the asset server 530 functions as a database (DB) of 3D background data.

The rendering engine 520 performs processing of generating the background video vB to be displayed on the LED wall 505. For this reason, the rendering engine 520 reads necessary 3D background data from the asset server 530. Then, the rendering engine 520 generates a video of the outer frustum used in the background video vB as a video obtained by rendering the 3D background data in a form of being viewed from spatial coordinates specified in advance.

Furthermore, as processing for each frame, the rendering engine 520 specifies the viewpoint position and the like with respect to the 3D background data by using the imaging information supplied from the camera tracker 560 or the camera 502, and renders the capturing region video vBC (inner frustum).

Moreover, the rendering engine 520 synthesizes the capturing region video vBC rendered for each frame with the outer frustum generated in advance to generate the background video vB as the video data of one frame. Then, the rendering engine 520 transmits the generated video data of one frame to the display controller 590.

The display controller 590 generates divided video signals nD obtained by dividing the video data of one frame into video portions to be displayed on the respective LED panels 506, and transmits the divided video signals nD to the respective LED panels 506. At this time, the display controller 590 may perform calibration according to individual differences of color development, manufacturing errors, and the like between display units.

Note that the display controller 590 may not be provided, and the rendering engine 520 may perform these processing. That is, the rendering engine 520 may generate the divided video signals nD, perform calibration, and transmit the divided video signals nD to the respective LED panels 506.

The LED processors 570 drives the respective LED panels 506 on the basis of the divided video signals nD respectively received, and thus the entire background video vB is displayed on the LED wall 505. The background video vB includes the capturing region video vBC rendered according to the position of the camera 502 or the like at that time point.

The camera 502 can image the performance of the performer 510 including the background video vB displayed on the LED wall 505 in this manner. The video obtained by imaging with the camera 502 is recorded on a recording medium in the camera 502 or an external recording device (not illustrated), and is supplied to the output monitor 503 in real time and displayed as a monitor video vM.

The operation monitor 550 displays an operation image vOP for controlling the rendering engine 520. An engineer 511 can perform necessary settings and operations for rendering the background video vB while viewing the operation image vOP.

The lighting controller 581 controls emission intensity, emission color, irradiation direction, and the like of the light 580. For example, the lighting controller 581 may control the light 580 asynchronously with the rendering engine 520, or may perform control in synchronization with the imaging information and the rendering processing. Therefore, the lighting controller 581 may perform light emission control in accordance with an instruction from the rendering engine 520, a master controller (not illustrated), or the like.

Figure 6:
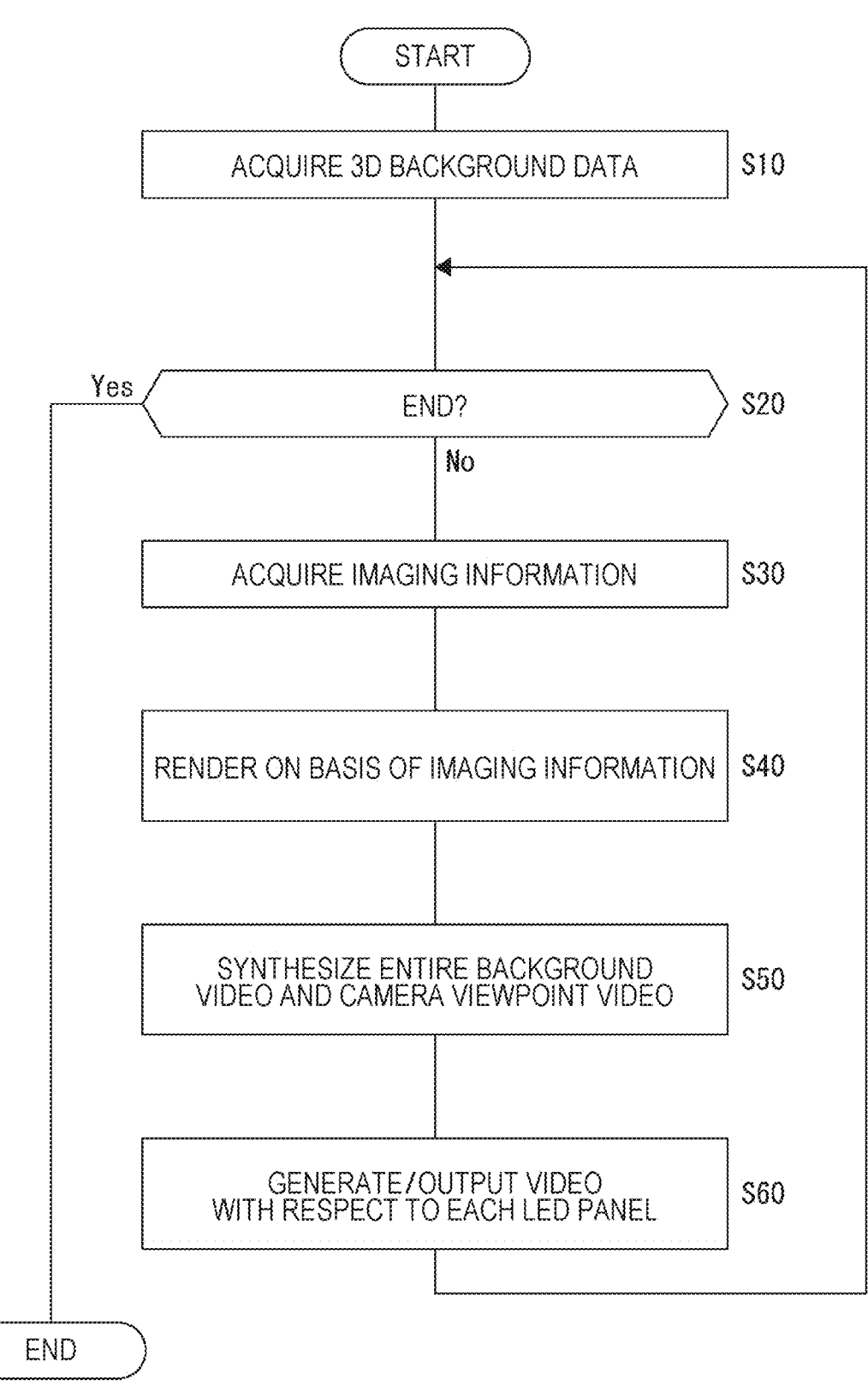
FIG. 6 is a flowchart illustrating background video generation of an imaging system.

FIG. 6 illustrates a processing example of the rendering engine 520 in the imaging system 500 having such a configuration.

In step S10, the rendering engine 520 reads the 3D background data to be used this time from the asset server 530, and deploys the 3D background data to an internal work area.

Then, a video used as the outer frustum is generated.

Thereafter, the rendering engine 520 repeats the processing from step S30 to step S60 at each frame timing of the background video vB until it is determined in step S20 that the display of the background video vB based on the read 3D background data is ended.

In step S30, the rendering engine 520 acquires the imaging information from the camera tracker 560 and the camera 502. Thus, the position and state of the camera 502 to be reflected in the current frame are confirmed.

In step S40, the rendering engine 520 performs rendering on the basis of the imaging information. That is, the viewpoint position with respect to the 3D background data is specified on the basis of the position, the imaging direction, the angle of view, and the like of the camera 502 to be reflected in the current frame, and rendering is performed. At this time, video processing reflecting the focal length, the F-number, the shutter speed, the lens information, and the like can also be performed. By this rendering, video data as the capturing region video vBC can be obtained.

In step S50, the rendering engine 520 performs processing of synthesizing the outer frustum as the entire background video, and the video reflecting the viewpoint position of the camera 502, that is, the capturing region video vBC. For example, the processing is to synthesize a video generated by reflecting the viewpoint of the camera 502 with a video of the entire background rendered at a specific reference viewpoint. Thus, the background video vB of one frame displayed on the LED wall 505, that is, the background video vB including the capturing region video vBC is generated.

The processing in step S60 is performed by the rendering engine 520 or the display controller 590. In step S60, the rendering engine 520 or the display controller 590 generates the divided video signals nD obtained by dividing the background video vB of one frame into videos to be displayed on the respective LED panels 506. The calibration may be performed. Then, the divided video signals nD are transmitted to the LED processors 570, respectively.

In the above-described processing, the background video vB including the capturing region video vBC captured by the camera 502 is displayed on the LED wall 505 at each frame timing.

Figure 7:
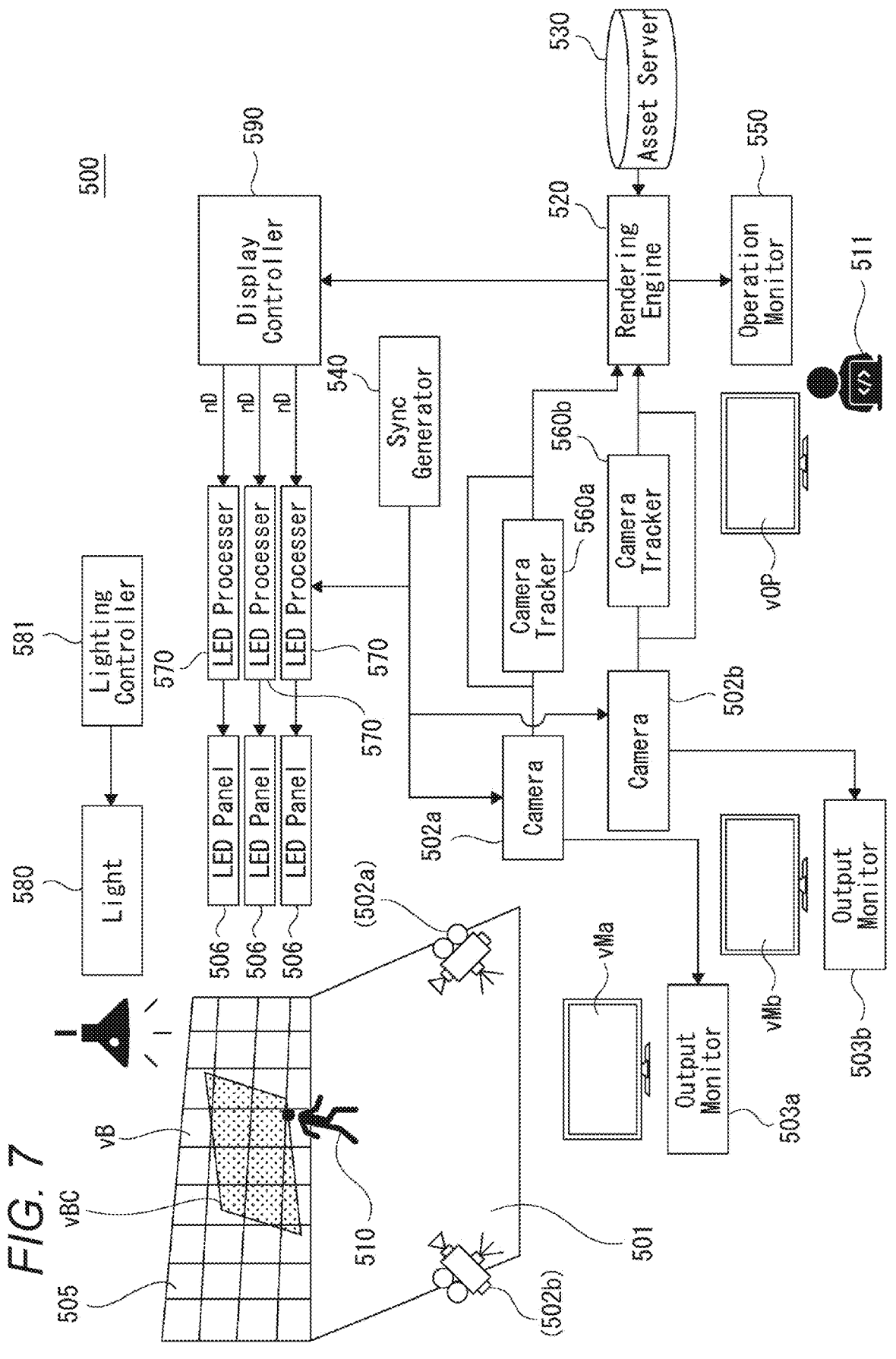
FIG. 7 is a block diagram illustrating an imaging system using a plurality of cameras for virtual production.

By the way, only one camera 502 is illustrated in FIG. 5, but imaging can be performed by a plurality of cameras 502. FIG. 7 illustrates a configuration example in a case where a plurality of cameras 502a and 502b is used. The cameras 502a and 502b can independently perform imaging in the performance area 501. Furthermore, synchronization between the cameras 502a and 502b and the LED processors 570 is maintained by the sync generator 540.

Output monitors 503a and 503b are provided corresponding to the cameras 502a and 502b, respectively, and are configured to display the videos captured by the corresponding cameras 502a and 502b as monitor videos vMa and vMb, respectively.

Furthermore, camera trackers 560a and 560b are provided corresponding to the cameras 502a and 502b, respectively, and detect the position and imaging direction of each of the corresponding cameras 502a and 502b. The imaging information from the camera 502a and the camera tracker 560a and the imaging information from the camera 502b and the camera tracker 560b are transmitted to the rendering engine 520.

The rendering engine 520 can perform rendering to obtain the background video vB of each frame by using the imaging information of either the camera 502a side or the camera 502b side.

Note that although FIG. 7 illustrates an example using two cameras 502a and 502b, it is also possible to perform imaging by using three or more cameras 502.

However, in a case where a plurality of the cameras 502 is used, there is a circumstance that the capturing region video vBC corresponding to each of the cameras 502 interferes. For example, in the example in which two cameras 502a and 502b are used as illustrated in FIG. 7, the capturing region video vBC corresponding to the camera 502a is illustrated, but in a case where the video of the camera 502b is used, the capturing region video vBC corresponding to the camera 502b is also necessary. When the capturing region video vBC corresponding to each of the cameras 502a and 502b is simply displayed, the capturing region videos vBC interfere with each other. Therefore, it is necessary to contrive the display of the capturing region video vBC.

2. Configuration of Information Processing Device

Next, a configuration example of an information processing device 70 that can be used in the asset creation ST1, the production ST2, and the post-production ST3, and the embodiments to be described later will be described with reference to FIG. 8.

The information processing device 70 is a device capable of performing information processing, particularly video processing, such as a computer device. Specifically, a personal computer (PC), a workstation, a portable terminal device such as a smartphone or a tablet, a video editing device, and the like are assumed as the information processing device 70. Furthermore, the information processing device 70 may be a computer device configured as a server device or an arithmetic device in cloud computing.

Specifically, the information processing device 70 can function as a 3D model production device that produces a 3D model in the asset creation ST1.

Furthermore, the information processing device 70 can function as the rendering engine 520 constituting the imaging system 500 used in the production ST2. Moreover, the information processing device 70 can also function as the asset server 530.

Furthermore, the information processing device 70 can also function as a video editing device that performs various types of video processing in the post-production ST3.

Furthermore, in the present embodiment, virtual production is implemented with a simple hardware configuration using a terminal device 1, a display device 2, a cloud server 4, and the like to be described later. The information processing device 70 in FIG. 8 can function as the terminal device 1, the display device 2, the cloud server 4, or the like of the present embodiment. In other words, FIG. 8 can also be referred to as a hardware configuration of the terminal device 1, the display device 2, and the cloud server 4.

Figure 8:
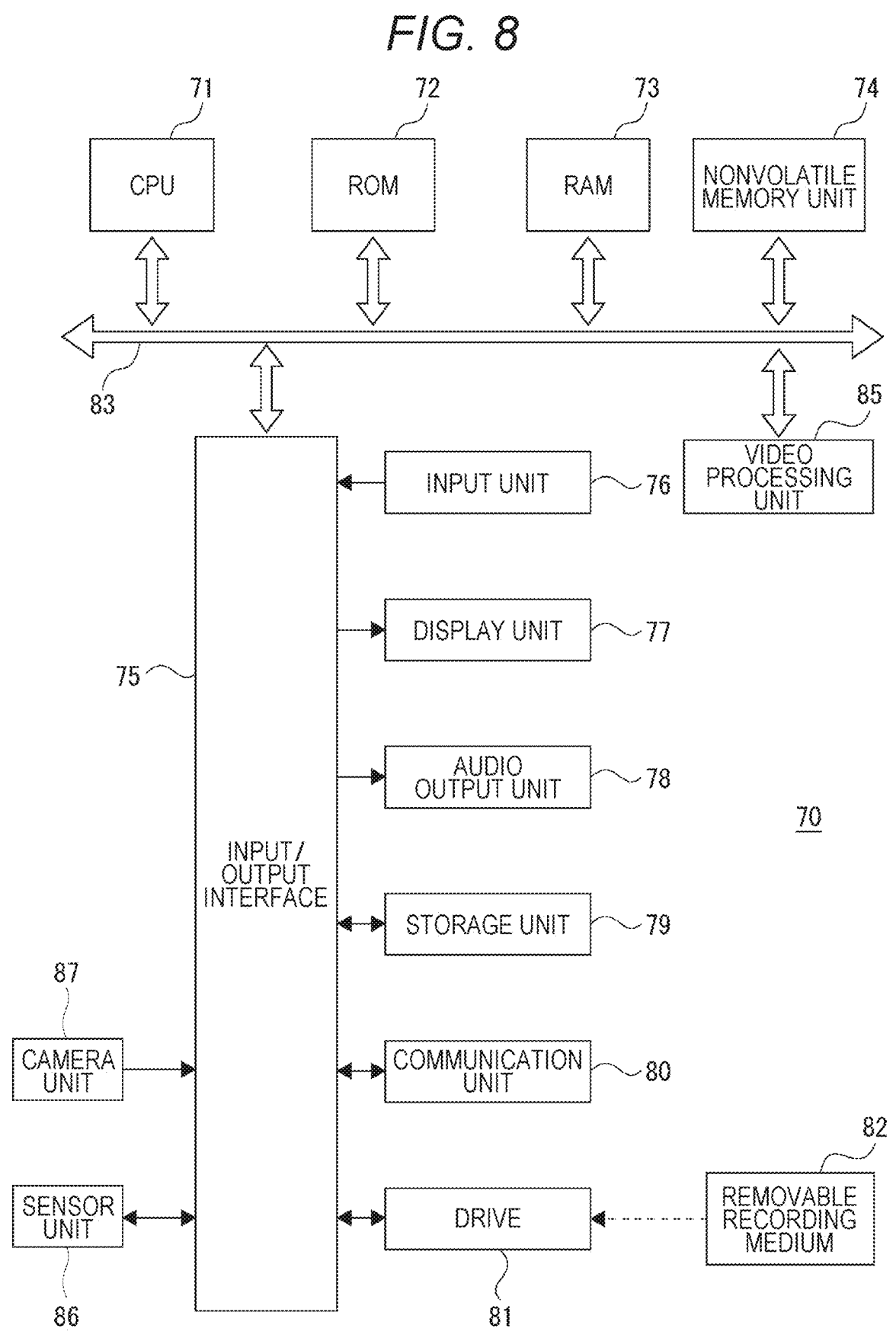

A CPU 71 of the information processing device 70 illustrated in FIG. 8 executes various kinds of processing in accordance with a program stored in a nonvolatile memory unit 74 such as a ROM 72 or, for example, an electrically erasable programmable read-only memory (EEP-ROM), or a program loaded from a storage unit 79 to a RAM 73. The RAM 73 also appropriately stores data and the like necessary for the CPU 71 to execute the various types of processing.

A video processing unit 85 is configured as a processor that performs various types of video processing. For example, the processor can perform any processing related to a video or a plurality of types of processing, such as 3D model generation processing, rendering, DB processing, video editing processing, and image recognition processing by image analysis.

The video processing unit 85 can be implemented by, for example, a CPU, a graphics processing unit (GPU), general-purpose computing on graphics processing units (GPGPU), an artificial intelligence (AI) processor, or the like that is separate from the CPU 71.

Note that the video processing unit 85 may be provided as a function in the CPU 71.

The CPU 71, the ROM 72, the RAM 73, the nonvolatile memory unit 74, and the video processing unit 85 are connected to one another via a bus 83. An input/output interface 75 is also connected to the bus 83.

An input unit 76 configured with an operation element and an operation device is connected to the input/output interface 75. For example, as the input unit 76, various types of operation elements and operation devices such as a keyboard, a mouse, a key, a dial, a touch panel, a touch pad, a remote controller, and the like are assumed.

A user operation is detected by the input unit 76, and a signal corresponding to an input operation is interpreted by the CPU 71.

A microphone is also assumed as the input unit 76. A voice uttered by the user can also be input as the operation information.

Furthermore, a display unit 77 including a liquid crystal display (LCD) or an organic electro-luminescence (EL) panel, and an audio output unit 78 including a speaker are integrally or separately connected to the input/output interface 75.

The display unit 77 is a display unit that performs various types of display, and includes, for example, a display device provided in a housing of the information processing device 70, and a separate display device connected to the information processing device 70.

The display unit 77 displays various images, operation menus, icons, messages, and the like, that is, performs display as a graphical user interface (GUI), on the display screen on the basis of the instruction from the CPU 71.

In some cases, the storage unit 79 including a hard disk drive (HDD) and a solid-state memory or a communication unit 80 is connected to the input/output interface 75.

The storage unit 79 can store various pieces of data and programs. A DB can also be configured in the storage unit 79.

For example, in a case where the information processing device 70 functions as the asset server 530, the DB that stores a 3D background data group can be constructed by using the storage unit 79.

The communication unit 80 performs communication processing via a transmission path such as the Internet, wired/wireless communication with various devices such as an external DB, an editing device, and an information processing device, bus communication, and the like.

For example, in a case where the information processing device 70 functions as the rendering engine 520, the communication unit 80 can access the DB as the asset server 530, and receive imaging information from the camera 502 or the camera tracker 560.

Furthermore, also in a case of the information processing device 70 used in the post-production ST3, the communication unit 80 can access the DB as the asset server 530.

A drive 81 is also connected to the input/output interface 75 as necessary, and a removable recording medium 82 such as a magnetic disk, an optical disk, a magneto-optical disk, and a semiconductor memory is appropriately mounted.

The drive 81 can read video data, various computer programs, and the like from the removable recording medium 82. The read data is stored in the storage unit 79, and video and audio included in the data are output by the display unit 77 and the audio output unit 78. Furthermore, the computer program and the like read from the removable recording medium 82 are installed in the storage unit 79, as necessary.

The information processing device 70 may include various sensors as a sensor unit 86 as necessary. The sensor unit 86 comprehensively indicates various sensors.

The CPU 71 and the video processing unit 85 can perform corresponding processing on the basis of the information from the sensor unit 86.

Specific examples of the sensor in the sensor unit 86 include a distance measurement sensor such as a time of flight (ToF) sensor, a distance measurement/direction sensor such as a LiDAR, a position information sensor, an illuminance sensor, an infrared sensor, and a touch sensor.

Furthermore, an inertial measurement unit (IMU) is mounted as the sensor unit 86, for example, an angular velocity may be capable of being detected by an angular velocity (gyro) sensor of three axes of pitch, yaw, and roll.

The information processing device 70 may include a camera unit 87. For example, this is a case where the information processing device 70 is implemented as a terminal device 1 having an imaging function to be described later.

The camera unit 87 includes an image sensor and a processing circuit for a signal photoelectrically converted by the image sensor. A video as a moving image or a still image is captured by the camera unit 87.

The captured video is subjected to video processing by the video processing unit 85 and the CPU 71, stored in the storage unit 79, displayed on the display unit 77, or transmitted to other devices by the communication unit 80.

Regarding a subject of the video captured by the camera unit 87, distance information obtained by the distance measurement sensor of the sensor unit 86 is depth information to the subject. For example, the CPU 71 and the video processing unit 85 can generate a depth map corresponding to each frame of the captured video on the basis of the detection value of the distance measurement sensor, and can detect the depth information of a specific subject detected in object detection processing from the image.

In the information processing device 70, for example, software for the processing of the present embodiment can be installed via network communication of the communication unit 80 or the removable recording medium 82. Alternatively, the software may be stored in advance in the ROM 72, the storage unit 79, or the like.

3. Virtual Production According to Embodiment

Hereinafter, virtual production according to the embodiment will be described.

It cannot be said that a general user can easily perform virtual production using the imaging system 500 as a large-scale studio set described above. Therefore, in the embodiment, a technology for enabling video production using a virtual production technology to be easily performed even at home or the like is proposed.

Figure 9:
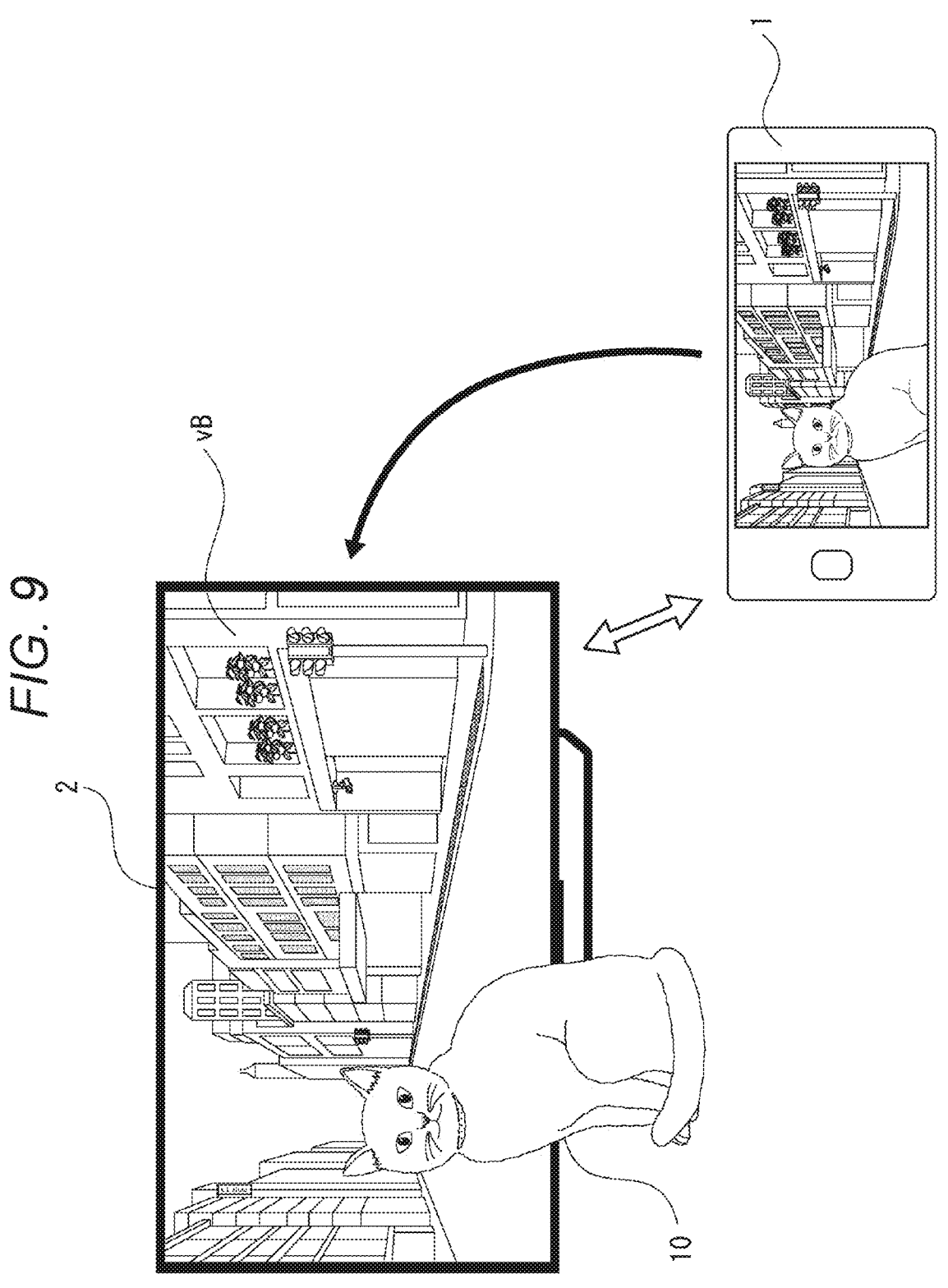
FIG. 9 is an explanatory diagram illustrating virtual production according to the embodiment.

FIG. 9 illustrates examples of the terminal device 1, the display device 2, and an object 10 (human, animal, article, and the like) existing as a capturing target.

In this example, it is assumed that the terminal device 1 is, for example, a smartphone, a tablet terminal, a laptop, or the like, and has a function of capturing a video. In particular, the terminal device 1 is preferably a small device that can be carried by the user, but may be a device that is not suitable for carrying a desktop or the like.

The display device 2 has at least a function of displaying a video, and is assumed to be, for example, a television receiver for home use, a video monitor device, or the like.

For example, the user uses his/her smartphone as the terminal device 1 and the television receiver at home as the display device 2, and performs imaging for virtual production.

In this case, for example, the display device 2 is recognized by the terminal device 1. For example, the display device 2 is recognized with a video captured by the terminal device 1. As a result, the terminal device 1 recognizes the display device 2 as the target of the relative position detection. Specifically, for example, a television receiver or the like including an AR marker 3 is only required to be recognized as the display device 2. Alternatively, the terminal device 1 and the display device 2 may perform pairing by near field communication or the like. Moreover, the terminal device 1 may be recognized as a target of the relative position detection by the display device 2 side. In any case, at least one of the terminal device 1 or the display device 2 recognizes a pair as the target of the relative position detection.

In this state, the background video vB generated by the rendering using the 3D background model is displayed on the display device 2. Then, the user captures the background video vB displayed on the display device 2 and a real object 10 in front of the background video vB with the terminal device 1.

At this time, when the background video vB is rendered on the basis of the relative position of the terminal device 1 with respect to the display device 2, it is possible to generate the background video vB according to the parallax caused due to the direction and the positional relationship with the position of the terminal device 1 as the viewpoint. That is, the background video vB equivalent to the inner frustum described above can be displayed on the display device 2.

Therefore, the terminal device 1 such as a smartphone and the display device 2 such as a television receiver can perform imaging equivalent to that of the imaging system 500 in FIG. 1 described above.

In a case where such imaging is performed, the following is required.

Detection of the relative position between the terminal device 1 and the display device 2

Rendering of the background video vB based on the relative position

Imaging including the background video vB and the object 10 by using an imaging function of the terminal device 1

In the imaging system 500 described above with reference to FIGS. 1 to 7, the imaging for virtual production has been implemented by performing these requirements on different devices and causing them to cooperate with each other.

In the present embodiment, these functions are implemented by either the terminal device 1 or the display device 2. Alternatively, a cloud server 4 to be described later may be used.

As a result, a user can easily create an attractive moving image by performing virtual production imaging at home or the like. For example, it is possible to create an attractive introduction moving image of an item created as a hobby, a pet, an action of a subject person, or the like.

Detection of the relative position between the terminal device 1 and the display device 2 will be described.

In order to display the background video vB in which the imaging direction and the parallax are reflected, it is necessary to detect the relative position between the terminal device 1 and the display device 2 at each frame timing when the terminal device 1 performs imaging. Note that in a simple manner, the relative position detection may be performed at each timing of intermittent frames, but in order to set the background video vB in which the parallax is reflected more precisely, it is desirable that the relative position detection is performed by the terminal device 1 at each timing of all frames of captured video vC.

Figure 10:
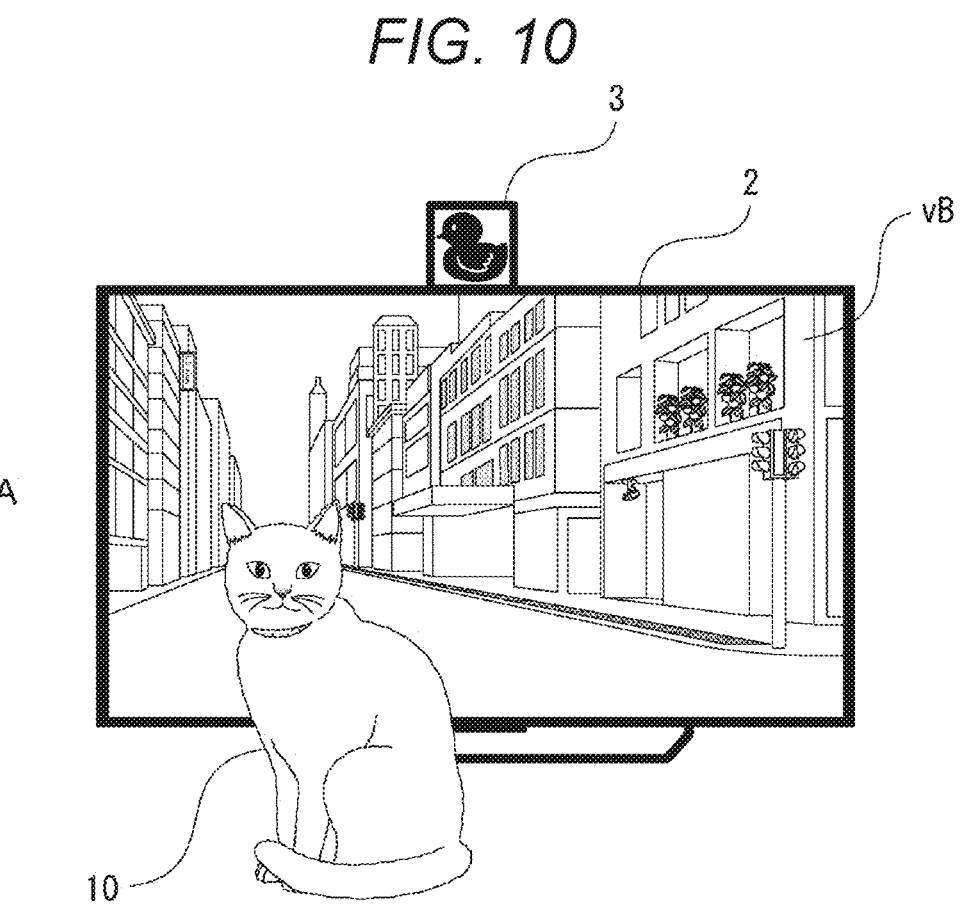
FIG. 10 is an explanatory diagram illustrating relative position detection according to the embodiment.
Figure 10:
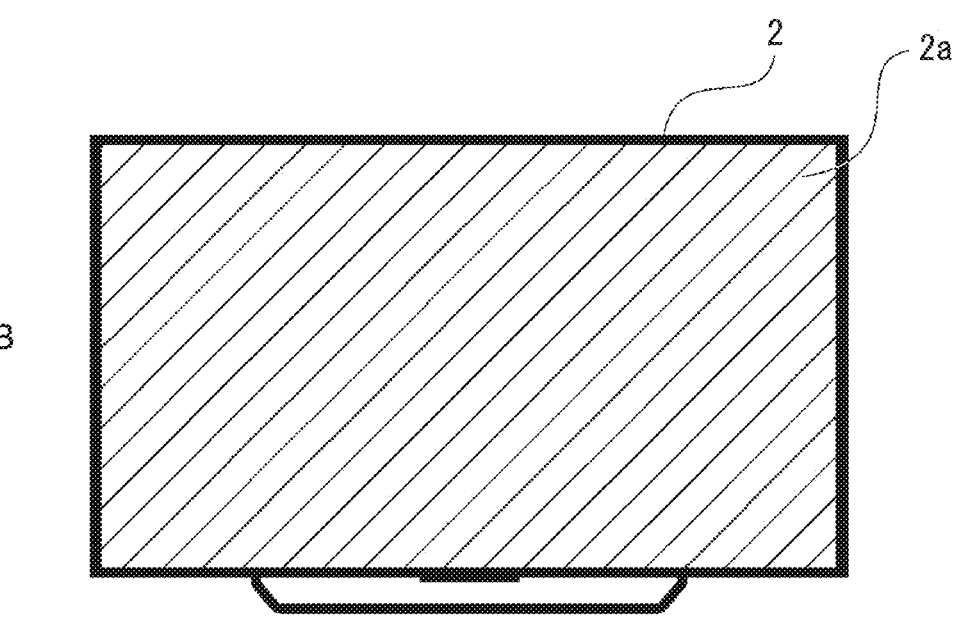

For the relative position detection, as illustrated in FIG. 10A, an example in which an AR marker 3 is installed on the display device 2 is considered. When the terminal device 1 captures a video with the imaging function, the terminal device 1 can detect the relative position with respect to the display device 2 by recognizing the AR marker 3 in the video.

The AR marker 3 can be used only in a case where the terminal device 1 images a range including the AR marker 3. Therefore, it is desirable to use a technology such as simultaneous localization and mapping (SLAM) in combination in consideration of the frame-out of the AR marker 3. For example, the surrounding environment is sensed by LiDAR or the like, and self-position estimation is performed by SLAM on the basis of the environmental information.

Furthermore, the terminal device 1 can also perform self-position estimation by itself on the basis of the captured video and the detection data of the IMU.

On the basis of the self-position estimation, the relative position detection with respect to the display device 2 can be performed.

Note that although an example in which the relative position detection is performed by the terminal device 1 has been described above, the relative position detection with respect to the terminal device 1 can also be performed by the display device 2. For example, the AR marker is disposed on the terminal device 1 side, the display device 2 includes the camera unit 87, and thus the relative position detection can be performed in a similar manner.

Furthermore, in practice, since the display device 2 is assumed to be a television receiver for home use or the like, the size of the display device 2, more precisely, the size of the display surface is also detected. The display size information is obtained by the display size detection.

As a method of detecting the size of the display device 2, it is conceivable that the user activates an application program on the terminal device 1 and manually inputs an actual numerical value. For example, the user actually measures and inputs the vertical and horizontal lengths of the display device 2.

Alternatively, it is conceivable that the user inputs a product name, a model number, or the like of a television receiver or the like which is the display device 2, and the application program accesses a database (DB) to automatically perform size retrieval.

The size of the display device 2 can also be automatically detected by the terminal device 1. For example, the range of the display device 2 can be specified from a depth map based on distance information of the captured video obtained by the distance measurement sensor. Thus, the size of display device 2 can be detected.

Furthermore, more precisely, it is desired to detect the size of a screen 2a hatched in FIG. 10B instead of the housing size of the display device 2. Therefore, at the time of size detection, it is also conceivable to transmit a video of a specific color from the terminal device 1 to the display device 2 to display the video, detect a range of the color in the captured video, and calculate the actual size.

As described above, the size detection of the display device 2 and the relative position detection between the terminal device 1 and the display device 2 are performed, and the background video vB rendered on the basis of the relative position information is displayed on the display device 2. Then, the terminal device 1 images the object 10 including the displayed background video vB.

Figure 11:
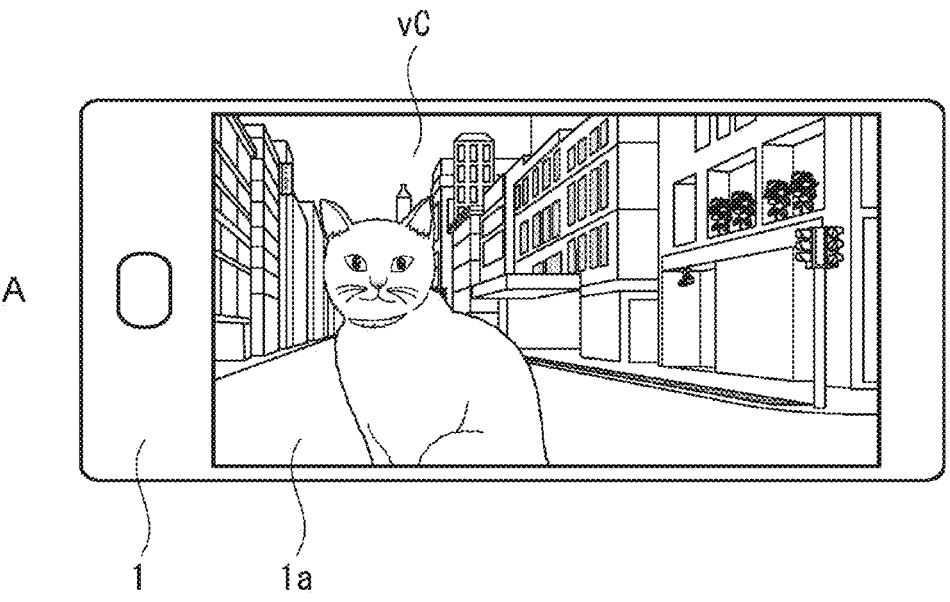
FIG. 11 is an explanatory diagram illustrating display of a captured video in a terminal device according to the embodiment.
Figure 11:
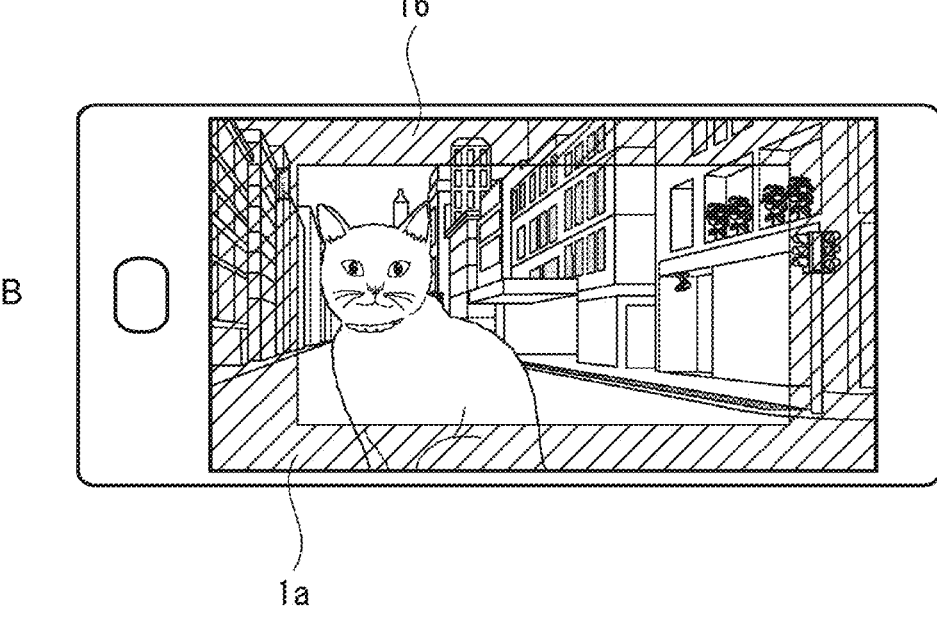

For example, the terminal device 1 displays the captured video vC on the screen 1a as illustrated in FIG. 11A. The captured video vC is a video including the background video vB and the object 10. The user can view a video as a monitor for imaging on the screen 1a of the terminal device 1 while performing the imaging with the terminal device 1.

Note that when the captured video vC is displayed on the screen 1a as described above, the image quality may be changed by applying the filter processing to the entire video.

For example, an animation filter or the like can be applied.

When the terminal device 1 can capture a video with high resolution, the angle of view may be slightly changed at the time of post-editing so that the terminal device 1 captures a video with the angle of view larger than the expected angle of view to be finally used.

By doing so, a wide range of imaging can be performed, which may be advantageous for the AR marker 3 of the display device 2 and environment recognition for SLAM.

Furthermore, in a case where the imaging is performed with a wide angle of view for environment recognition or the like, the rendering of a background corresponding to a range that is not finally used for the video content being produced is wasted. Therefore, for the background video vB corresponding to the range, processing such as drawing with reduced resolution may be performed.

In a case where the imaging is performed with a wide angle of view including a portion that is not finally used, it is desirable to make it easy for the user to understand a region to be used and a region not to be used. Therefore, as illustrated in FIG. 11B, invalid region frame 16 is displayed in a display mode such as shading or graying, and a range used as the video content being produced is presented to the user. In this way, the user can produce the video content in a state in which the subject is appropriately framed in from a desired distance, direction, and angle in the imaging by the terminal device 1.

A configuration example in a case where the imaging for virtual production is performed by using the terminal device 1 and the display device 2 as described above will be described. Each configuration example is described as a first embodiment to a sixth embodiment. Here, a configuration is described and a flow from detection of the relative position information RP for each frame to display of the background video vB will be described.

Note that although detection and transmission/reception of the display size information of the display device 2 are not illustrated in each drawing, the display size information does not change between the start of the imaging and the end of the imaging, it is sufficient that the display size information is first detected once by some method and is acquired by a device that performs rendering.

In each embodiment, the terminal device 1 and the display device 2 are associated with each other as a relative position detection target. That is, the relative position information RP is a relative position between the terminal device 1 and the display device 2 in all examples.

Furthermore, in each example, communication between the terminal device 1 and the display device 2, communication between the terminal device 1 and the cloud server 4, and communication between the display device 2 and the cloud server 4 may be either wired communication or wireless communication. Furthermore, the communication may be direct communication between devices or network communication.

Figure 12:
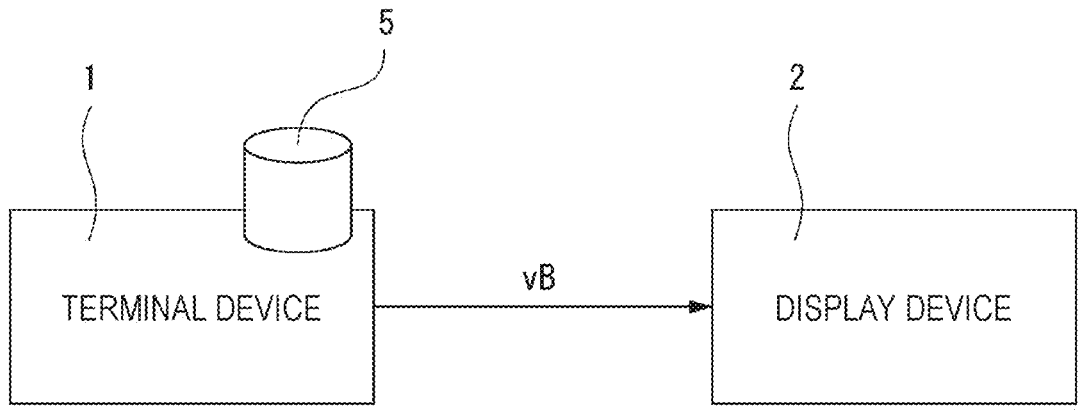
FIG. 12 is a block diagram illustrating a system configuration according to a first embodiment.

FIG. 12 illustrates a configuration example of a first embodiment. The first embodiment includes the terminal device 1 and the display device 2. The terminal device 1 includes a 3D background model 5.

The terminal device 1 performs relative position detection, and renders the background video vB from the 3D background model 5 on the basis of the relative position information.

The terminal device 1 transmits the background video vB to the display device 2.

The display device 2 displays the background video vB.

Figure 13:
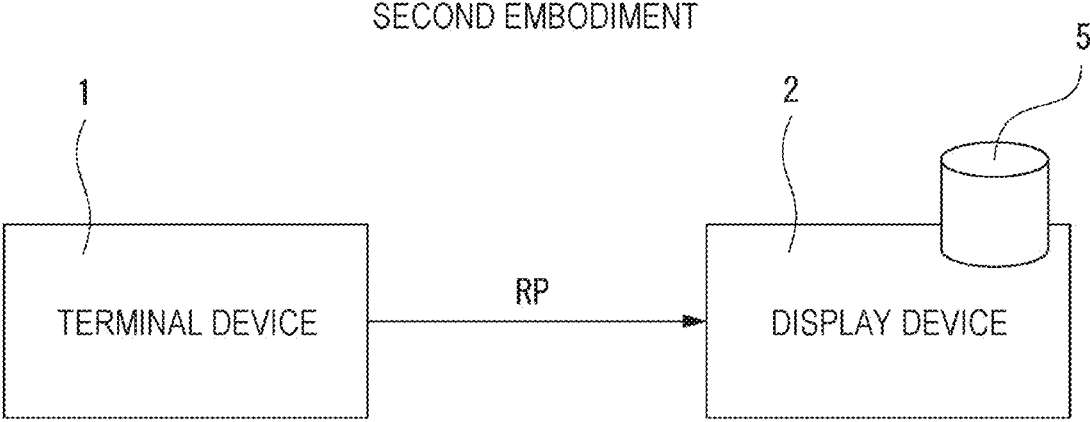
FIG. 13 is a block diagram illustrating a system configuration according to a second embodiment.

FIG. 13 illustrates a configuration example of a second embodiment. The first embodiment includes the terminal device 1 and the display device 2. The display device 2 includes a 3D background model 5.

The terminal device 1 performs relative position detection to acquire the relative position information RP.

The terminal device 1 transmits the relative position information RP to the display device 2.

The display device 2 renders the background video vB from the 3D background model 5 on the basis of the relative position information, and displays the background video vB.

Figure 14:
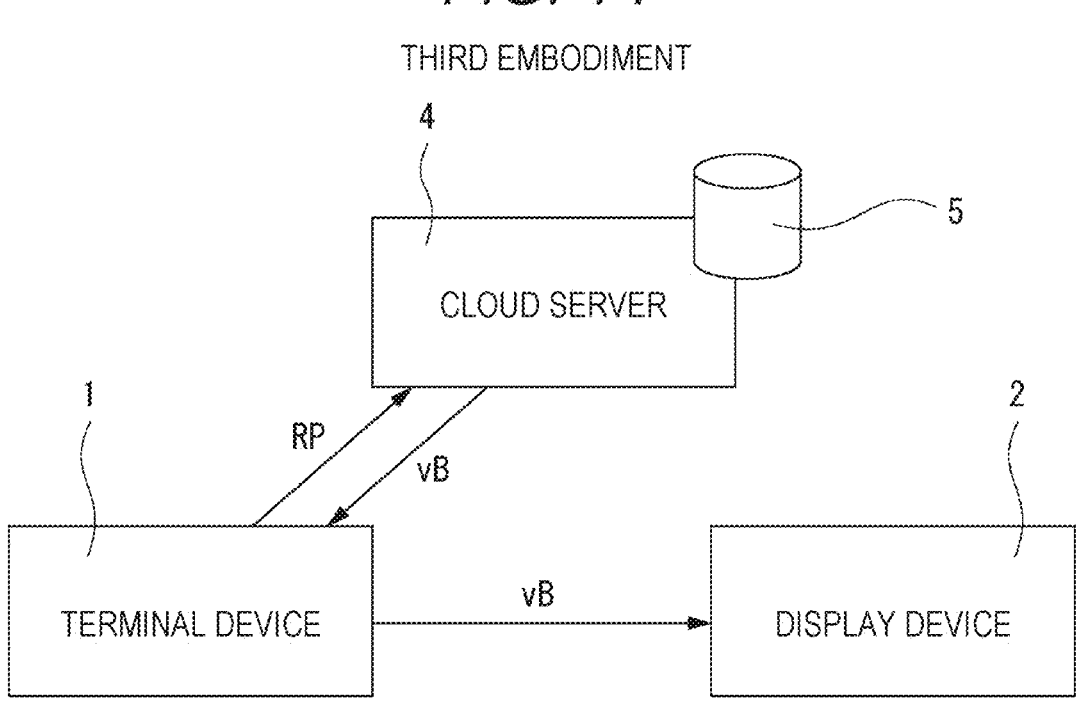
FIG. 14 is a block diagram illustrating a system configuration according to a third embodiment.

FIG. 14 illustrates a configuration example of a third embodiment. The third embodiment includes the terminal device 1, the display device 2, and the cloud server 4. The cloud server 4 includes a 3D background model 5.

The terminal device 1 performs relative position detection to transmit the relative position information RP to the cloud server 4.

The cloud server 4 renders the background video vB from the 3D background model 5 on the basis of the relative position information RP.

The cloud server 4 transmits the background video vB to the terminal device 1.

The terminal device 1 transmits the background video vB received from the cloud server 4 to the display device 2.

The display device 2 displays the background video vB.

Figure 15:
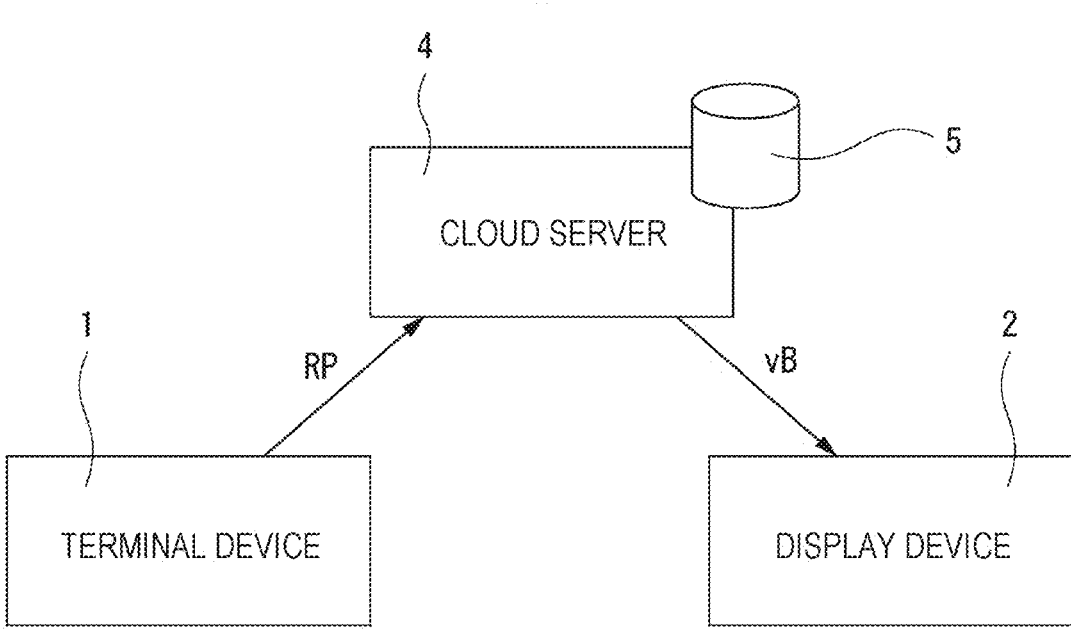
FIG. 15 is a block diagram illustrating a system configuration according to a fourth embodiment.

FIG. 15 illustrates a configuration example of a fourth embodiment. The third embodiment includes the terminal device 1, the display device 2, and the cloud server 4. The cloud server 4 includes a 3D background model 5.

The terminal device 1 performs relative position detection to transmit the relative position information RP to the cloud server 4.

The cloud server 4 renders the background video vB from the 3D background model 5 on the basis of the relative position information RP.

The cloud server 4 transmits the background video vB to the display device 2.

The display device 2 displays the background video vB.

Figure 16:
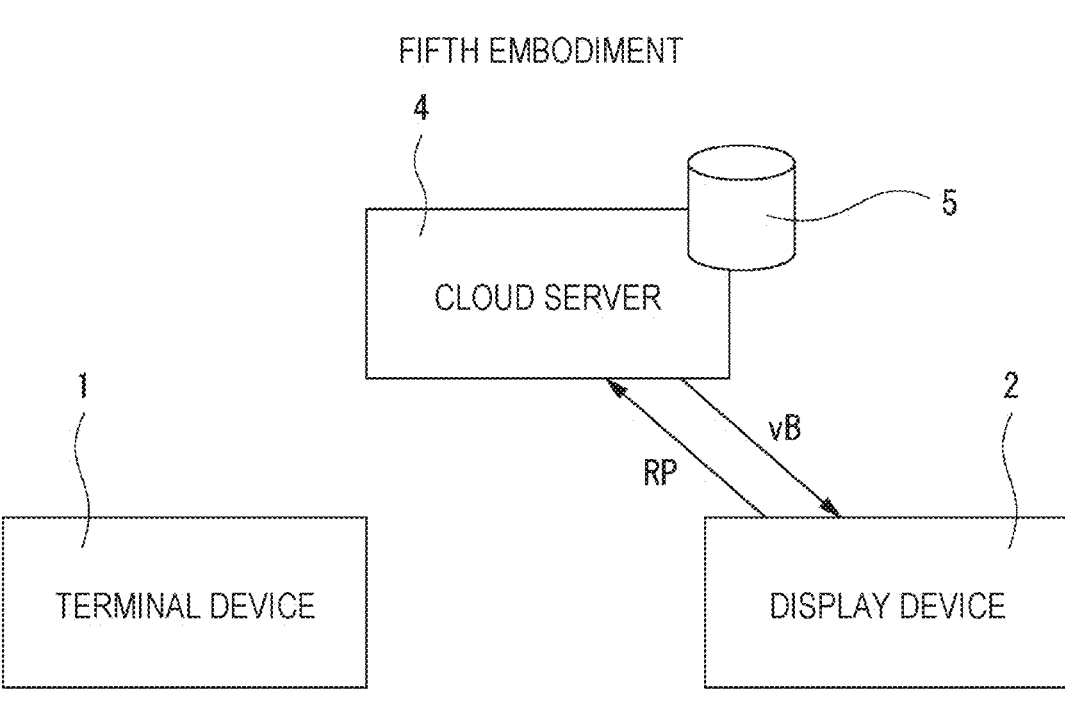
FIG. 16 is a block diagram illustrating a system configuration according to a fifth embodiment.

FIG. 16 illustrates a configuration example of a fifth embodiment. The third embodiment includes the terminal device 1, the display device 2, and the cloud server 4. The cloud server 4 includes a 3D background model 5.

The display device 2 performs relative position detection to transmit the relative position information RP to the cloud server 4.

The cloud server 4 renders the background video vB from the 3D background model 5 on the basis of the relative position information RP.

The cloud server 4 transmits the background video vB to the display device 2.

The display device 2 displays the background video VB.

Figure 17:
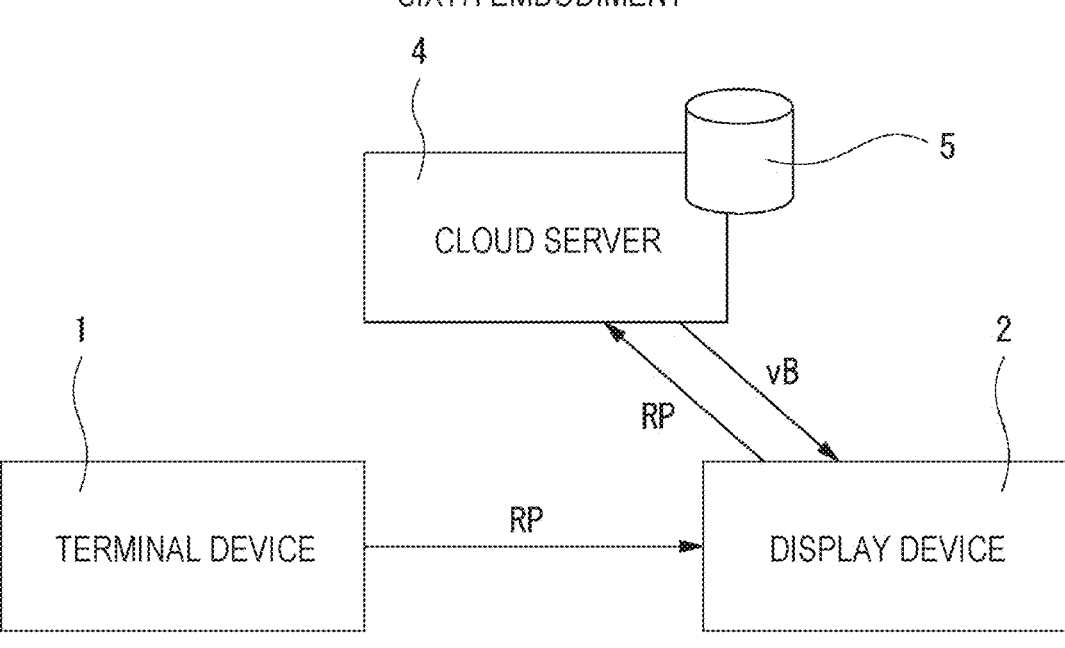
FIG. 17 is a block diagram illustrating a system configuration according to a sixth embodiment.

FIG. 17 illustrates a configuration example of a sixth embodiment. The third embodiment includes the terminal device 1, the display device 2, and the cloud server 4. The cloud server 4 includes a 3D background model 5.

The terminal device 1 performs relative position detection to transmit the relative position information RP to the display device 2.

The display device 2 transmits the relative position information RP received from the terminal device 1 to the cloud server 4.

The cloud server 4 renders the background video vB from the 3D background model 5 on the basis of the relative position information RP.

The cloud server 4 transmits the background video vB to the display device 2.

The display device 2 displays the background video vB.

Although six configuration examples have been described above, various configuration examples other than these can be considered.

Figure 18:
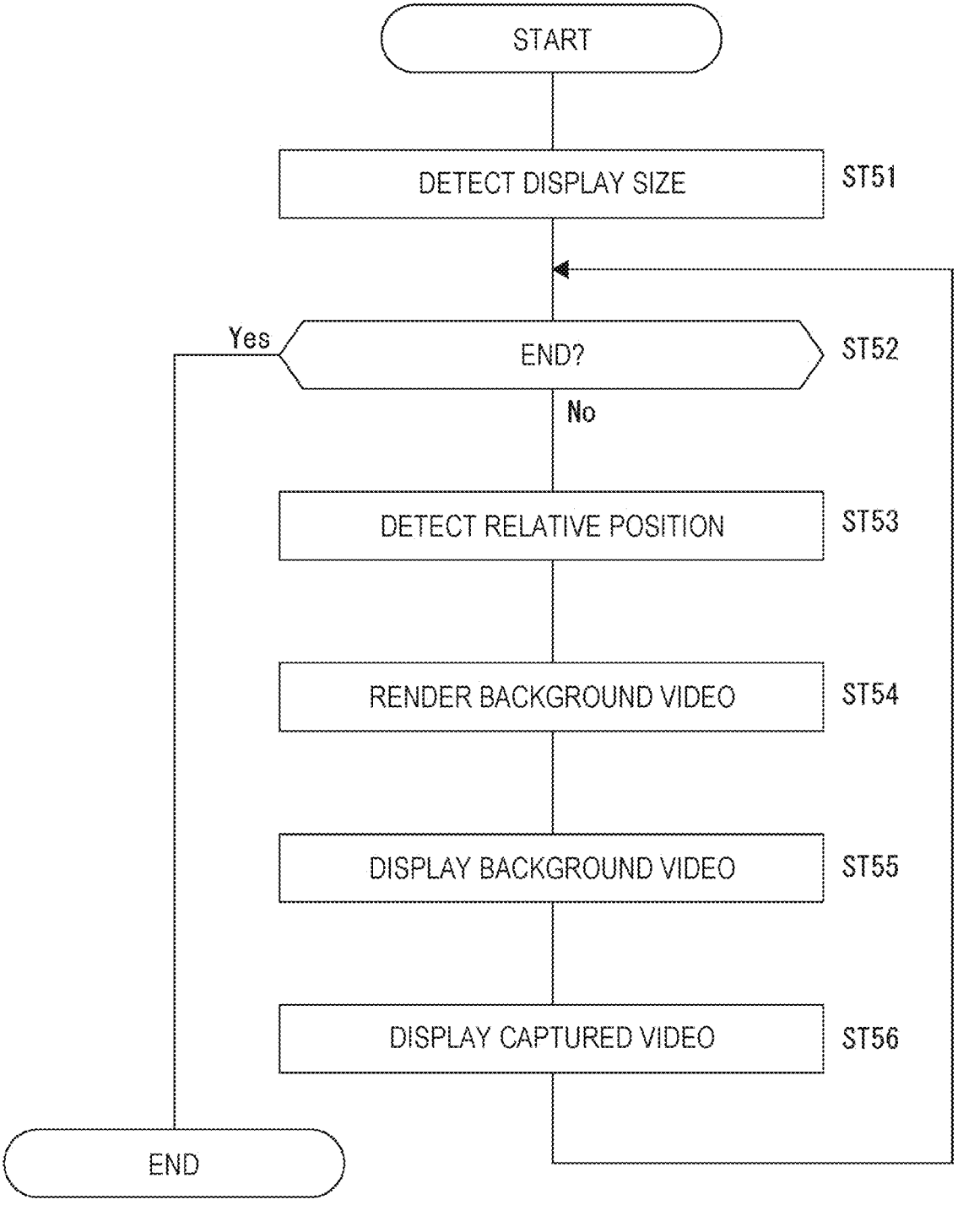
FIG. 18 is a flowchart illustrating overall processing according to the first to sixth embodiments.

For example, a flow of processing in a case where the imaging for virtual production is performed with the above-described configuration will be described with reference to FIG. 18. Each step in FIG. 18 is processing executed by any device in the system according to the configurations of the first to sixth embodiments. Here, it has been described as a processing procedure of the entire system.

In a case where the imaging is started, any device in the system performs the display size detection in step ST51. That is, information regarding the size of the screen 2$a$ of the display device 2 is detected. The display size information is acquired by a device that renders the background video vB.

In step ST52, an imaging end determination is performed. For example, it is determined that the imaging ends through an imaging end operation by the user of the terminal device 1. When it is determined that the processing ends, each device ends the processing of FIG. 18.

The processing from step ST53 to step ST56 is repeated at each frame timing of the background video vB and at each frame timing of the captured video vC until it is determined that the imaging ends.

Note that the frame timing of the background video vB and the frame timing of the captured video vC are synchronized with each other.

In step ST53, relative position detection is performed by any device (the terminal device 1 or the display device 2) in the system. The relative position information RP obtained by detection is acquired by a device that performs rendering.

In step ST54, any device in the system performs processing of rendering the background video vB from the 3D background model 5 on the basis of the relative position information RP.

In step ST55, the display device 2 performs processing of displaying the background video vB obtained by rendering.

In step ST56, the terminal device 1 performs processing of displaying the captured video vC on the screen 1$a$ while capturing the background video vB of the display device 2 and the image of the object 10.

The processing of the above-described flow is performed as the entire system, and the imaging for virtual production proceeds is performed. Hereinafter, a specific functional configuration in the first to sixth embodiments for executing such processing and a processing example of each device will be described.

4. First Embodiment: Example by Terminal Device and Display Device

Figure 19:
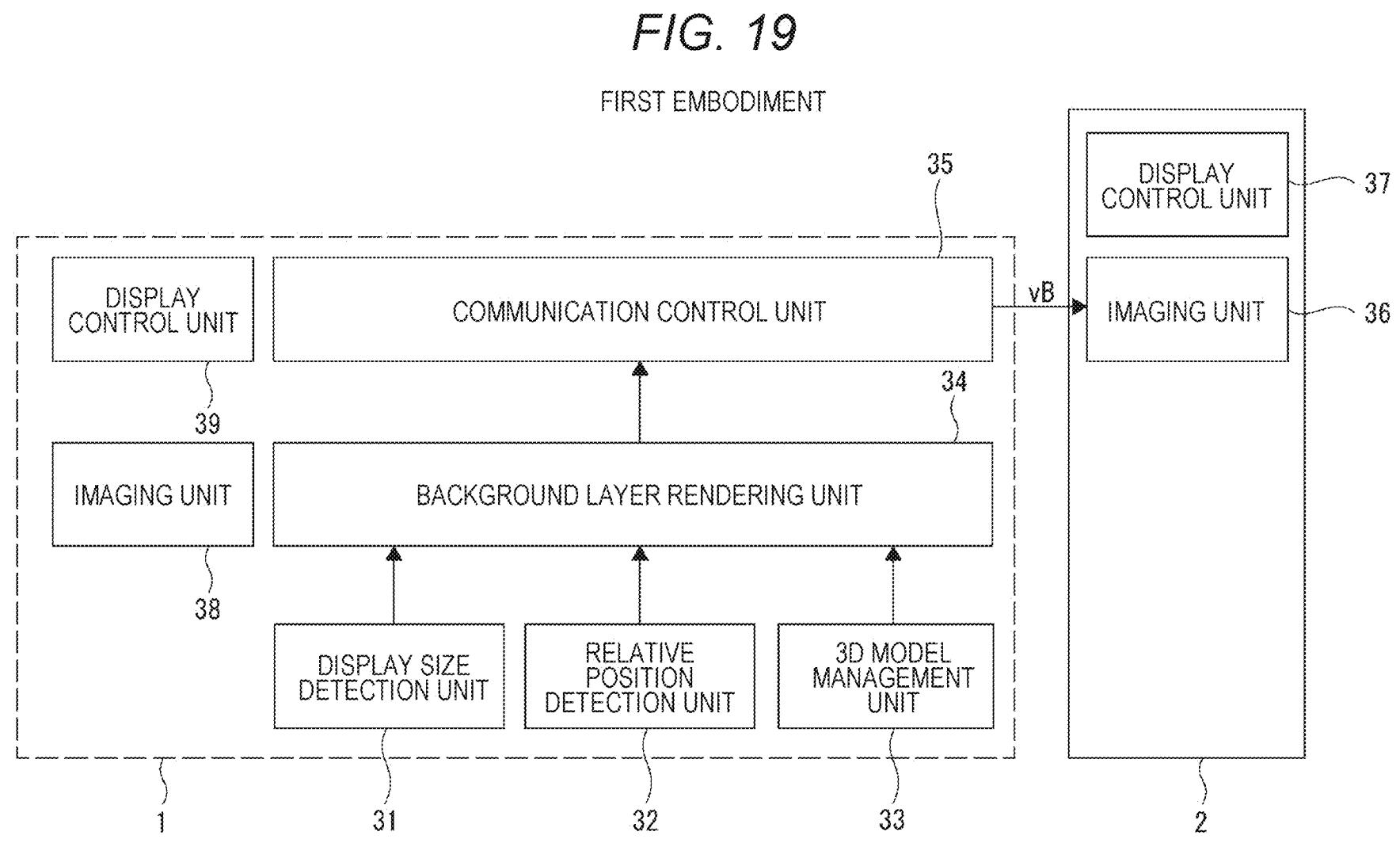

FIG. 19 illustrates functional configurations of the terminal device 1 and the display device 2 in the first embodiment illustrated in FIG. 12.

Note that the functional configuration described in each embodiment is realized by the terminal device 1, the display device 2, or a hardware configuration as the information processing device 70 of FIG. 8 in the cloud server 4, mainly the video processing unit 85.

In the example of FIG. 19, the terminal device 1 includes a display size detection unit 31, a relative position detection unit 32, a 3D model management unit 33, a background layer rendering unit 34, a communication control unit 35, an imaging unit 38, and a display control unit 39.

The display size detection unit 31 is a function of performing display size detection processing for the display device 2 associated as a relative position detection target. As described above, the display size detection includes a method according to a user input and an automatic detection method. Thus, the display size detection can be executed by the CPU 71 or the video processing unit 85 via a user interface using the input unit 76 or the display unit 77 in the information processing device 70. The information received by the communication unit 80 or the information read from the DB stored in the storage unit 79 may be used as the size information retrieved on the basis of the model number or the like. Furthermore, the CPU 71 and the video processing unit 85 can automatically detect the display size by using the information of the camera unit 87 and the information of the sensor unit 86.

The relative position detection unit 32 is a function of performing processing of detecting the relative position information RP between the terminal device 1 and the display device 2, which are associated with each other. Since the relative position detection is performed by a method using the AR marker 3 or a method using the SLAM technology, the relative position detection is implemented by the CPU 71 or the video processing unit 85 using information from the camera unit 87, the sensor unit 86, and the communication unit 80 in the information processing device 70.

The 3D model management unit 33 is a function of managing the 3D background model 5 for generating the background video vB. For example, the 3D background model 5 produced in the asset creation step is stored in the storage unit 79 or the like, and is read at the time of management and rendering. The 3D model management unit 33 is implemented by, for example, processing of the video processing unit 85 in the information processing device 70.

The background layer rendering unit 34 is a function of rendering the background video vB, and is implemented by processing of the video processing unit 85 and the CPU 71 in the information processing device 70.

The communication control unit 35 is a function of transmitting and receiving information to and from other devices in the terminal device 1. It is a control function of communication via the communication unit 80 in the information processing device 70 as the terminal device 1, and is implemented by the video processing unit 85 and the CPU 71.

The imaging unit 38 is a function of capturing a video as a moving image or a still image, and is implemented by the camera unit 87 in the information processing device 70.

The display control unit 39 is a function of performing control to display the video on the screen 1a in the terminal device 1, and is implemented as a control function of the display unit 77 by the video processing unit 85 or the CPU 71 in the information processing device 70 as the terminal device 1.

The display device 2 includes a communication control unit 36 and a display control unit 37.

The communication control unit 36 is a function of transmitting and receiving information to and from other devices in the display device 2. It is a control function of communication via the communication unit 80 in the information processing device 70 as the display device 2, and is implemented by the video processing unit 85 and the CPU 71.

The display control unit 37 is a function of performing control to display the video on the screen 2a in the display device 2, and is implemented as a control function of the display unit 77 by the video processing unit 85 or the CPU 71 in the information processing device 70 as the terminal device 1.

Figure 20:
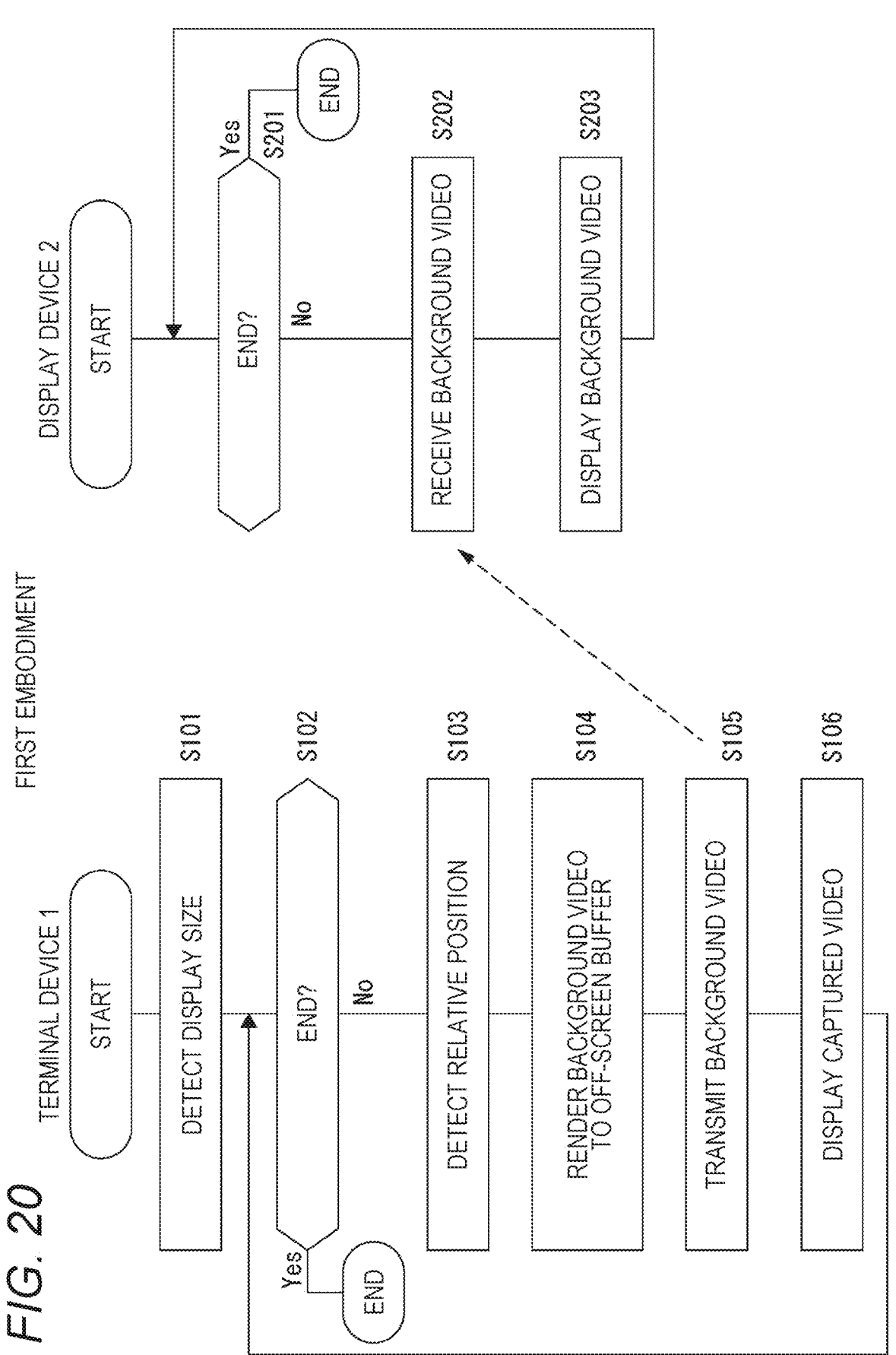
FIG. 20 is a flowchart illustrating a processing example according to the first embodiment.

In the first embodiment having such a functional configuration, the processing in FIG. 20 is performed by the terminal device 1 and the display device 2, so that the processing operation in FIG. 18 described above is executed as an entire system.

Note that although the imaging by the terminal device 1 is not illustrated in the flowchart, basically, a recording standby state in an imaging mode as the virtual production is set by the user operation. Therefore, the capturing of the moving image (acquisition of the image data by the image sensor) is started, and the display of the captured video vC on the screen 1a is started as the through image. Then, the captured video vC is recorded in the recording medium as the video content in response to the recording start operation. Furthermore, in response to the recording stop operation, the recording on the recording medium as the video content is stopped, and the recording standby state is set. Then, the imaging for the virtual production is ended through a predetermined end operation, and the display of the captured video vC on the screen 1a is also ended.

A flowchart of each embodiment illustrates processing at each frame timing from the start to the end of the imaging for virtual production.

When the imaging for virtual production is started by a user operation or automatic start control, the terminal device 1 detects the display size of the display device 2 with the display size detection unit 31 in step S101.

The terminal device 1 determines the end of the virtual production imaging in step S102, and repeats steps from steps S103 to S106 at each frame timing of the captured video vC in a period in which the virtual production imaging is not ended.

In step S103, the terminal device 1 performs relative position detection with the relative position detection unit 32.

In step S104, the terminal device 1 renders the 3D background model 5 read from the 3D model management unit 33 to the offscreen buffer on the basis of the display size information and the relative position information RP with the background layer rendering unit 34. That is, the background video vB is generated. The offscreen buffer is a non-display screen, and is a temporary buffer area of a rendering video prepared in the RAM 73 or the like.

In step S105, the terminal device 1 performs processing of transmitting the background video vB in the offscreen buffer to the display device 2 with the communication control unit 35.

On the other hand, on the display device 2 side, after the imaging for virtual production is started, the processing in steps S202 and S203 are repeated for each frame until the end while determining the end in step S201.

The end determination on the display device 2 side can be performed, for example, when the reception of the frame of the background video vB is interrupted for a predetermined time or more. Alternatively, a signal of the end instruction may be transmitted from the terminal device 1 at the time of the end, and the display device 2 may determine the end when receiving the signal. With the end determination, the display device 2 ends the processing of displaying the background video vB of the virtual production.

In a period until the end of the processing, in step S202, the display device 2 receives the background video vB from the terminal device 1 with the communication control unit 36.

In step S203, the display device 2 performs processing of displaying the received background video vB on the screen 2a with the display control unit 37.

As described above, the background video vB generated by the terminal device 1 is transmitted to and displayed on the display device 2 for each frame.

The terminal device 1 captures images of the display device 2 and the object 10 with the imaging unit 38. In step S106, the display control unit 39 performs processing of displaying the captured video vC of each frame obtained by the imaging on the screen 1a.

5. Second Embodiment: Example by Terminal Device and Display Device

Figure 21:
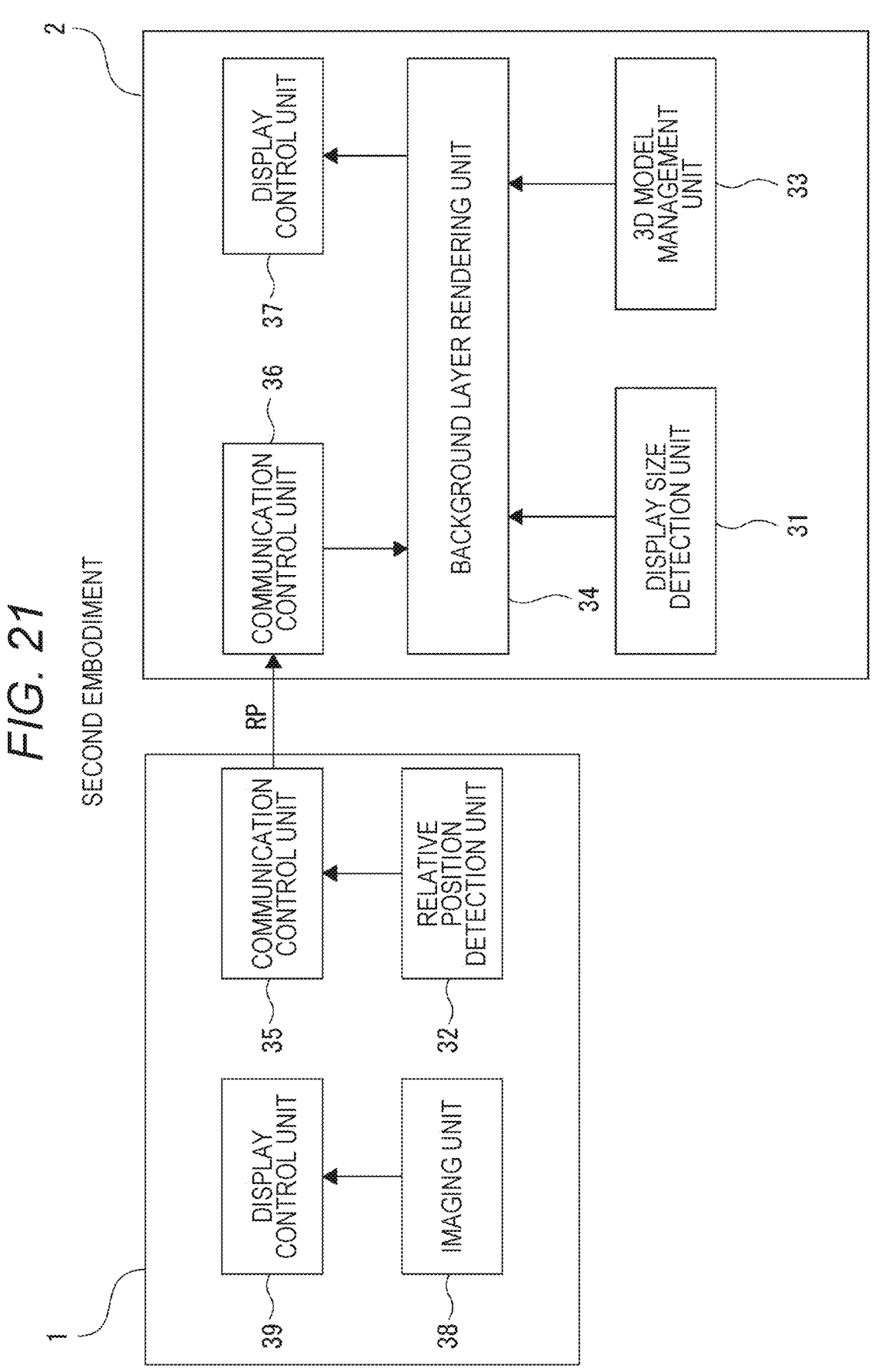
FIG. 21 is a block diagram illustrating a functional configuration according to the second embodiment.

FIG. 21 illustrates functional configurations of the terminal device 1 and the display device 2 in the second embodiment illustrated in FIG. 13. Note that in each of the following embodiments, the functional configurations described above are denoted by the same reference numerals, and detailed overlapping description will be omitted. It is desired to refer to the foregoing description of FIG. 11.

The terminal device 1 includes the relative position detection unit 32, the communication control unit 35, the imaging unit 38, and the display control unit 39.

The display device 2 includes the display size detection unit 31, the 3D model management unit 33, the background layer rendering unit 34, the communication control unit 36, and the display control unit 37.

Figure 22:
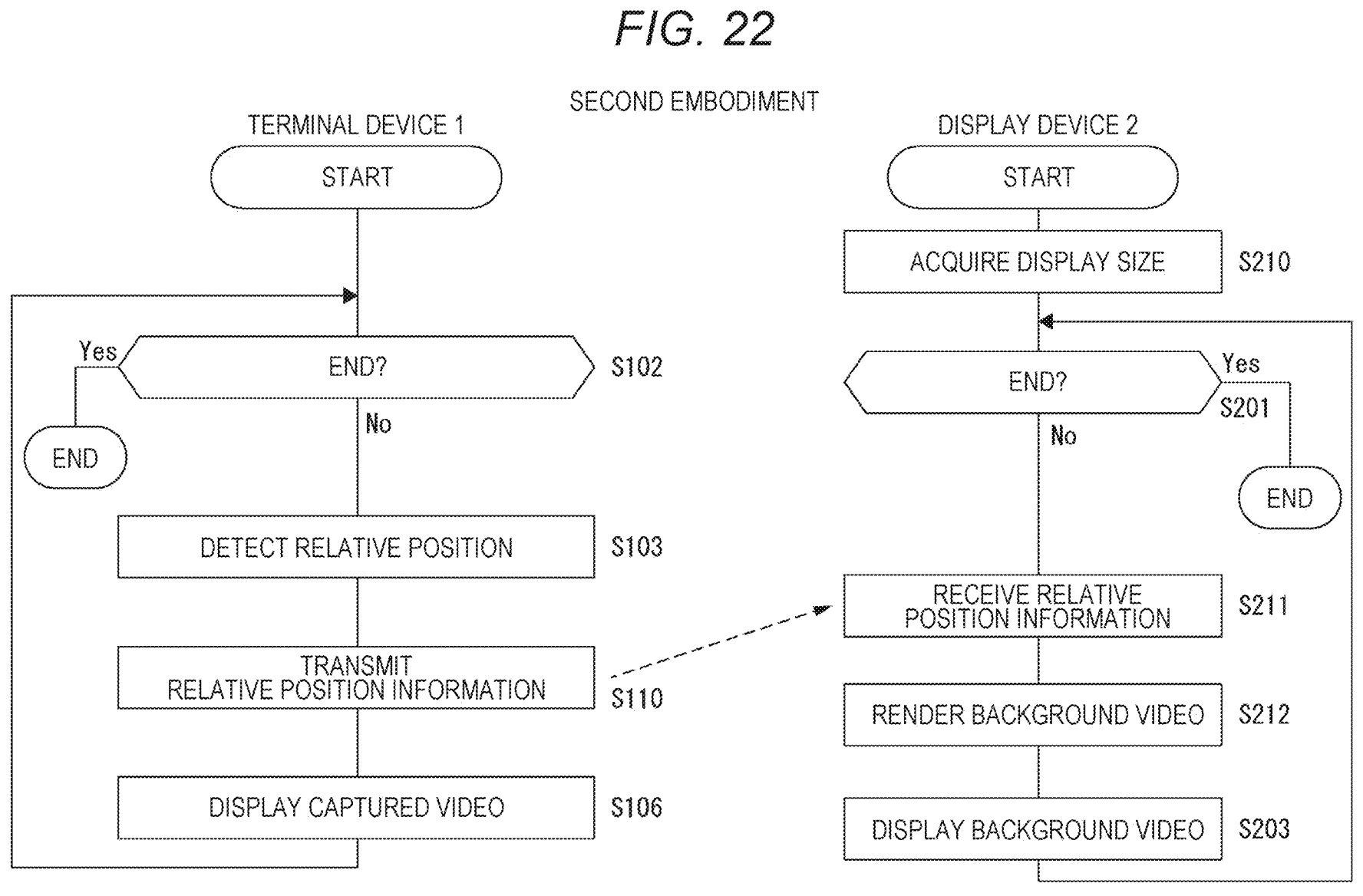

In the second embodiment having such a functional configuration, the processing in FIG. 22 is performed by the terminal device 1 and the display device 2, so that the processing operation in FIG. 18 described above is executed as an entire system.

Note that the same step numbers are assigned to the described processing.

When the virtual production imaging is started by the user operation or the automatic start control, the terminal device 1 determines the end of the virtual production imaging in step S102, and repeats the processing in steps S103, S110, and S106 at each frame timing of the captured video vC in a period in which the virtual production imaging is not ended.

In step S103, the terminal device 1 performs relative position detection with the relative position detection unit 32.

In step S110, the terminal device 1 performs processing of transmitting the relative position information RP to the display device 2 with the communication control unit 35.

In step S106, the terminal device 1 performs processing of displaying the captured video vC of each frame obtained by the imaging of the imaging unit 38 on the screen 1a with the display control unit 39.

When the virtual production imaging is started, the display device 2 detects the display size of the display device 2 with the display size detection unit 31 in step S210. Note that, in this case, since the size is its own size, the display size detection unit 31 is only required to be configured as a storage unit that stores size information of the screen 2a.

That is, in step S210, the CPU 71 in the display device 2 is only required to read the stored display size.

The display device 2 repeats the processing in steps S211, S212, and S203 for each frame until the end while determining the end of the processing in step S201.

In step S211, the display device 2 receives the relative position information RP from the terminal device 1 with the communication control unit 36.

In step S212, the display device 2 renders the 3D background model 5 read from the 3D model management unit 33 to generate the background video vB on the basis of the display size information and the received relative position information RP with the background layer rendering unit 34.

In step S203, the display device 2 performs processing of displaying the generated background video vB on the screen 2a with the display control unit 37.

As described above, the background video vB rendered by the display device 2 is displayed on the basis of the relative position information RP detected by the terminal device 1.

6. Third Embodiment: Example of Using Cloud Server

Figure 23:
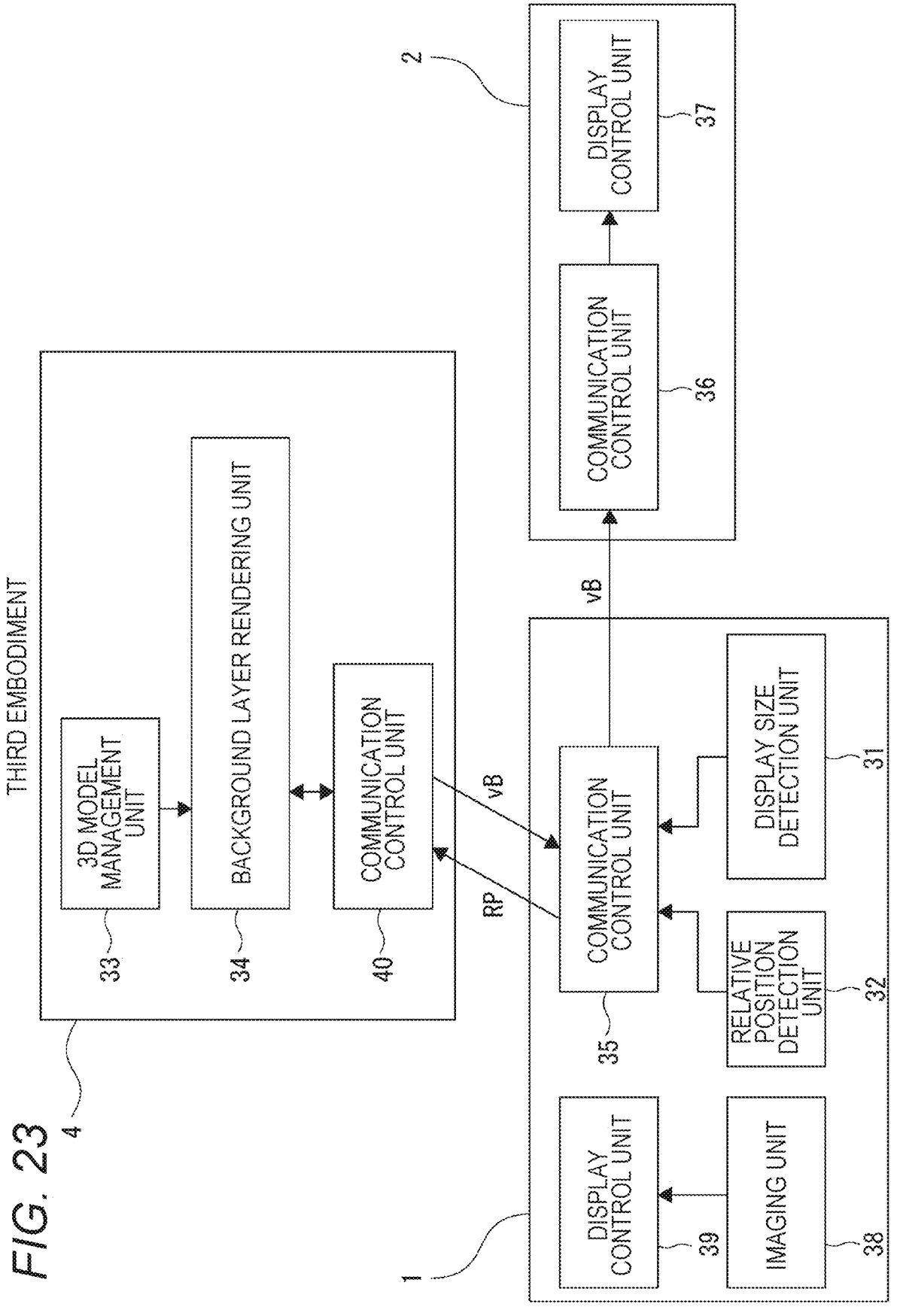
FIG. 23 is a block diagram illustrating a functional configuration according to the third embodiment.

FIG. 23 illustrates functional configurations of the terminal device 1, the display device 2, and the cloud server 4 in the third embodiment illustrated in FIG. 14.

The terminal device 1 includes the display size detection unit 31, the relative position detection unit 32, the communication control unit 35, the imaging unit 38, and the display control unit 39.

The display device 2 includes a communication control unit 36 and a display control unit 37.

The cloud server 4 includes the 3D model management unit 33, the background layer rendering unit 34, and a communication control unit 40.

The communication control unit 40 is a function of transmitting and receiving information to and from other devices in the cloud server 4. It is a control function of communication via the communication unit 80 in the information processing device 70 as the cloud server 4, and is implemented by the video processing unit 85 and the CPU 71.

Figure 24:
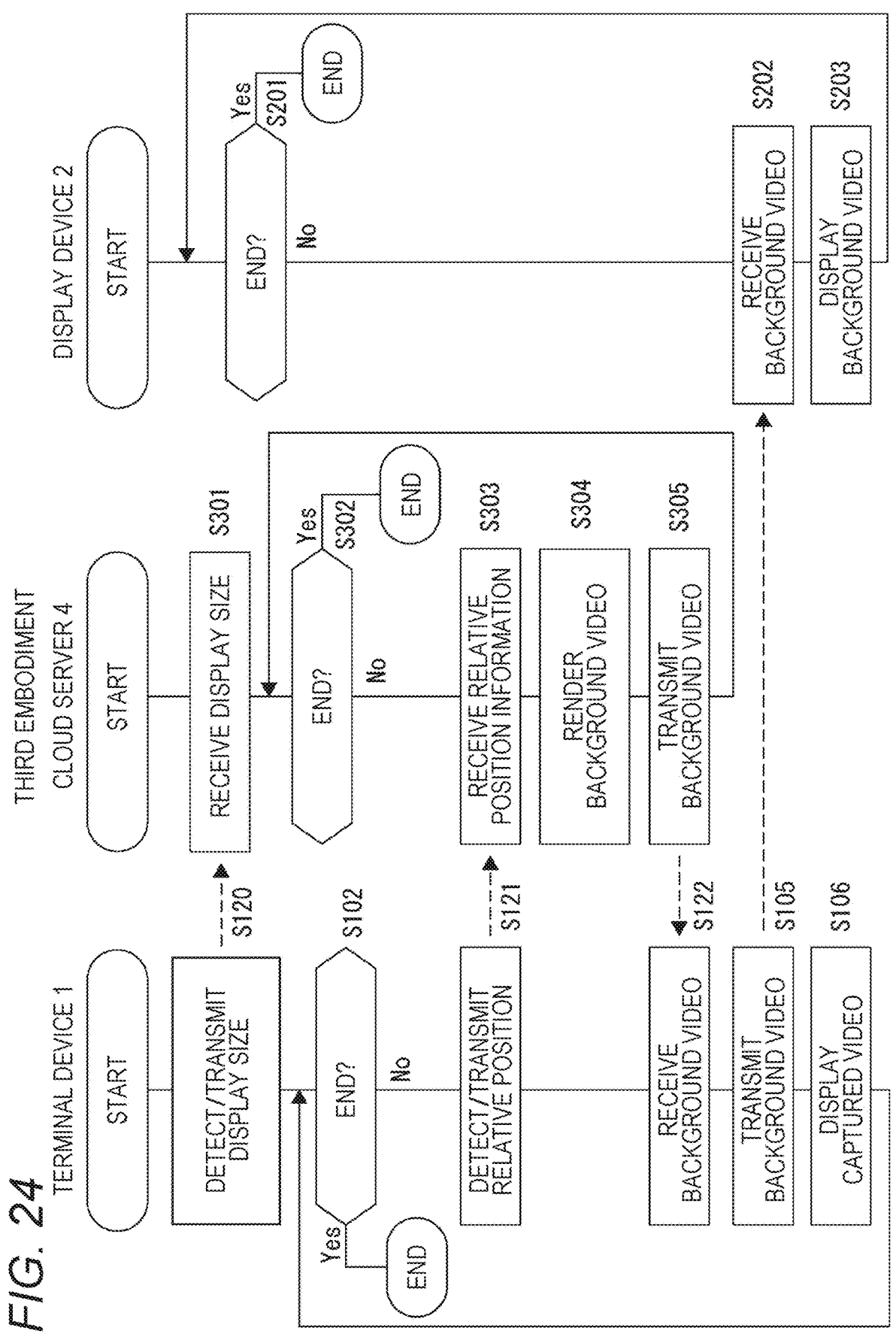
FIG. 24 is a flowchart illustrating a processing example according to the third embodiment.

In the third embodiment having such a functional configuration, the processing in FIG. 24 is performed by the terminal device 1, the cloud server 4, and the display device 2, so that the processing operation in FIG. 18 described above is executed as an entire system.

When the virtual production imaging is started by a user operation or automatic start control, the terminal device 1 detects the display size of the display device 2 with the display size detection unit 31 in step S120. Then, the terminal device 1 transmits the display size information to the cloud server 4.

With this, the cloud server 4 receives the display size information in step S301 and stores the display size information for subsequent rendering.

The terminal device 1 determines the end of the virtual production imaging in step S102, and repeats the processing in steps S121, S122, S105, and S106 at each frame timing of the captured video vC in a period in which the virtual production imaging is not ended.

In step S121, the terminal device 1 performs processing of performing the relative position detection with the relative position detection unit 32 and transmitting the detected relative position information RP to the cloud server 4 with the communication control unit 35.

After receiving the display size information in step S301, the cloud server 4 repeats the processing in steps S303, S304, and S305 while performing the end determination in step S302. Note that the end determination on the cloud server 4 side can be performed, for example, when reception of the relative position information RP from the terminal device 1 is interrupted for a predetermined time or more, or network communication with the terminal device 1 is disconnected. Alternatively, a signal of the end instruction may be transmitted from the terminal device 1 at the time of the end of the processing, and the cloud server 4 may determine the end when receiving the signal. With the end determination, the cloud server 4 ends the processing.

During a period until the end of the processing is determined, the cloud server 4 receives the relative position information RP in step S303 with the communication control unit 40.

In step S304, the cloud server 4 renders the 3D background model 5 read from the 3D model management unit 33 to generate the background video vB on the basis of the display size information and the relative position information RP with the background layer rendering unit 34.

Then, in step S305, the cloud server 4 performs processing of transmitting the background video vB to the terminal device 1 with the communication control unit 40.

When receiving the background video vB in step S122, the terminal device 1 performs processing of transmitting the received background video vB to the display device 2 with the communication control unit 40.

Furthermore, in step S106, the terminal device 1 performs processing of displaying the captured video vC of each frame obtained by the imaging of the imaging unit 38 on the screen 1a with the display control unit 39.

The display device 2 performs processing of steps S201, S202, and S203 similarly to the first embodiment (FIG. 20). As a result, the display device 2 executes the operation of displaying the received background video vB.

7. Fourth Embodiment: Example of Using Cloud Server

Figure 25:
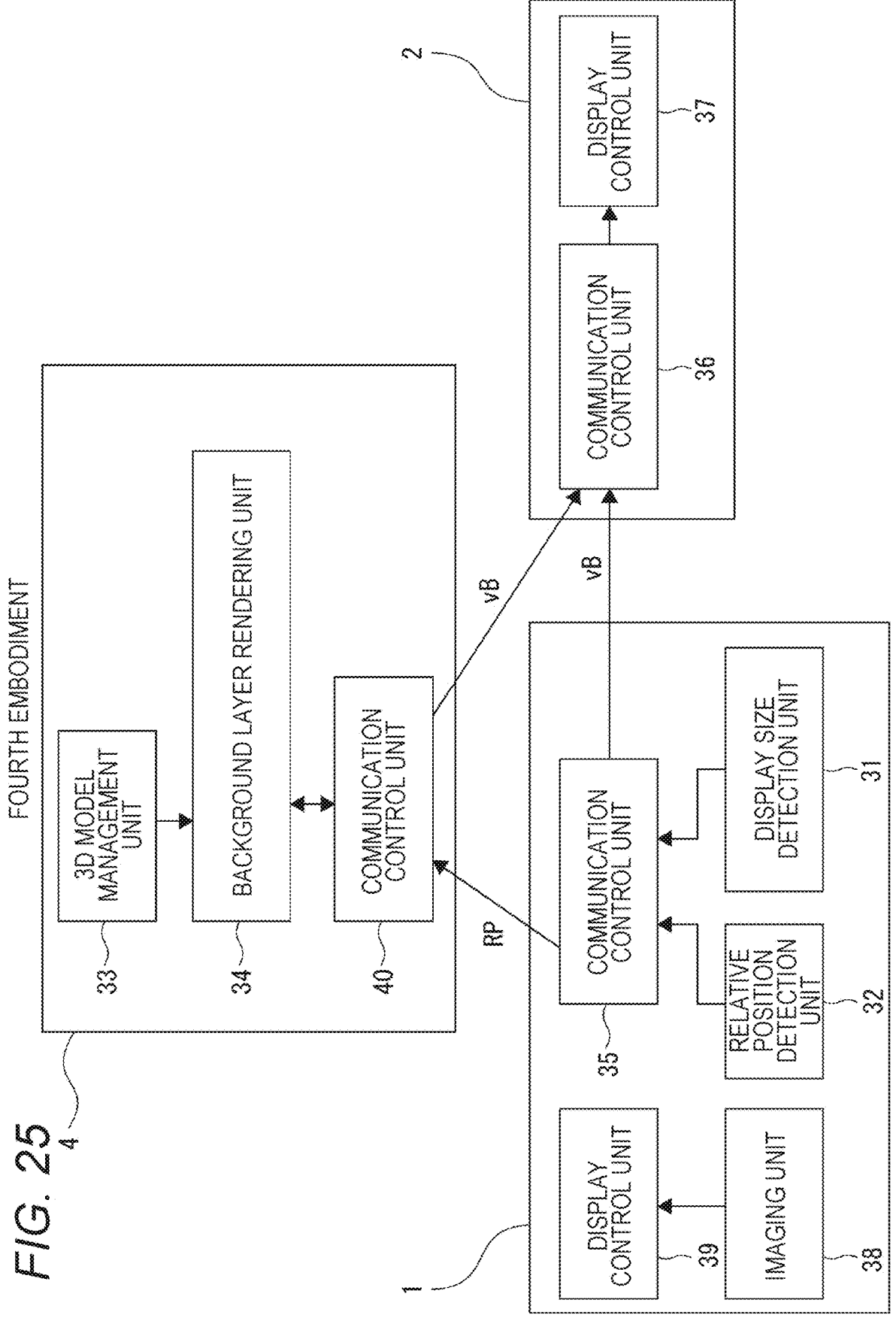
FIG. 25 is a block diagram illustrating a functional configuration according to the fourth embodiment.

FIG. 25 illustrates functional configurations of the terminal device 1, the display device 2, and the cloud server 4 in the fourth embodiment illustrated in FIG. 15.

Note that functions of the terminal device 1, the cloud server 4, and the display device 2 are similar to those in FIG. 23. However, the communication control unit 40 of the cloud server 4 maintains the communication connection with both the terminal device 1 and the display device 2 during the execution of the virtual production imaging.

Figure 26:
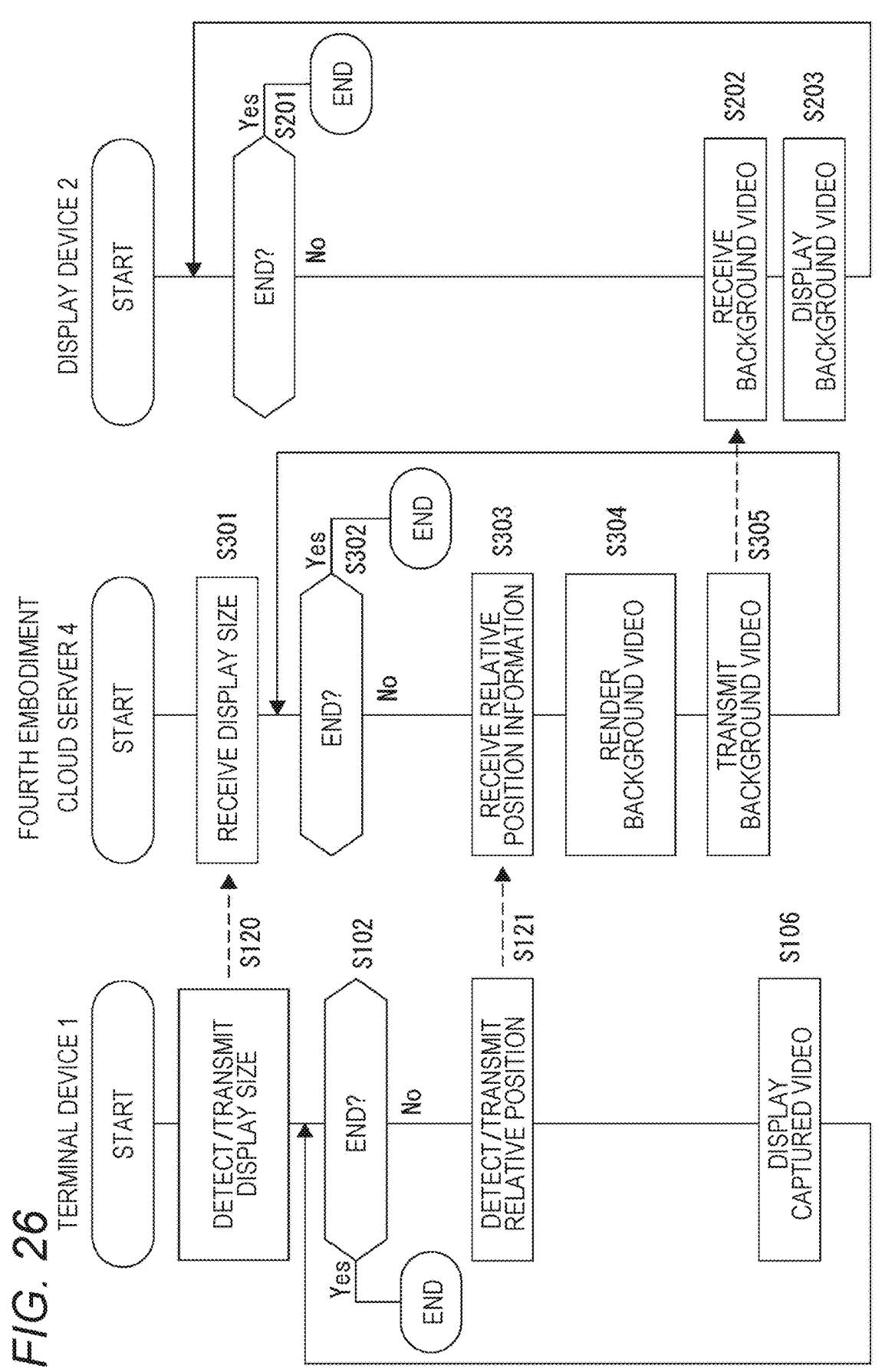
FIG. 26 is a flowchart illustrating a processing example according to the fourth embodiment.

In the fourth embodiment having a functional configuration in FIG. 25, the processing in FIG. 26 is performed by the terminal device 1, the cloud server 4, and the display device 2, so that the processing operation in FIG. 18 described above is executed as an entire system.

The terminal device 1 performs the processing of steps S120, S102, S121, and S106 in the same manner as in FIG. 24 described above. However, the terminal device 1 in this case does not need to perform the processing of receiving the background video vB from the cloud server 4 and transmitting the background video vB to the display device 2 as described in FIG. 24.

The cloud server 4 performs processing in steps S301, S302, S303, S304, and S305 as illustrated in FIG. 26. Although it is similar to the processing FIG. 24, the background video vB is transmitted to the display device 2 in step S305.

As illustrated in FIG. 26, the display device 2 performs processing of steps S201, S202, and S203. As a result, the display device 2 executes the operation of displaying the background video vB received from the cloud server 4.

8. Fifth Embodiment: Example of Using Cloud Server

Figure 27:
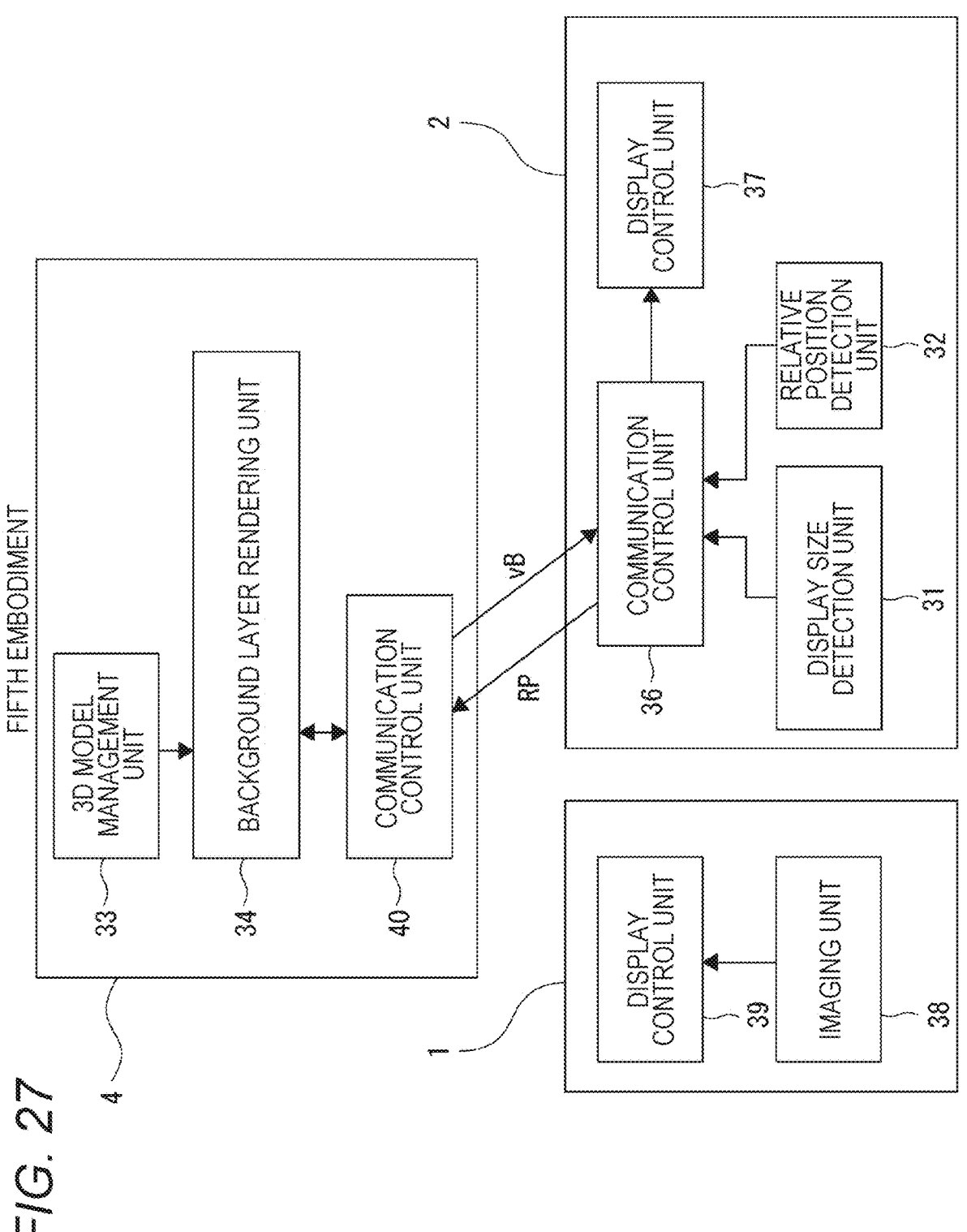
FIG. 27 is a block diagram illustrating a functional configuration according to the fifth embodiment.

FIG. 27 illustrates functional configurations of the terminal device 1, the display device 2, and the cloud server 4 in the fifth embodiment illustrated in FIG. 16.

The terminal device 1 includes the imaging unit 38 and the display control unit 39.

The display device 2 includes the display size detection unit 31, the relative position detection unit 32, the communication control unit 36, and the display control unit 37.

The cloud server 4 includes the 3D model management unit 33, the background layer rendering unit 34, and a communication control unit 40.

Figure 28:
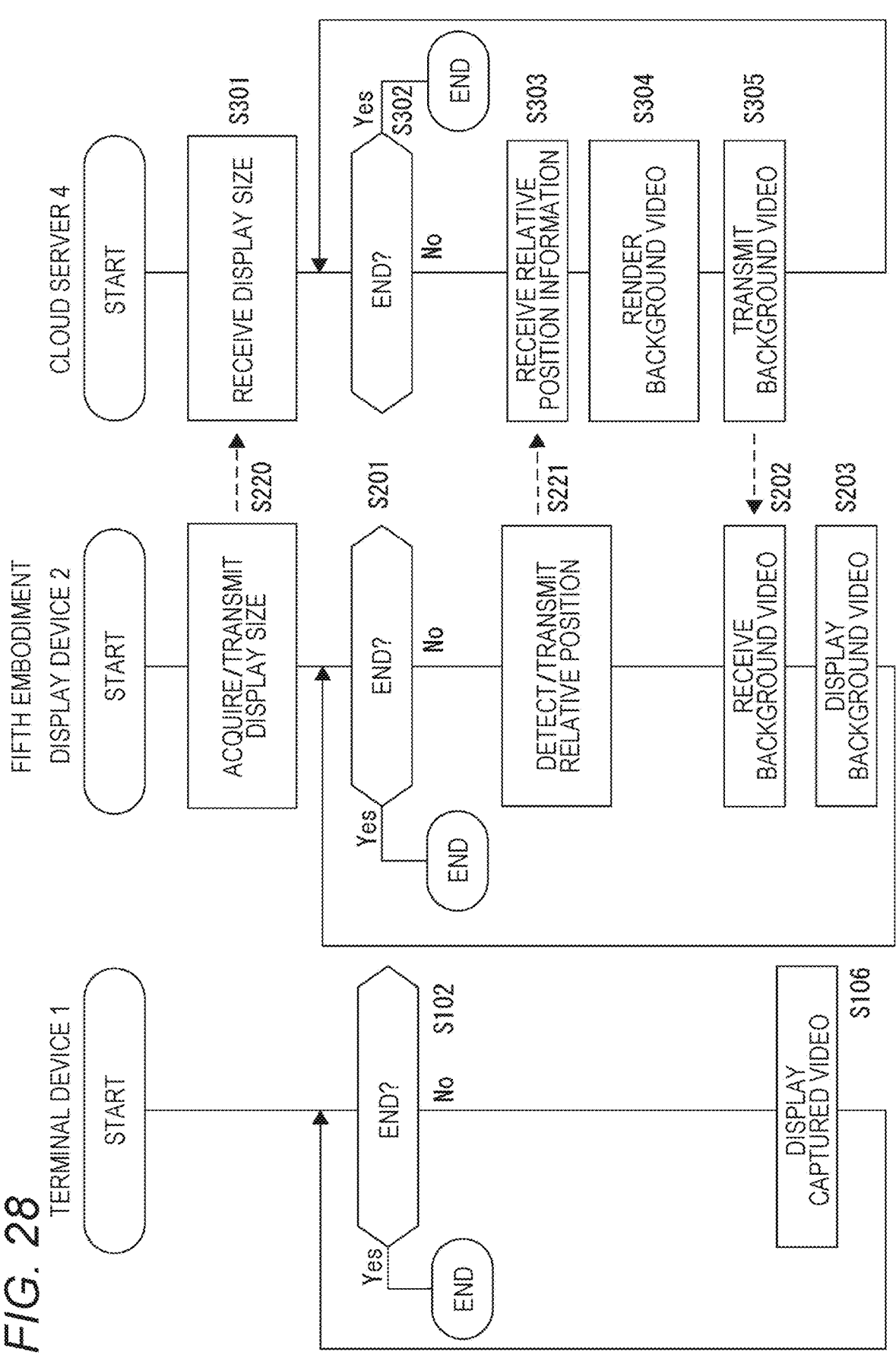
FIG. 28 is a flowchart illustrating a processing example according to the fifth embodiment.

In the fifth embodiment having such a functional configuration, the processing in FIG. 28 is performed by the terminal device 1, the cloud server 4, and the display device 2, so that the processing operation in FIG. 18 described above is executed as an entire system.

In this case, the terminal device 1 performs capturing and displaying of the captured video vC. Thus, the processing of displaying the captured video vC in step S106 is performed for each frame until the end of the processing in step S102.

In step S220, the display device 2 reads information regarding its own display size with the display size detection unit 31, and transmits the display size information to the cloud server 4.

With this, the cloud server 4 receives the display size information in step S301 and stores the display size information for subsequent rendering.

The display device 2 determines the end of the virtual production imaging in step S201, and repeats the processing in steps S221, S202, and S203 at each frame timing of the background video vB in a period in which the virtual production imaging is not ended.

In step S221, the terminal device 1 performs processing of performing the relative position detection with the relative position detection unit 32 and transmitting the detected relative position information RP to the cloud server 4 with the communication control unit 36.

After receiving the display size information in step S301, the cloud server 4 repeats the processing in steps S303, S304, and S305 during a period until the end is determined while performing the end determination in step S302.

In step S303, the cloud server 4 receives the relative position information RP from the display device 2 with the communication control unit 40.

In step S304, the cloud server 4 renders the 3D background model 5 read from the 3D model management unit 33 to generate the background video vB on the basis of the display size information and the relative position information RP with the background layer rendering unit 34.

Then, in step S305, the cloud server 4 performs processing of transmitting the background video vB to the display device 2 with the communication control unit 40.

When receiving the background video vB in step S202, the display device 2 performs processing of displaying the background video vB in step S203. As a result, the display device 2 executes the operation of displaying the received background video vB.

9. Sixth Embodiment: Example of Using Cloud
Server

Figure 29:
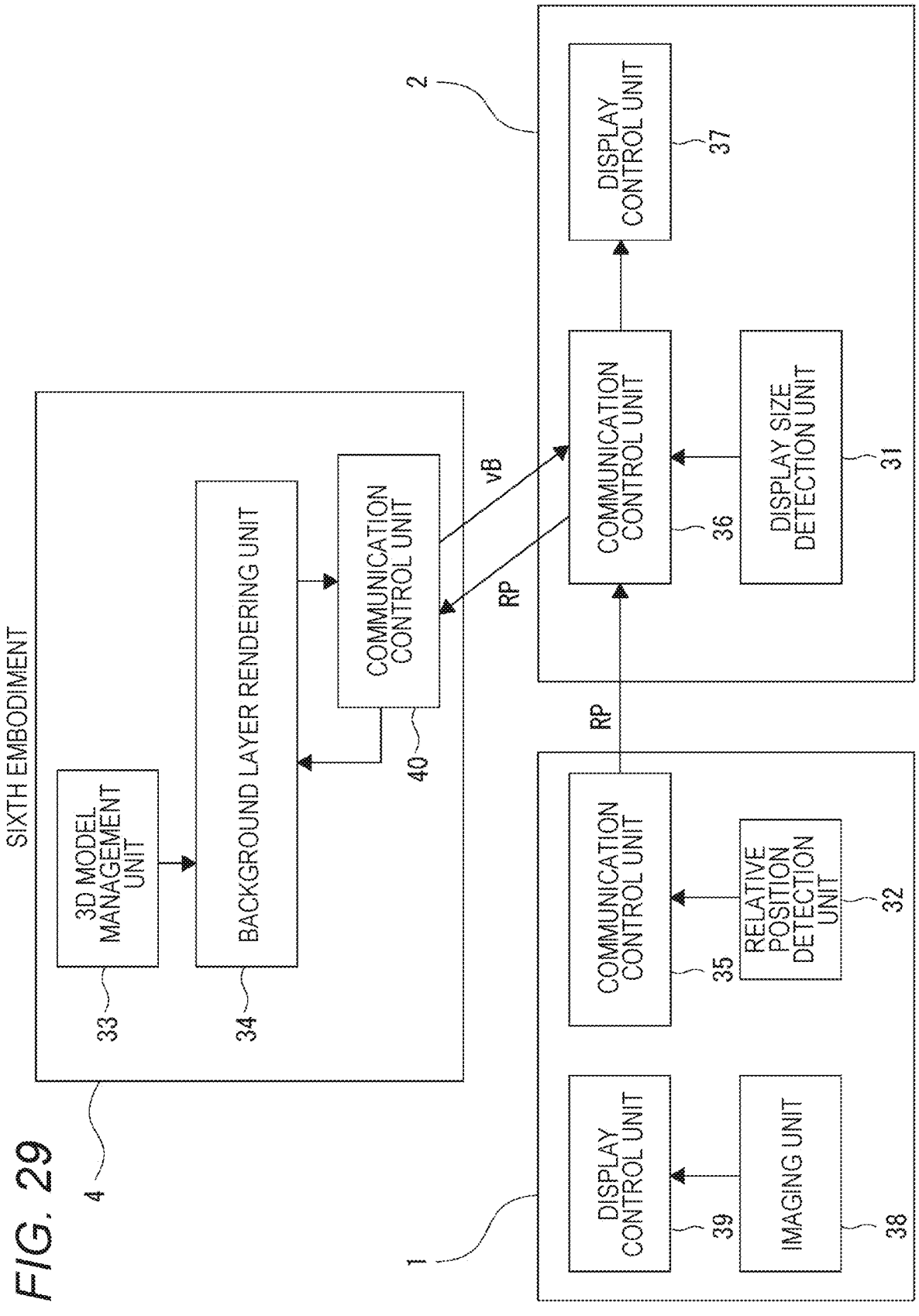
FIG. 29 is a block diagram illustrating a functional configuration according to the sixth embodiment.

FIG. 29 illustrates functional configurations of the terminal device 1, the display device 2, and the cloud server 4 in the sixth embodiment illustrated in FIG. 17.

The terminal device 1 includes the relative position detection unit 32, the communication control unit 35, the imaging unit 38, and the display control unit 39.

The display device 2 includes the display size detection unit 31, the communication control unit 36, and the display control unit 37.

The cloud server 4 includes the 3D model management unit 33, the background layer rendering unit 34, and a communication control unit 40.

Figure 30:
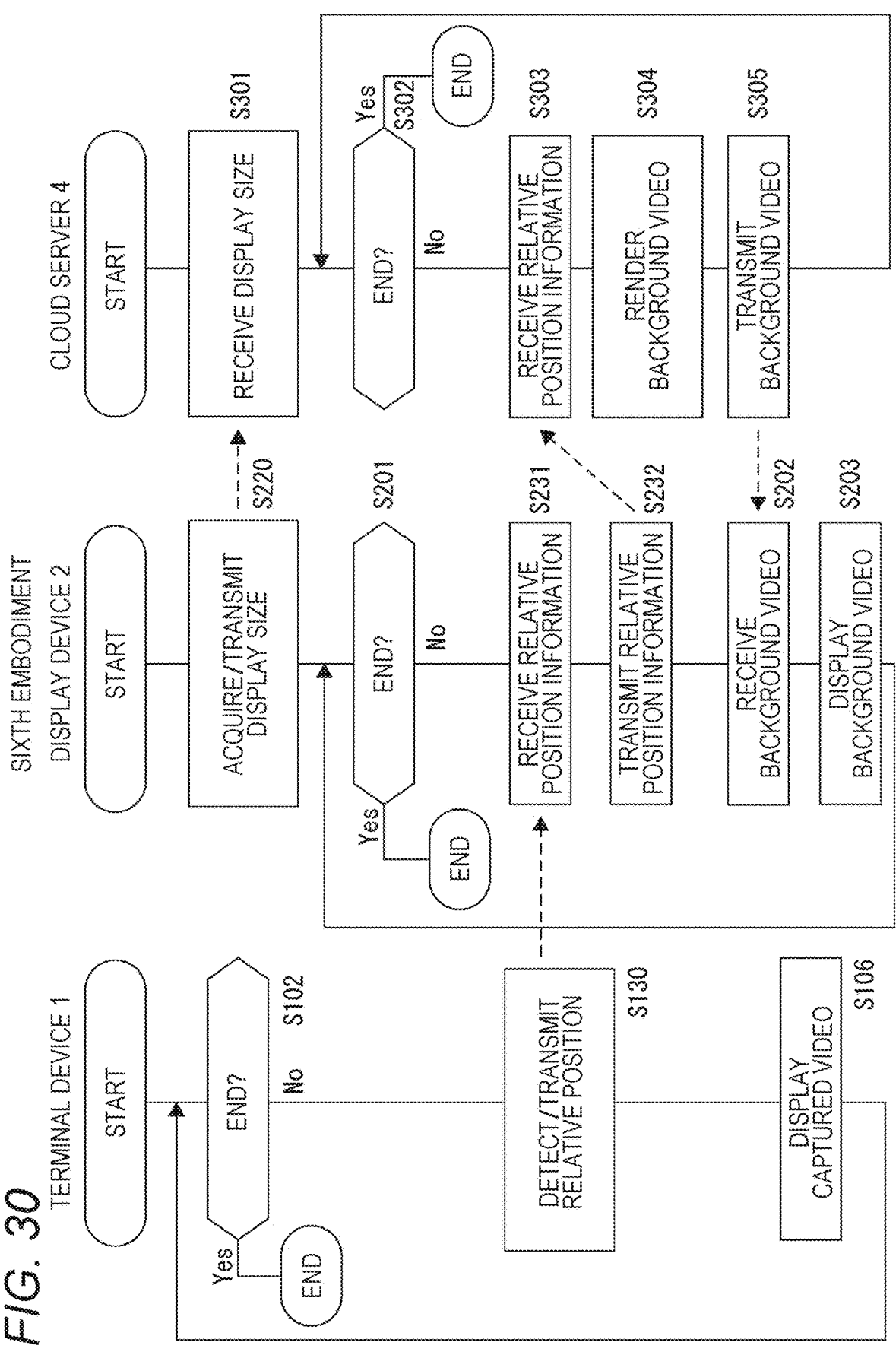
FIG. 30 is a flowchart illustrating a processing example according to the sixth embodiment.

In the sixth embodiment having such a functional configuration, the processing in FIG. 30 is performed by the terminal device 1, the cloud server 4, and the display device 2, so that the processing operation in FIG. 18 described above is executed as an entire system.

In this case, the terminal device 1 performs the relative position detection, and the capturing and displaying of the captured video vC. Thus, until the end in step S102, the relative position detection is performed in step S130 at each frame timing, the relative position information RP is transmitted to the display device 2, and the processing of displaying the captured video vC in step S106 is performed.

In step S220, the display device 2 reads its own display size information with the display size detection unit 31, and transmits the display size information to the cloud server 4.

With this, the cloud server 4 receives the display size information in step S301 and stores the display size information for subsequent rendering.

The display device 2 determines the end of the virtual production imaging in step S201, and repeats the processing in steps S231, S232, S202, and S203 at each frame timing of the background video vB in a period in which the virtual production imaging is not ended.

In step S231, the display device 2 receives the relative position information RP transmitted from the terminal device 1 with the communication control unit 36, and in step S232, performs processing of transmitting the relative position information RP to the cloud server 4.

The cloud server 4 repeats the reception of the relative position information RP in step S303, the rendering of the background video vB in step S304, and the transmission of the background video vB to the display device 2 in step S305 while performing the end determination in step S302 as in FIG. 28.

When receiving the background video vB in step S202, the display device 2 performs processing of displaying the background video vB in step S203. As a result, the display device 2 executes the operation of displaying the received background video vB.

10. Seventh Embodiment: Application of Virtual
Video Addition Technology

Next, an example in which the virtual video addition technology is applied will be described as the seventh embodiment. In particular, this is an example of imaging in cooperation of a background layer with an overlay layer.

In a case where the background video vB as the virtual video is captured, the display device 2 exists behind the object 10 as the foreground. Therefore, it is not possible to place the display device 2 in front of the object 10 to display a virtual video or to impart an effect to a video in front of the object 10. That is, the virtual video is only on the background side of the object 10.

Note that the "front side" of the object 10 refers to the terminal device 1 side as viewed from the object 10, that is, the device side that performs imaging.

In order to perform an effect of adding a virtual video in front of the object 10 in the captured video vC, it is necessary to set a layer in front of the object 10, perform drawing, and superimpose the layer on the captured video vC.

For example, when such a function is to be implemented in the imaging system 500 in FIG. 1, it is necessary to cooperate with each device in the imaging system 500, and a significant change is necessary for implementation in order to perform synchronization between devices, transfer of draw data, and the like. However, for example, when imaging and drawing are performed in the terminal device 1, equivalent processing can be performed without the processing across devices, and implementation is facilitated.

Then, as the seventh embodiment, a processing example in which the additional virtual video is added to the captured video vC in a case where the terminal device 1 is used as in the first to sixth embodiments will be described.

Figure 31:
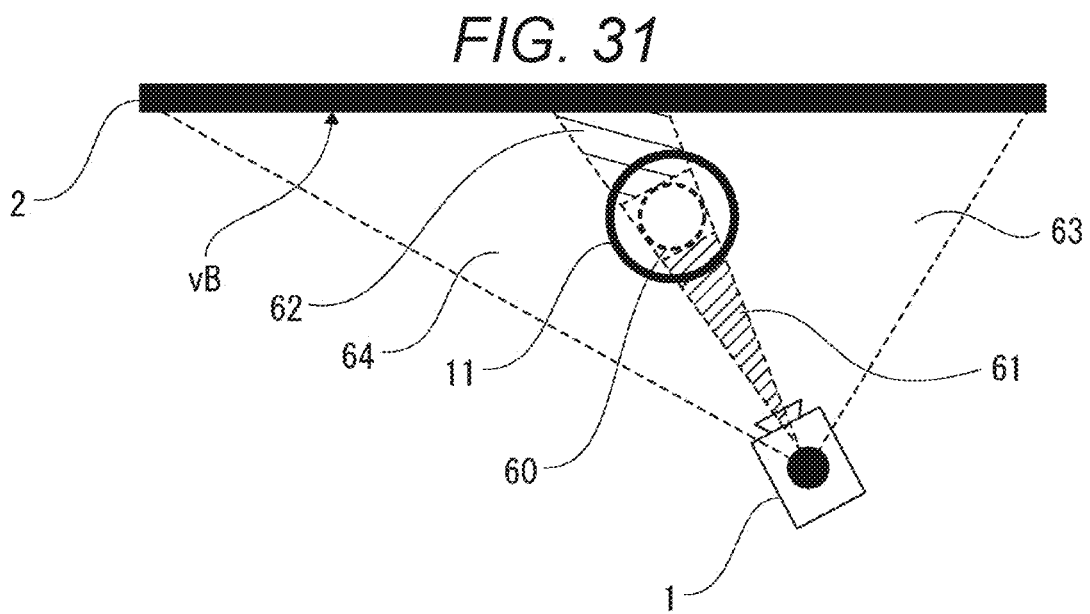
FIG. 31 is an explanatory diagram illustrating a region according to a seventh embodiment.

FIG. 31 illustrates a positional relationship between the terminal device 1 and the display device 2 and an object position 60. The object position 60 is a position where the object 10 is actually present. The terminal device 1 captures an image of the object 10 and the background video vB displayed on display device 2.

In this case, regarding the range imaged by the terminal device 1, a front region 61, a rear region 62, and the other regions 63 and 64 in FIG. 31 are considered.

The front region 61 is a region in front of the object 10 in the captured video vC obtained by the terminal device 1. The rear region 62 is a region behind the object 10. The other regions 63 and 64 are regions that are not in front of or behind the object 10.

Figure 32:
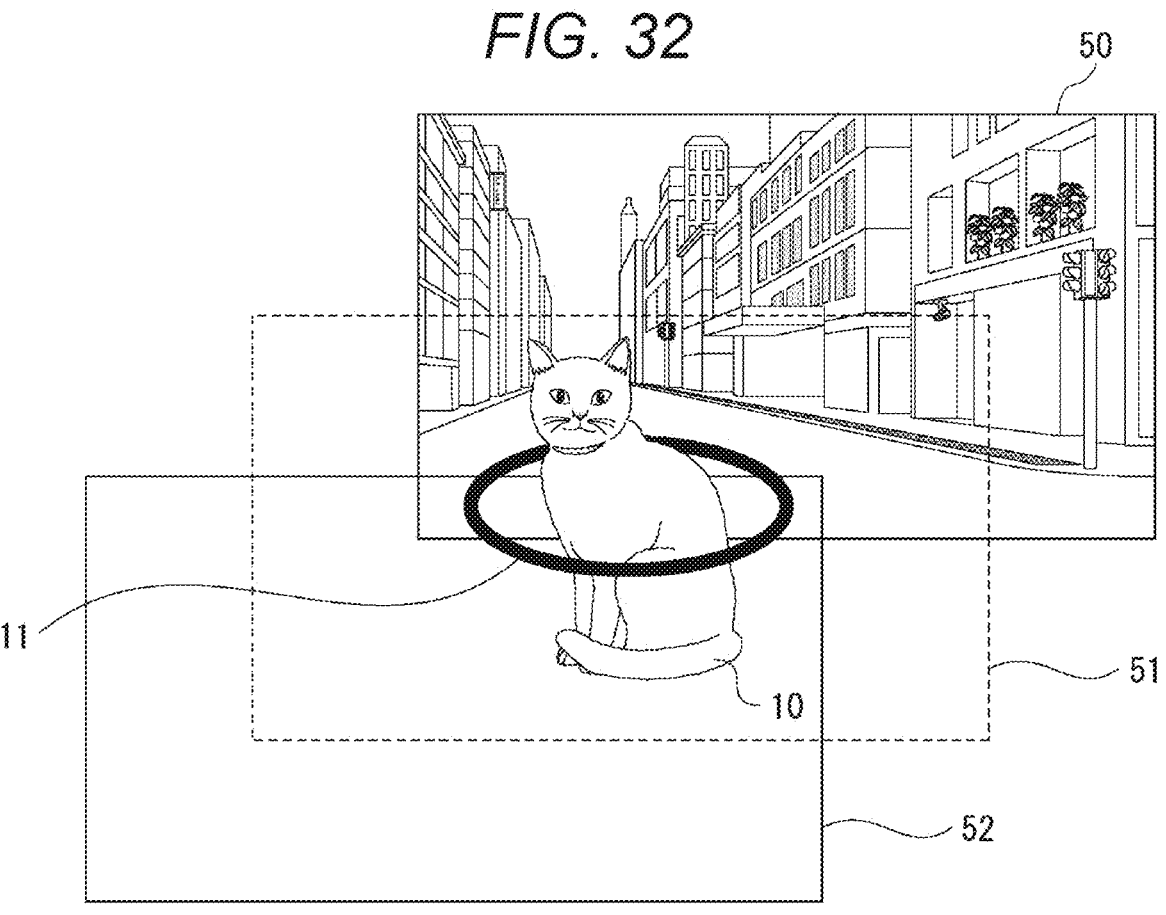
FIG. 32 is an explanatory diagram illustrating a layer configuration according to the seventh embodiment.

FIG. 32 illustrates an example in which a ring-shaped additional virtual video 11 is added to the object 10. For example, it is assumed that the video image of a ring surrounds the object 10. In a case where such an additional virtual video 11 is added, a background layer 50, a foreground 51, and an overlay layer 52 are considered.

The foreground 51 is a video of the object 10 itself. The background layer 50 is a layer of the background video vB displayed on the display device 2. In the imaging as illustrated in FIG. 31, the captured video vC includes the video of the background layer 50 and the video of the foreground 51.

Here, when the overlay layer 52 is set in front of the foreground, the ring-shaped additional virtual video 11 is drawn in the overlay layer 52, and is synthesized with the captured video vC, the captured video vC with the ring-shaped additional virtual video 11 added is obtained. That is, a video effect of adding the virtual video in front of the object 10 can be realized.

As described above, in the virtual production imaging, the virtual video is included as the background video vB behind the object 10, but the virtual video can also be added in front of the object 10 by applying the overlay layer 52.

At this time, for example, the ring-shaped additional virtual video 11 may be simply drawn in the overlay layer 52, but more preferably, the virtual video addition processing is performed by applying the front region 61, the rear region 62, and the other regions 63 and 64.

As can be seen from FIG. 31, the ring-shaped additional virtual video 11 is a video positioned across the front region 61, the rear region 62, and the other regions 63 and 64.

In this case, a portion belonging to the front region 61 in the additional virtual video 11 is drawn in the overlay layer 52. A portion belonging to the rear region 62 in the additional virtual video 11 is added to the background video vB. Portions belonging to the other regions 63 and 64 in the additional virtual video 11 may be drawn in the overlay layer 52, but are desirably added to the background video vB.

Since the portion positioned in the front region 61 in the additional virtual video 11 needs to appear in front of the object 10 in the captured video vC, the overlay layer 52 is used.

In a case where the overlay layer 52 is used, the additional virtual video 11 is rendered as the video of the overlay layer 52, and the rendered overlay layer 52 is synthesized with the captured video vC.

The portion positioned in the rear region 62 in the additional virtual video 11 is actually hidden by the object 10 in the captured video vC. In this sense, it is also conceivable that a portion belonging to the rear region 62 in the additional virtual video 11 is not drawn. However, this portion may be added to the background layer 50 in consideration of the reflection on the object 10. For example, this is for realizing natural reflection on a glossy surface of the object 10.

In a case where the additional virtual video 11 is added to the background layer 50, processing of adding the video in the additional virtual video 11 is also performed when the background video vB is rendered using the 3D background model.

The portions positioned in the other regions 63 and 64 in the additional virtual video 11 does not overlap the object 10 in the captured video vC. Therefore, the portions positioned in the other regions 63 and 64 may be drawn in the overlay layer 52 similarly to the front region 61. However, in consideration of the effect of natural reflection on the object 10, it is preferable to add the portions positioned in the other regions 63 and 64 to the background layer 50 at the time of rendering the background video vB.

As described above, the additional virtual video 11 can be added to the front side and rear side of the object 10 as the foreground 51 by using the background layer 50 and the overlay layer 52.

Figure 33:
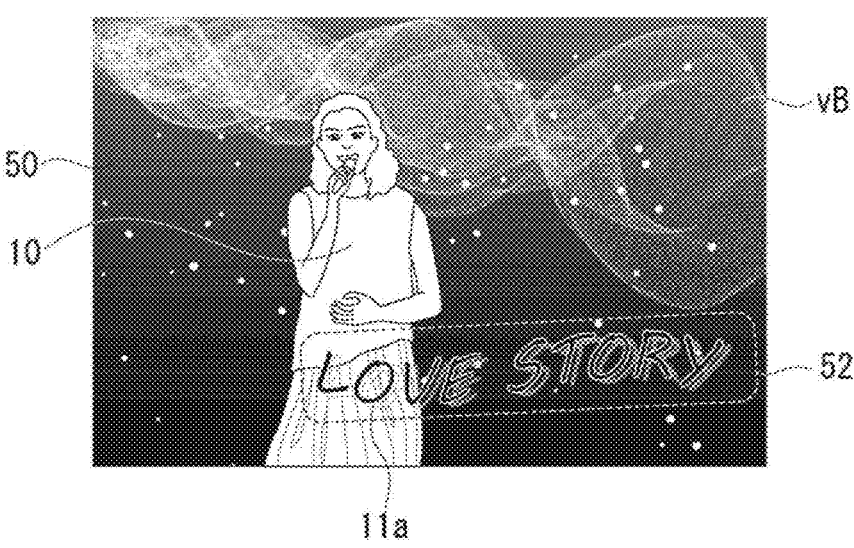
FIG. 33 is an explanatory diagram illustrating an additional virtual video according to the seventh embodiment.

FIG. 33 illustrates an example in which an additional virtual video 11a with characters is added to the background video vB and the captured video vC obtained by imaging the object 10. This is an example in which the additional virtual video 11a with characters is drawn in the overlay layer 52 and synthesized.

Figure 34:
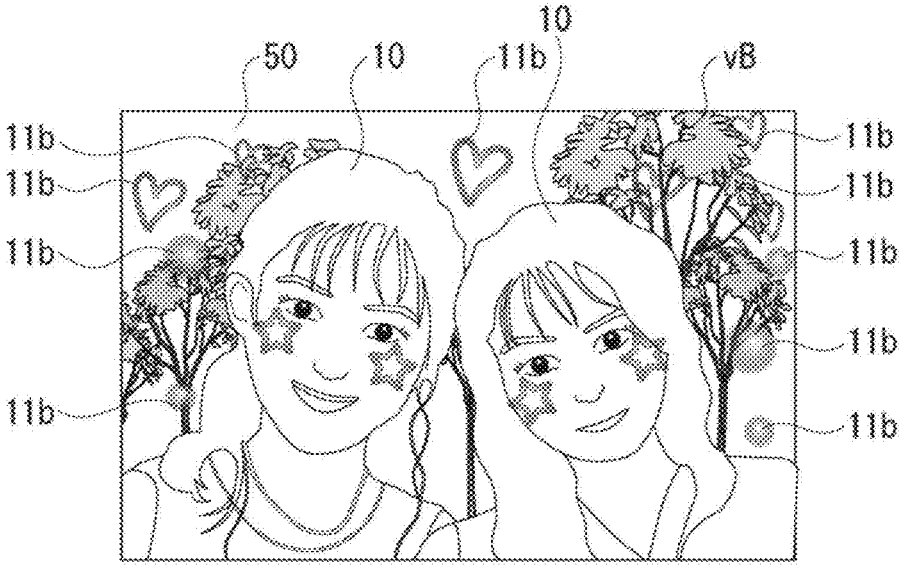
FIG. 34 is an explanatory diagram illustrating an additional virtual video according to the seventh embodiment.

FIG. 34 illustrates an example in which virtual heart-like or star-like additional virtual videos 11a and 11b are added to the background video vB and the captured video vC obtained by imaging the object 10. This is an example in which the additional virtual video 11a of the front region 61 is drawn in the overlay layer 52 from the position of a person of the object 10, and the additional virtual videos 11b of the rear region 62 and the other regions 63 and 64 are drawn in the background layer 50, that is, included in the background video vB.

In the virtual video addition processing of adding these additional virtual videos 11, face recognition or bone recognition of a finger or a body is performed for the captured video vC, and the additional virtual video 11 as an effect may be generated from the result thereof and applied to the background layer 50 and the overlay layer 52.

For example, the position of the additional virtual video 11 (11a, 11b) is set according to the position of the body of the person (object 10) in the image. In FIG. 33, the additional virtual video 11a overlaps the body of the object 10. Furthermore, FIG. 34 illustrates an example in which the additional virtual video 11a is positioned on the face (cheek) portion.

Figure 35:
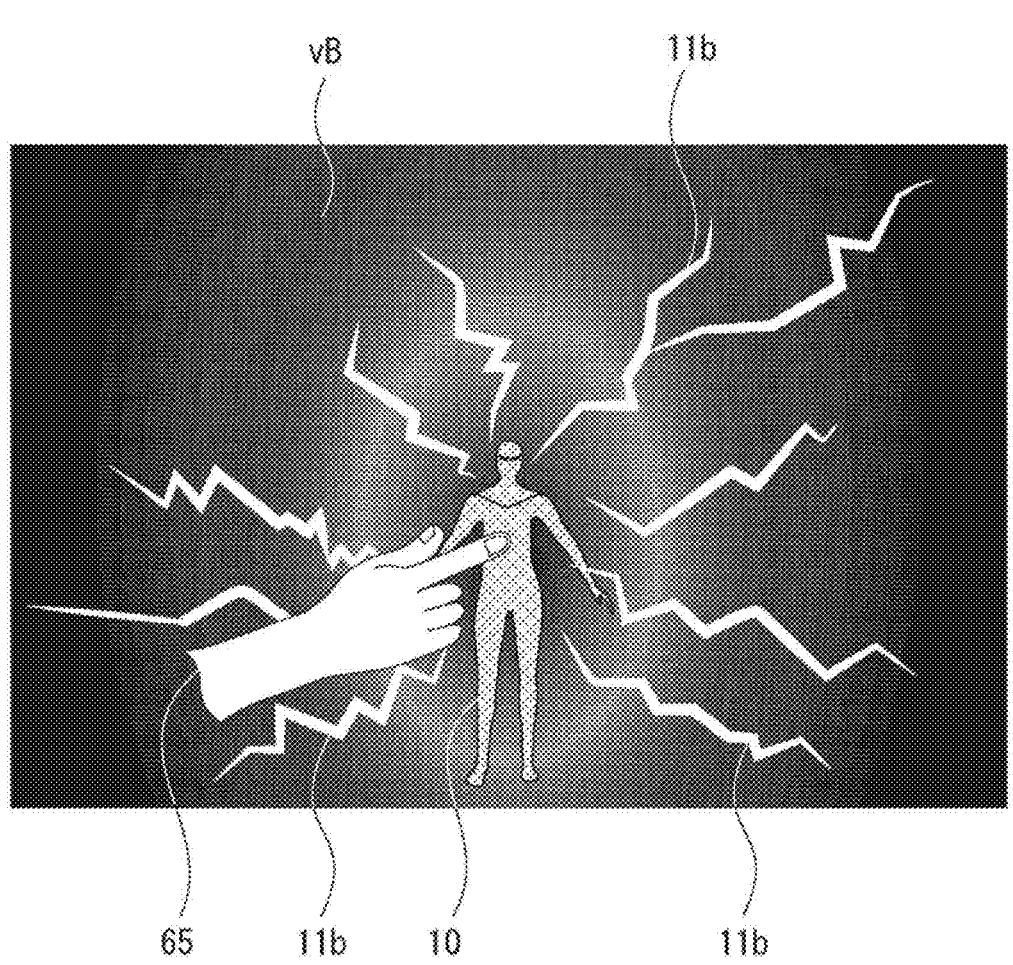
FIG. 35 is an explanatory diagram illustrating an additional virtual video according to the seventh embodiment.

Furthermore, it is also possible to designate a position and timing of activation of an effect through a touch panel operation. For example, FIG. 35 illustrates an example in which the user touches the screen 1a of the terminal device 1 while performing imaging, and thus the additional virtual video 11b is added to the background layer 50.

This is an example in which the additional virtual video 11b such as lightning is added to the background video vB of the background layer 50 from the position designated by the touch at the timing of the touch of a finger 65 of the user.

Of course, it is also possible to add the additional virtual video 11 using the overlay layer 52 or to add the additional virtual video 11 across both the background layer 50 and the overlay layer 52 from the position designated by the touch or the like.

Figure 36:
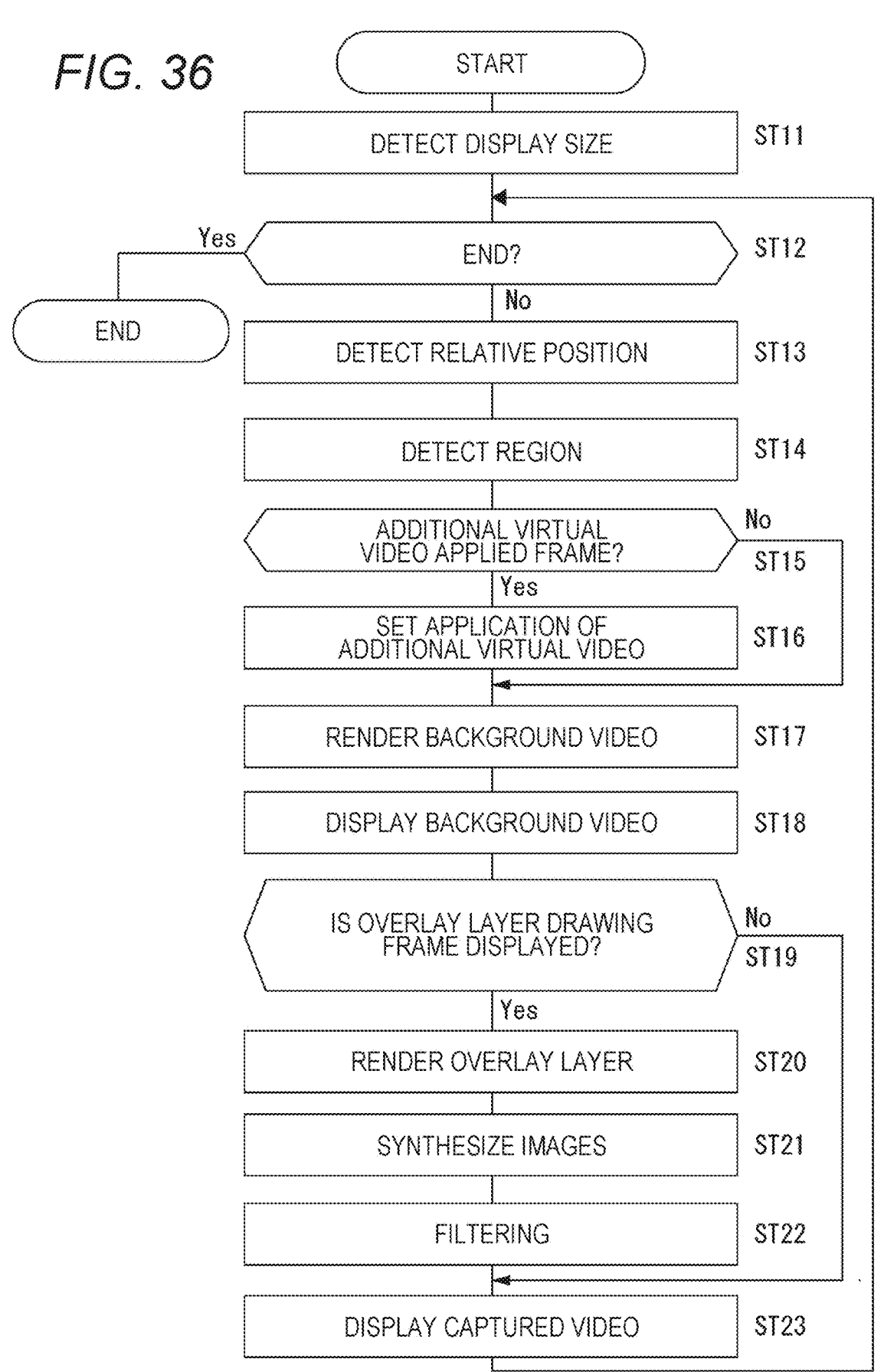
FIG. 36 is a flowchart illustrating overall processing according to the seventh embodiment.

For example, a flow of processing in a case where the processing of adding the additional virtual video 11 as described above is performed will be described with reference to FIG. 36. Each step of FIG. 36 is processing executed by any device in the system configuration including the terminal device 1 and the display device 2, or including the cloud server 4 in addition to the terminal device 1 and the display device 2 as described in the first to sixth embodiments. That is, similarly to FIG. 18, the processing procedure in the entire system has been described.

In a case where the imaging is started, any device in the system performs the display size detection in step ST11. That is, information regarding the size of the screen 2a of the display device 2 is detected. The size information is acquired by the device that performs rendering.

In step ST12, the imaging end determination is performed. For example, it is determined that the imaging ends through an imaging end operation by the user of the terminal device 1. When it is determined that the processing ends, each device ends the processing of FIG. 36.

The processing in step ST13 to step ST23 is repeated at each frame timing of the background video vB and at each frame timing of the captured video vC until it is determined that the imaging ends.

In step ST13, relative position detection is performed by any device (the terminal device 1 or the display device 2) in the system. The relative position information RP obtained by detection is acquired by a device that performs rendering.

In step ST14, for example, the terminal device 1 detects the region. This is processing of detecting the front region 61, the rear region 62, and the other regions 63 and 64 from the captured video vC of the current frame according to the position of the object 10 in the captured video vC.

In step ST15, any device in the system determines whether or not a frame that renders the background video vB this time is a frame to which the additional virtual video 11 is applied.

The effect start timing when the additional virtual video 11 is applied is designated by, for example, a user's touch operation. The effect start timing when the additional virtual video 11 is applied may be instructed by a predetermined user operation other than the touch operation.

Alternatively, the image recognition processing may be automated processing in which an effect in which the additional virtual video 11 is applied is activated when a specific subject is detected. For example, this is processing of adding a predetermined additional virtual video 11 when a smile is detected.

Furthermore, as a time stamp of the video content, processing of activating the effect for the additional virtual video 11 may be performed at a preset time.

The effect with the additional virtual video 11 is activated in a certain period by the manual operation or the automatic processing. In this case, in step ST15, it is determined whether or not the current timing is a timing when the processing of adding the additional virtual video 11 to one or both of the background layer 50 and the overlay layer 52 is performed.

When it is not currently the timing of the frame for activating the effect of the additional virtual video 11, the processing proceeds from step ST15 to step ST17.

In this case, for example, the background video vB is rendered using the 3D background model in step ST17 similarly to the first embodiment.

That is, the rendering is performed on the basis of the display size information and the relative position information RP by using the 3D background model, and the background video vB is generated.

When it is currently the timing to activate the effect of the additional virtual video 11, the processing proceeds from step ST15 to step ST16.

In step ST16, application setting of the additional virtual video 11 is performed in any device in the system. Specifically, one or both of the application setting of the additional virtual video 11 for the background layer 50 and the application setting of the additional virtual video 11 for the overlay layer 52 are performed.

For example, in a case where all or a part of the additional virtual video 11 is disposed in the rear region 62 or the other regions 63 and 64, the additional virtual video 11 is included in the background video vB rendered in step ST17 this time. In this case, in step ST16, setting for applying the additional virtual video 11 to the background layer 50 is performed. That is, when the background video vB is rendered using the 3D background model, the additional virtual video 11 is added to generate the background video vB.

The position of the additional virtual video 11 on the screen in the background video vB is also set. For example, the position of the additional virtual video 11 on the screen is set according to the touch position and a result of the object detection such as recognition or bone recognition of a finger or a body.

That is, specifically, the setting of the range to be drawn in the image content as the additional virtual video 11 to be added to the background layer 50 and the additional virtual video 11 corresponding to the result of the region detection in step ST14, and the designation of the position on the screen according to the operation or the image recognition are performed.

Furthermore, for example, in a case where the entire or a part of the additional virtual video 11 is disposed in the front region 61, the additional virtual video 11 is added to the frame of the captured video vC corresponding to the frame of the current background video vB by using the overlay layer 52. Therefore, in step ST16, the setting of the range to be drawn in the image content as the additional virtual video 11 to be added to the overlay layer 52 and the additional virtual video 11 corresponding to the result of the region detection in step ST14, and the designation of the position on the screen according to the operation or the image recognition are performed.

In a case where the application setting of the additional virtual video 11 for the background layer 50 is performed in step ST16, the background video vB is rendered using the 3D background model by any device in the system in step ST17, and at that time, the additional virtual video 11 is added to the background video vB.

That is, the rendering is performed on the basis of the display size information and the relative position information RP by using the 3D background model, and the background video vB to which the additional virtual video 11 is added is generated according to the setting of step ST16.

Then, in step ST18, the display device 2 performs processing of displaying the background video vB obtained by rendering.

In the terminal device 1, the processing of displaying the captured video on the screen 1*a* is performed while the background video vB of the display device 2 and the object 10 are captured, and at that time, the additional virtual video 11 using the overlay layer 52 may be added.

In step ST19, the terminal device 1 determines whether or not the frame of the current captured video vC is a frame in which the additional virtual video 11 is drawn using the overlay layer 52.

In a case where the application setting of the additional virtual video 11 in the overlay layer 52 is not performed for the current frame in step ST16, the terminal device 1 proceeds from step ST19 to step ST23, and performs processing of displaying the frame of the current captured video vC on the screen 1*a* as it is.

This is a case where the frame of the current captured video vC is a frame in a period in which the effect of the additional virtual video 11 is not activated, or a case where even in the activation period, the entire additional virtual video 11 is added to the background layer 50 and the overlay layer 52 is not used.

On the other hand, in a case where the frame of the current captured video vC is a frame set in step ST16 when the additional virtual video 11 is drawn using the overlay layer 52, the terminal device 1 proceeds from step ST19 to step ST20 and renders the overlay layer 52. That is, the rendering is performed using the display size information, the relative position information RP, the 3D model or character image applied as the additional virtual video 11, and the video of the overlay layer 52 is generated.

In step ST21, the terminal device 1 performs synthesis processing of the overlay layer 52 on the captured video vC. Thus, the additional virtual video 11 including the front region 61 of the object 10 is added to the captured video vC.

In step ST22, the terminal device 1 can apply the filter to the entire video of the synthesized captured video vC. For example, filter processing as a type of image effect can be performed by applying a painting filter, an animation filter, or the like.

Then, in step ST23, the terminal device 1 displays the captured video vC on the screen 1*a*.

Through the above-described processing, the user can visually recognize the captured video vC to which the effect of the additional virtual video 11 is applied in real time during the imaging.

Note that the filter processing in step ST22 may be performed in a case where the overlay layer 52 is not synthesized.

It is also possible to perform the virtual video addition processing in which the virtual production imaging is performed by performing the above-described flow processing in the entire system and the additional virtual video 11 is added to the front side and rear side of the object 10.

A specific functional configuration for executing such processing and a processing example of each device will be described.

Figure 37:
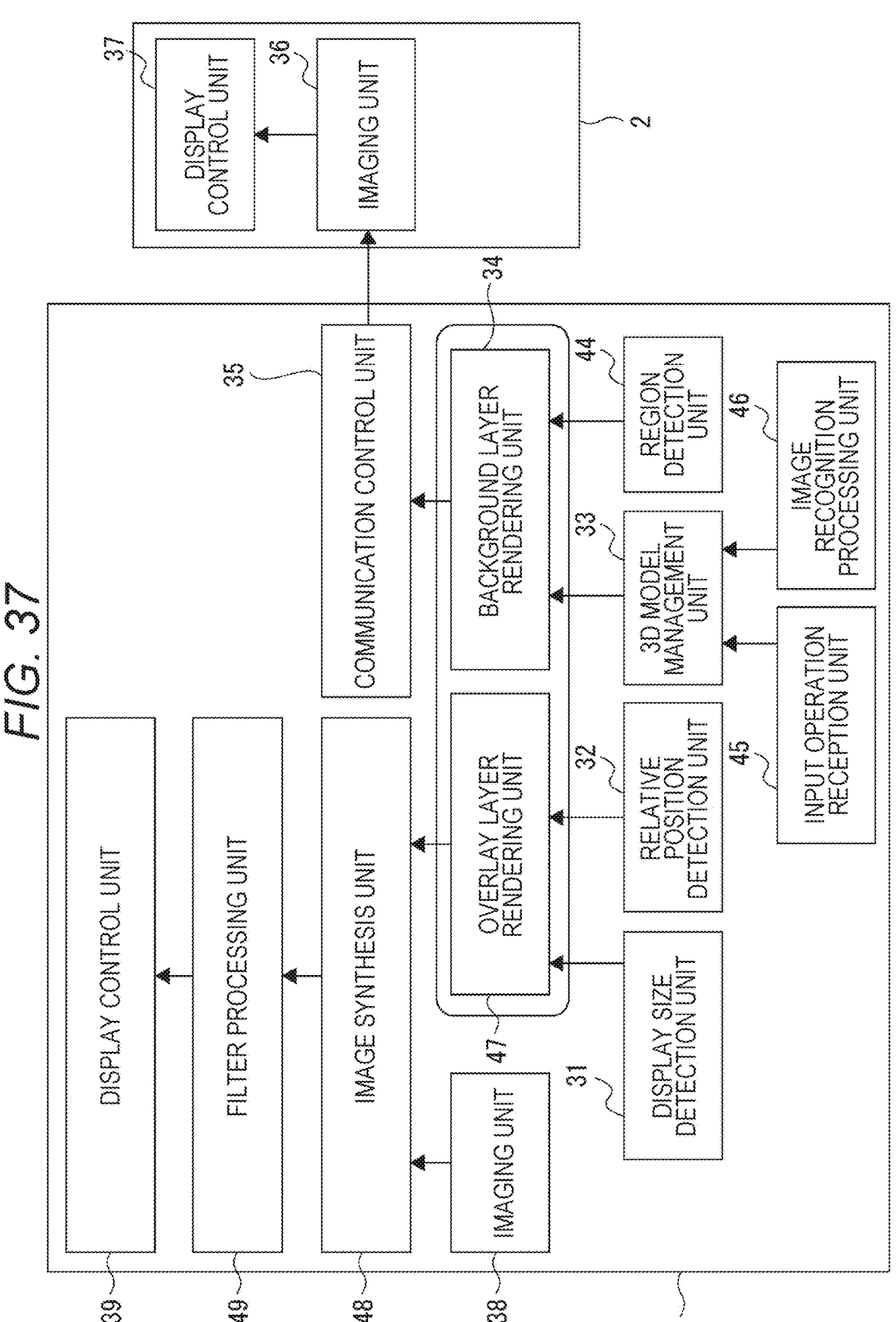
FIG. 37 is a block diagram illustrating a functional configuration according to the seventh embodiment.

FIG. 37 illustrates an example of a case where the terminal device 1 and the display device 2 are included as in the first embodiment of FIG. 19.

The terminal device 1 includes the display size detection unit 31, the relative position detection unit 32, the 3D model management unit 33, the background layer rendering unit 34, the communication control unit 35, the imaging unit 38, and the display control unit 39. These are similar to the example of FIG. 19, but the terminal device 1 further includes a region detection unit 44, an input operation reception unit 45, an image recognition processing unit 46, an overlay layer rendering unit 47, an image synthesis unit 48, and a filter processing unit 49.

The region detection unit 44 detects the front region 61, the rear region 62, and the other regions 63 and 64, which are described with reference to FIG. 31, for each frame of the captured video vC. For example, the region detection unit 44 follows an image as the object 10 by image recognition to determine the object position 60, and detects the front region 61, the rear region 62, and the other regions 63 and 64 on the basis of the object position 60. Note that, for example, when the object 10 is an object that does not move, after the object position 60 is once detected, the front region 61, the rear region 62, and the other regions 63 and 64 of each frame can be detected on the basis of the relative position information RP.

The region detection unit 44 can be implemented as a processing function of the CPU 71 or the video processing unit 85 by using, for example, information from the camera unit 87, the sensor unit 86, and the communication unit 80 in the information processing device 70.

The input operation reception unit 45 is a function of detecting a user operation related to the virtual video addition processing, such as a user's touch operation. For example, a touch panel is provided on the screen 1a, and the input operation reception unit 45 detects the touch operation with the touch panel.

In a case where the effect of the additional virtual video 11 is activated by the user's touch operation, the input operation reception unit 45 notifies the 3D model management unit 33 of operation information. The input operation reception unit 45 can be implemented by the CPU 71 or the video processing unit 85 that detects an input by the input unit 76 in the information processing device 70.

The image recognition processing unit 46 performs recognition processing on the subject image in the captured video vC. The recognition processing result is notified to the 3D model management unit 33. The image recognition processing unit 46 can be implemented by the video processing unit 85 that analyzes the video captured by the camera unit 87 in the information processing device 70.

When the operation information from the input operation reception unit 45 and the recognition processing result from the image recognition processing unit 46 are transmitted, the 3D model management unit 33 can set the activation timing of the effect of adding the additional virtual video 11 and the position on the screen, and can set the content of the additional virtual video 11. That is, the 3D model management unit 33 can perform application setting of the effect of adding the additional virtual video 11 described in step ST16 of FIG. 36.

The overlay layer rendering unit 47 is a function of rendering the overlay layer 52, and is implemented by processing of the video processing unit 85 and the CPU 71 in the information processing device 70.

The display size information from the display size detection unit 31, the relative position information RP from the relative position detection unit 32, the 3D model from the 3D model management unit 33, and the detection information for the front region 61, the rear region 62, and the other regions 63 and 64 from the region detection unit 44 are supplied to the overlay layer rendering unit 47 and the background layer rendering unit 34. Thus, the background layer rendering unit 34 can perform rendering in step ST17 of FIG. 36, and the overlay layer rendering unit 47 can perform rendering in step ST20.

The image synthesis unit 48 performs processing of synthesizing the captured video vC obtained by the imaging unit 38 with the video of the overlay layer 52 rendered by the overlay layer rendering unit 47, and adds the additional virtual video 11 to the front region of the object 10.

The filter processing unit 49 performs filter processing as an effect on the video synthesized by the image synthesis unit 48.

For example, the image synthesis unit 48 and the filter processing unit 49 are functions of being implemented by the video processing unit 85 in the information processing device 70.

In the example of FIG. 37, the functional configuration on the display device 2 side is similar to that of FIG. 19, and includes the communication control unit 36 and the display control unit 37.

Assuming such a functional configuration, a specific processing of the seventh embodiment, that is, a processing example in a case where the above-described processing of FIG. 36 is performed in the entire system will be described with reference to FIG. 38.

When the imaging for virtual production is started by a user operation or automatic start control, the terminal device 1 detects the display size of the display device 2 with the display size detection unit 31 in step S101.

Then, the terminal device 1 determines the end of the virtual production imaging in step S102, and repeats processing in steps S103 to S106 at each frame timing of the captured video vC in a period in which the virtual production imaging is not ended.

In step S103, the terminal device 1 performs relative position detection with the relative position detection unit 32.

In step S150, the terminal device 1 detects the front region 61, the rear region 62, and the other regions 63 and 64 for the frame of the current captured video vC with the region detection unit 44.

In step S151, the terminal device 1 determines whether or not it is the timing of the frame to which the additional virtual video 11 is currently applied. Then, at this timing, in step S152, the application setting of the additional virtual video 11 is performed on one or both of the background layer 50 and the overlay layer 52. This is processing in steps ST15 and ST16 of FIG. 36, and the 3D model management unit 33 performs application setting on the basis of information from the input operation reception unit 45 and the image recognition processing unit 46.

In step S153, the terminal device 1 renders the 3D background model 5 read from the 3D model management unit 33 to the offscreen buffer with the background layer rendering unit 34. In this case, in a case where the application setting of the additional virtual video 11 to the background layer 50 has been made, the background video vB in a state in which the additional virtual video 11 is added is generated on the video of the 3D background model 5.

In step S105, the terminal device 1 performs processing of transmitting the background video vB in the offscreen buffer to the display device 2 with the communication control unit 35.

On the display device 2 side, after the imaging for virtual production is started, the processing in steps S202 and S203 is repeated for each frame until the end of the processing while determining the end in step S201.

In a period until the end of the processing, in step S202, the display device 2 receives the background video vB from the terminal device 1 with the communication control unit 36.

In step S203, the display device 2 performs processing of displaying the received background video vB on the screen 2*a* with the display control unit 37.

Therefore, in a case where the additional virtual video 11 is included in the background video vB, the display device 2 displays a state in which the additional virtual video 11 is added to the background layer 50.

Although the terminal device 1 images the display device 2 and the object 10 with the imaging unit 38, in step S154, it is determined whether or not the frame of the current captured video vC is set to add the additional virtual video 11 to the overlay layer 52.

In a case where the additional virtual video 11 is not added to the overlay layer 52, the terminal device 1 proceeds to step S106, and the display control unit 39 performs processing of displaying the captured video vC of each frame obtained by the imaging on the screen 1*a*.

In a case where the additional virtual video 11 is added to the overlay layer 52, the terminal device 1 renders the overlay layer 52 with the overlay layer rendering unit 47 in step S155.

Then, in step S156, the terminal device 1 synthesizes the rendered overlay layer 52 with the frame of the current captured video vC with the image synthesis unit 48.

Moreover, the terminal device 1 executes the filtering processing with the filter processing unit 49 in step S157 according to the setting.

Then, the terminal device 1 proceeds to step S106, and performs processing of displaying the captured video vC subjected to the synthesis processing on the screen 1*a* with the display control unit 39.

Therefore, the user can visually recognize the captured video vC to which the additional virtual video 11 is added in real time on the screen 2*a*.

As described above, in the seventh embodiment, in virtual production imaging, the imaging in cooperation of the background layer 50 with the overlay layer 52 can be executed.

Furthermore, the user can designate the position and timing of effect activation through the touch panel operation.

Figure 38:
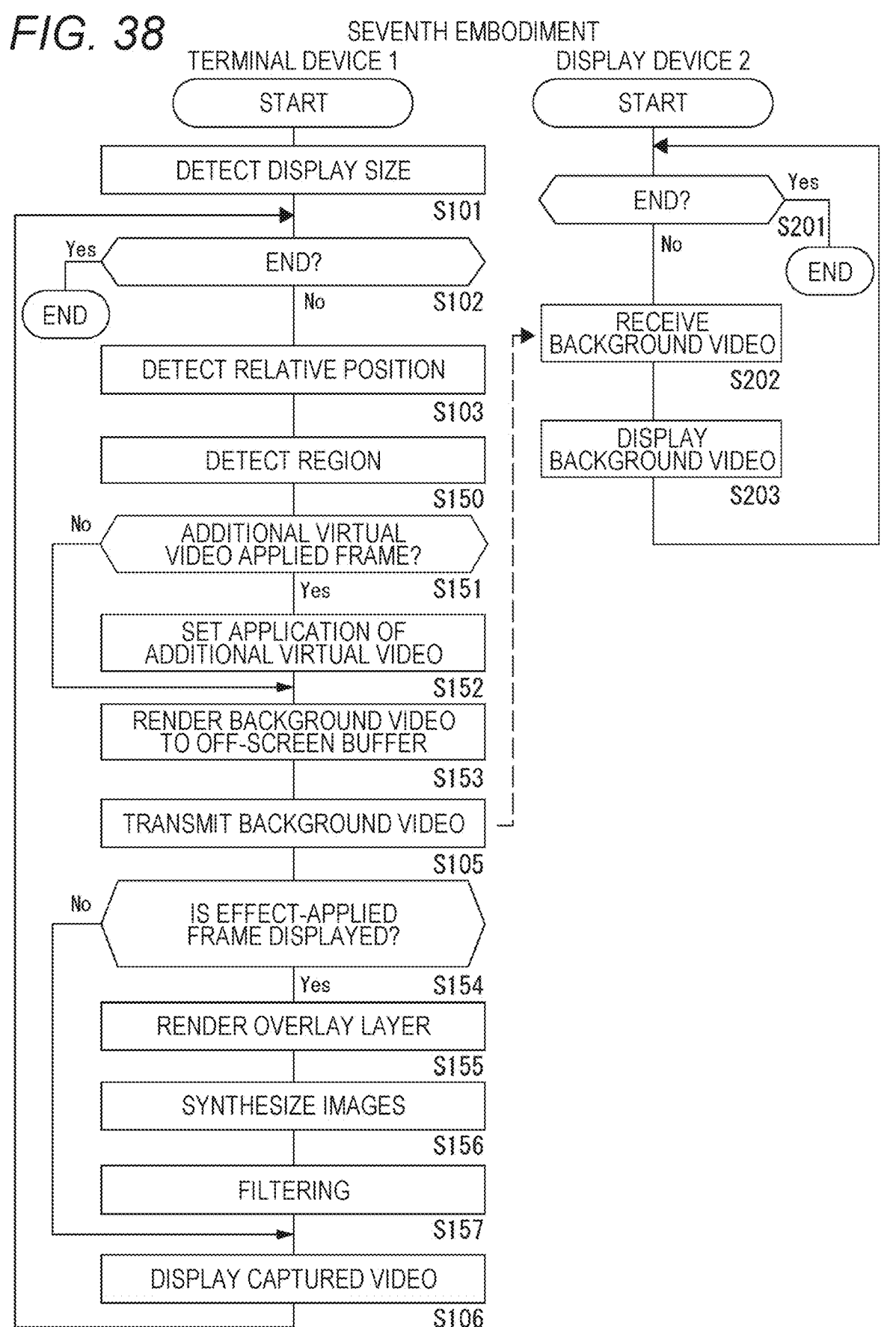
FIG. 38 is a flowchart illustrating processing according to the seventh embodiment.

By the way, although FIGS. 37 and 38 have been described in accordance with the system configuration of the first embodiment in FIG. 12, the processing of FIG. 36 can also be applied to the case of each system configuration example in FIGS. 13 to 17.

For example, the background layer rendering unit 34 that adds the additional virtual video 11 to the background layer 50 may be provided on the display device 2 side in addition to the terminal device 1 side (see FIG. 21), or may be provided on the cloud server 4 side (see FIGS. 23, 25, 27, and 29).

The overlay layer rendering unit 47 and the image synthesis unit 48 may be provided in the cloud server 4 in addition to the terminal device 1, and the terminal device 1 and the cloud server 4 cooperate to perform the processing of the overlay layer 52 on the captured video vC.

11. Summary and Modification Example

According to the above-described embodiments, the following effects can be obtained.

The information processing device 70 according to the embodiment includes the video processing unit 85 having a function of the background layer rendering unit 34. In a case where the object 10 and the background video vB displayed on the display device 2 are captured by the terminal device 1 in a state in which the display device 2 and the terminal device 1 having an imaging function are associated with each other, the video processing unit 85 is a function of rendering the 3D model on the basis of the relative position information RP between the display device 2 and the terminal device 1 and generating the background video vB displayed on the display device 2.

For example, the user captures the background video vB displayed on the display device 2 and the image of the object 10 by using the display device 2 such as a television receiver at home and the terminal device 1 such as a smartphone. At this time, the terminal device 1 and the display device 2 are associated with each other as targets for relative position detection and the relative position detection is performed, so that the background video vB corresponding to the viewpoint direction from the terminal device 1 can be generated with respect to the display device 2 and displayed on the display device 2. Therefore, for example, the imaging to which the virtual production technology is applied can be easily performed at home or the like other than in a dedicated studio.

Such an information processing device 70 can be considered as a processor provided in the terminal device 1 or the terminal device 1 itself including such a processor. Alternatively, the information processing device 70 can be considered as a processor provided in the display device 2 or the display device 2 itself including such a processor. Moreover, the information processing device 70 can be considered as a device separate from the display device 2 and the terminal device 1, for example, a processor provided in the cloud server 4, or a device itself such as the cloud server 4 including such a processor.

In the first embodiment, the video processing unit 85 (the background layer rendering unit 34 or the communication control unit 35) of the terminal device 1 is configured to transmit the background video vB obtained by rendering the 3D background model 5 to the display device 2 (see FIGS. 12, 19, and 20).

In the terminal device 1, the 3D background model 5 is rendered according to the relative position, transmitted to the display device 2, and displayed. Then, the terminal device 1 captures an image. Thus, for example, a general television device, a monitor device, or the like capable of receiving a video is used as the display device 2, and the function of the terminal device 1 enables easy virtual production in an environment in which the display device 2 is present at home, a place outside home, or the like.

In the second embodiment, the video processing unit 85 (the background layer rendering unit 34 or the communication control unit 36) of the display device 2 is configured to render the 3D background model 5 on the basis of the relative position information RP received from the terminal device 1 and generate the background video vB (see FIGS. 13, 21, and 22).

In a case where the relative position detection is performed in the terminal device 1, a configuration in which the relative position information RP is received from the terminal device 1 enables the display device 2 to generate and display the background video vB by rendering the 3D background model. In this case, the virtual production can be implemented at home or the like by introducing the display device 2 including the video processing unit 85 that performs rendering. Since the terminal device 1 side is only required to have a function of detecting the relative position information RP and transmitting the relative position information RP to the display device 2, the processing load is small, and high processing capability is not required.

In the third, fourth, fifth, and sixth embodiments, the video processing unit 85 (background layer rendering unit 34) is provided in an external device that is separate from both the terminal device 1 and the display device 2. Then, the video processing unit 85 renders the 3D background model 5 on the basis of the received relative position information RP, generates a background video vB to be displayed on the display device 2, and transmits the background video vB (see FIGS. 14 to 17 and FIGS. 24 to 30).

For example, the background video vB is rendered in the external device communicable with one or both of the terminal device 1 and the display devices 2. Thus, it is possible to implement virtual production using the terminal device 1 and the display device 2 by using an external device rich in resources such as an arithmetic function and a storage capacity. It is possible to obtain an advantage that a processing load is small for the terminal device 1 and the display device 2.

Note that although the cloud server 4 has been described as the external device in the embodiment, the external device may be, for example, a home server in a home network, a dedicated personal computer, a workstation, a smartphone, a tablet, or a PC different from the terminal device 1, or a so-called home appliance such as a video device. Any device may be used as long as the device can function as the information processing device 70 including at least the video processing unit 85 of the present technology.

In the third, fourth, fifth, and sixth embodiments, the external device is the cloud server 4.

For example, the background video vB is rendered in the cloud server 4 communicable with the terminal device 1 or the display devices 2. Thus, it is possible to implement virtual production using the terminal device 1 and the display device 2 by using a processing function of the cloud server 4. It is possible to obtain an advantage that a processing load is small for the terminal device 1 and the display device 2. For example, by using the processing capability of the cloud server 4, it is also possible to render a high-definition background video vB using the 3D background model 5 having a large data size. Furthermore, by providing a service to the user as the cloud server 4, it is possible to widely provide a video production opportunity by virtual production.

In the third and fourth embodiments, the video processing unit 85 (the background layer rendering unit 34) of the external device renders the 3D background model 5 on the basis of the relative position information RP received from the terminal device 1 and generates a video to be displayed.

In a case where the relative position detection is performed in the terminal device 1, for example, the cloud server 4 is only required to be capable of receiving the relative position information RP from the terminal device 1. Thus, the external device other than the terminal device 1 and the display device 2 can perform the rendering based on the relative position information RP for each time point and generate the background video vB according to the viewpoint position of the terminal device 1 at each time point.

Note that although not described in the embodiment, for example, the relative position information RP detected on the display device 2 side may be transferred to the terminal device 1 and transmitted from the terminal device 1 to the cloud server 4. This is one of methods of transmitting the relative position information RP in an environment in which the terminal device 1 accesses the cloud server 4.

In the fifth and sixth embodiments, the video processing unit 85 (the background layer rendering unit 34 or the communication control unit 40) of the external device renders the 3D background model 5 on the basis of the relative position information RP received from the display device 2 and generates a video to be displayed.

For example, as in the fifth embodiment, in a case where the relative position detection is performed in the display device 2, for example, the cloud server 4 is only required to be capable of receiving the relative position information RP from the display device 2. Furthermore, as in the sixth embodiment, even in a case where the relative position detection is performed in the terminal device 1, the relative position information RP may be transferred to the display device 2 side and transmitted from the display device 2 to the cloud server 4. Thus, the external device other than the terminal device 1 and the display device 2 can perform the rendering based on the relative position information RP for each time point and generate the background video vB according to the viewpoint position of the terminal device 1 at each time point.

In the third embodiment, the video processing unit 85 (the background layer rendering unit 34 or the communication control unit 40) of the external device performs processing of transmitting the background video vB generated by rendering the 3D background model 5 to the terminal device 1.

The background video vB generated by the cloud server 4 is transmitted to the terminal device 1, and is transmitted from the terminal device 1 to the display device 2. Thus, the background video vB generated by the external device communicating with the terminal device 1 can be displayed on the display device 2 in real time.

Note that although not described in the embodiment, for example, a configuration is also conceivable in which the cloud server 4 transmits the background video vB rendered on the basis of the relative position information received from the display device 2 to the terminal device 1 and transmits the background video vB from the terminal device 1 to the display device 2.

In the fourth, fifth, and sixth embodiments, the video processing unit 85 (the background layer rendering unit 34 or the communication control unit 40) of the external device performs processing of transmitting the video generated by rendering the 3D background model 5 to the display device 2.

The background video vB generated by the cloud server 4 is transmitted to the display device 2. Thus, the background video vB generated by the external device communicating with the terminal device 1 can be displayed on the display device 2 in real time. Furthermore, by transmitting the background video vB to the display device 2 without passing through the terminal device 1, it is possible to reduce a necessary communication amount, and to promote reduction in addition of communication, improvement in communication speed, and improvement in communication efficiency.

In the seventh embodiment, the video processing unit 85 (the background layer rendering unit 34 or the overlay layer rendering unit 47) performs virtual video addition processing in which the additional virtual video 11 is included together with the background video vB obtained from the 3D background model 5 and the video of the object 10 in the captured video vC obtained by capturing the background video vB displayed on the display device 2 and the object 10 with the terminal device 1.

The additional virtual video 11 is added to the captured video vC in addition to the background video vB based on the 3D background model 5 and the video of the object 10. Thus, more various video representations using the additional virtual video 11 can be performed in simple virtual production.

The addition processing of the additional virtual video 11 can be performed in real time at the time of imaging, or may be performed after the imaging as post-production.

Note that the additional virtual video 11 indicates to any additional virtual video such as a specific video, a shape, a color, a luminance change, a pattern, or a character. That is, a video added by video processing or a video intentionally changed as the video effect excluding a video as the original background obtained from the 3D background model and the video of the object 10 as the real object in the videos appearing in the captured video vC corresponds to the additional virtual video 11. In the present disclosure, processing of including such an additional virtual video 11 is referred to as virtual video addition processing. However, general image quality adjustment such as luminance adjustment, color adjustment, gradation adjustment, white balance adjustment, gamma processing, or sharpness processing does not correspond to the virtual video addition processing in the present disclosure.

In the seventh embodiment, the video processing unit 85 (the background layer rendering unit 34 or the overlay layer rendering unit 47) performs virtual video addition processing in which the additional virtual video 11 is included in the captured video vC in processing for each frame of the video at the time of imaging by the terminal device 1.

That is, the additional virtual video 11 is added in real time at the time of imaging. Thus, it is simply possible to provide a video effect that is easy for the user to confirm.

In the seventh embodiment, an example has been described in which the video processing unit 85 (the background layer rendering unit 34 or the overlay layer rendering unit 47) starts the virtual video addition processing in response to a predetermined operation on the terminal device 1.

For example, at the time of imaging, an effect of the additional virtual video 11 is activated in response to the user's touch operation. Thus, it is possible to provide an imaging environment in which the video effect is activated at a timing desired by the user.

In the seventh embodiment, an example has been described in which the video processing unit 85 (the 3D model management unit 33) sets the virtual video addition processing on the basis of the image recognition processing for the captured video (see step ST16 in FIG. 36, step S152 in FIG. 38, and FIGS. 33, 34, and 35).

For example, parameters such as the type of additional virtual video 11 and the position in the video are determined according to the type of object, the position, the size in the captured video vC, and the like. The additional virtual video 11 can be added to an appropriate place in the video by recognition of a person's face or bone recognition as the object 10.

The virtual video addition processing of the seventh embodiment is processing of adding the additional virtual video 11 to the overlay layer 52 to be overlaid on the video of the object 10 in the captured video vC.

For example, similarly to the additional virtual video 11a in FIGS. 33 and 34, the additional virtual video 11 is included in the overlay layer 52. Thus, the virtual video can be added to the front region 61 of the real object 10.

Such virtual video addition processing can be implemented by the functions of the overlay layer rendering unit 47 and the image synthesis unit 48 in the video processing unit 85.

Furthermore, the virtual video addition processing of the seventh embodiment is processing of adding the additional virtual video to the background video vB generated by rendering the 3D background model 5.

For example, similarly to the additional virtual video 11b in FIGS. 34 and 35, the additional virtual video 11 is included in the background video vB. Thus, the virtual video can be added to a region (the other regions 63 and 64 or the rear region 62) which is the rear side of the object 10.

Such virtual video addition processing can be implemented by rendering of the background layer rendering unit 34. In particular, by adding the additional virtual video 11 to the background video vB, a reflection of the additional virtual video 11 also occurs in the real object 10. Therefore, it is possible to easily implement more realistic video representation in which the virtual additional virtual video 11 is reflected in the real object 10. This also means that difficult work such as adding reflection as post-production is not required.

Such virtual video addition processing can be implemented by the function of the background layer rendering unit 34 in the video processing unit 85.

In the seventh embodiment, the video processing unit 85 (the region detection unit 44, the background layer rendering unit 34, or the overlay layer rendering unit 47) determines a region around the object in the captured video vC, and performs the virtual video addition processing on the basis of the determination.

By determining the front region 61, the rear region 62, and the other regions 63 and 64 as the peripheral regions of the object 10 for each frame, it is possible to add the additional virtual video 11 in consideration of the positional relationship with the object 10.

In the seventh embodiment, an example has been described in which the virtual video addition processing such as an effect is started in response to a touch operation on the screen of the terminal device 1.

For example, at the time of imaging, the user touches an arbitrary position on the screen to activate the effect. Thus, it is possible to provide, to the user, an imaging environment in which the video effect is activated at an arbitrary position on the screen and at an arbitrary timing.

In the first to seventh embodiments, the captured video vC obtained by the terminal device 1 capturing the background video vB displayed on the display device 2 and the image of the object 10 are displayed and output on the screen 2a of the terminal device 1.

The captured video vC obtained by capturing the background video vB and the image of the object 10 using the terminal device 1 such as a smartphone are displayed on the terminal device 1, so that the user can perform imaging while visually recognizing the captured video vC. That is, simple virtual production using the terminal device 1 can be realized.

Furthermore, in a case where the additional virtual video 11 is added to the captured video vC in real time, the additional virtual video 11 can also be confirmed while being captured by the terminal device 1.

In the above-described embodiment, a smartphone is mainly assumed as the terminal device 1, but any device having an imaging function can be used as the terminal device 1.

For example, a camera such as a single-lens camera or a compact digital camera can be implemented as the information processing device 70 of the present disclosure with the functions described in the embodiment. In particular, it is possible to capture a higher-quality virtual production video by performing high-resolution processing or using a camera with high lens accuracy.

Furthermore, the function of the present disclosure may be implemented in a device such as glasses with a camera or augmented reality (AR) glasses. In this case, it is easy to capture the video of the camerawork with a first-person viewpoint.

Furthermore, this function may be implemented in a watch device with a camera. Thus, the imaging can be performed without holding the device in the hand.

Various display devices can also be used as the display device 2. For example, in addition to the television receiver, a projector, a large tablet, a smartphone, or the like may be used as the display device.

Figure 39:
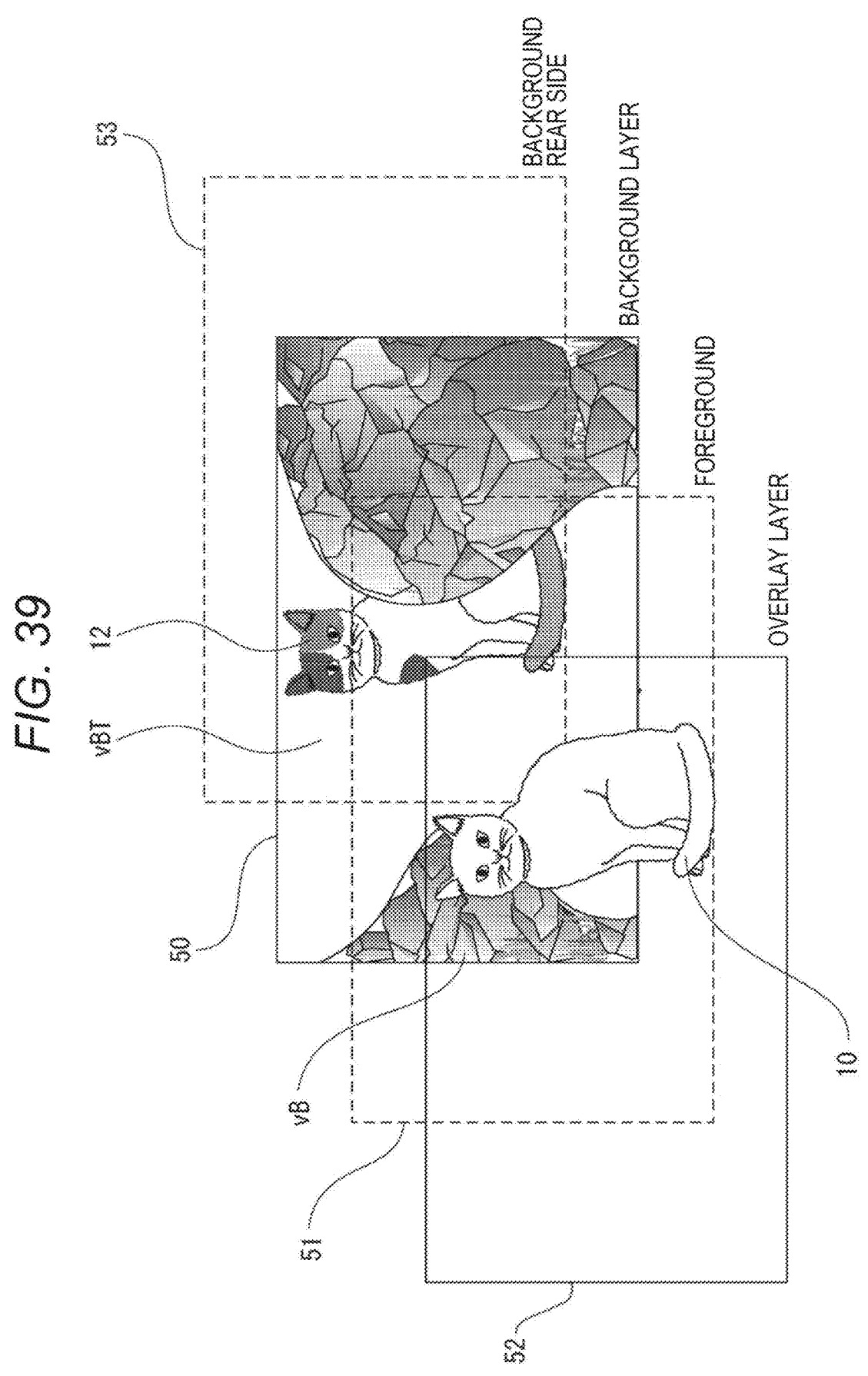
FIG. 39 is an explanatory diagram according to another embodiment.

Furthermore, it is also conceivable to use a transmissive display as the display device 2 and place an object 12 behind the background layer 50 as illustrated in FIG. 39. In the example of FIG. 39, the background video vB displayed as the background layer 50 is a partially transparent video vBT. Furthermore, since the display device 2 that displays the background video vB is a transmissive panel, the rear portion of the transparent video vBT can be seen through. In this case, the object 12 is also disposed behind.

Thus, the captured video vC can further include the object 12 behind the background in addition to the object 10 and the background video vB.

By the way, due to the difference in lighting between the background video vB and the actual imaging site, there is possibility that the video of the object 10 as the foreground may not conform to the background. As a measure against such a case, it is conceivable to perform the following adjustment.

First, the terminal device 1 for imaging performs imaging while turning around, and performs light source estimation. Then, the brightness of the background video vB is changed in accordance with the ambient light at the imaging site. By changing the overall brightness after the imaging, the brightness is roughly adjusted to the intended brightness. In this manner, the video content to be produced can be set to an intended brightness state in accordance with the lighting state of the imaging site.

Furthermore, in the imaging according to the embodiment, there may be a case where the region of the screen 2a of the display device 2 is small and an imaging range is limited.

Therefore, it is conceivable that the display device 2 is moved to the front side of the terminal device 1 by a drone, a cart, or the like so that the range (angle of view) to be imaged does not protrude from the screen 2a of the display device 2.

Furthermore, in a case where the imaging range is likely to come out of the screen 2a of the display device 2 at the time of imaging, the terminal device 1 may notify the user by vibration, alert display on the screen 2a, or the like.

Moreover, when the captured video vC protrudes outside the background video vB, the protruding region can be made invisible on the video by drawing the background on the overlay layer 52.

Furthermore, ambient light may be reflected on the screen 2a of the display device 2.

In this case, when the screen 2a of the display device 2 is rotated so that the lighting is not reflected, the direction with respect to the terminal device 1 is changed, but it is possible to cope with this by distorting the background video vB displayed on the display device 2 in accordance with the rotation of the screen 2a.

In a case where a device that can be held by a user with one hand, such as a smartphone, is used as the terminal device 1 of the embodiment, a light source can be held with the other hand or an arbitrary operation can be performed. Therefore, for example, the terminal device 1 is also suitable for a case where one individual person performs imaging.

Furthermore, when information other than the captured video vC is presented to the terminal device 1 such as a smartphone, it may be felt to be interrupting, but in such a case, the information can be presented in cooperation with another device such as a watch device or a tablet.

Furthermore, it is also conceivable to perform resolution conversion processing at the time of displaying the captured video vC on the basis of the specification information of the device used as the terminal device 1 to reduce the resolution for display.

Furthermore, audio guide information can be output by an audio output device such as earphones. For example, there is an example in which information regarding a remaining imaging time, a take number, and the like is output by voice.

In the embodiment, the capturing of the moving image is mainly assumed, but the technology of the present disclosure is also applicable to the capturing of the still image. In particular, the display of the background video vB and the display of the captured video vC can be applied to the operation at the time of the display of the background video vB on the display device 2 and the display of the through image on the terminal device 1 during standby of the shutter operation in a still image capturing mode.

The program of the embodiment is, for example, a program for causing a processor such as a CPU or a DSP, or a device including the processor to execute the processing of the video processing unit 85 described above.

That is, the program of the embodiment is a program that can be applied in a case where the object and the video displayed on the display device are captured by the terminal device in a state in which the display device 2 and the terminal device 1 having an imaging function are associated with each other, and causes the information processing device 70 to execute the video processing of generating a video (background video vB) obtained by rendering the 3D model on the basis of the relative position information RP between the display device 2 and the terminal device 1 and displayed on the display device 2.

With such a program, the information processing device 70 as the terminal device 1, the display device 2, or the cloud server 4 described above can be implemented by various computer devices.

Such a program can be recorded in advance in an HDD as a recording medium built in a device such as a computer device, a ROM in a microcomputer having a CPU, or the like. Furthermore, such a program can be temporarily or permanently stored (recorded) in a removable recording medium such as a flexible disk, a compact disc read only memory (CD-ROM), a magneto optical (MO) disk, a digital versatile disc (DVD), a Blu-ray Disc®, a magnetic disk, a semiconductor memory, or a memory card. Such a removable recording medium can be provided as so-called package software.

Furthermore, such a program can be installed from the removable recording medium into a personal computer or the like, or can be downloaded from a download site via a network such as a local area network (LAN) or the Internet.

Furthermore, such a program is suitable for providing the information processing device 70 of the embodiment in a wide range. For example, by downloading the program to a personal computer, a communication device, a portable terminal device such as a smartphone or a tablet, a mobile phone, a game device, a video device, a personal digital assistant (PDA), or the like, these devices can be caused to function as the information processing device 70 of the present disclosure.

Note that the information processing device of the present disclosure includes the video processing unit, and in the embodiment, as a specific example, the information processing device 70 includes the video processing unit 85 as illustrated in FIG. 8. In the configuration of FIG. 8, the processing of the video processing unit in the present disclosure may be processing performed by the video processing unit 85, or may be processing performed by the video processing unit 85 and the CPU 71 in cooperation with each other. Furthermore, the processing may be performed by the CPU 71.

Note that the effects described in the present specification are merely examples and are not limited, and other effects may be provided.

Note that the present technology can also have the following configurations.

(1)
An information processing device including
a video processing unit configured to render a 3D model on the basis of relative position information between a display device and a terminal device to generate a video to be displayed on the display device in a case where the terminal device captures an image of an object and the video displayed on the display device in a state in which the display device and the terminal device having an imaging function are associated with each other.

(2)
The information processing device according to (1), in which
the video processing unit is provided in the terminal device, and
the video obtained by rendering the 3D model with the video processing unit is transmitted to the display device.

(3)
The information processing device according to (1), in which
the video processing unit is provided in the display device, and
the video processing unit renders the 3D model on the basis of the relative position information received from the terminal device to generate a video to be displayed.

(4)
The information processing device according to (1), in which
the video processing unit is provided in an external device that is separate from both the terminal device and the display device, and
the video processing unit renders the 3D model on the basis of the received relative position information to generate a video to be displayed on the display device, and transmits the generated video.

(5)
The information processing device according to (4), in which
the external device is a cloud server.

(6)
The information processing device according to (4) or (5), in which
the video processing unit renders the 3D model on the basis of the relative position information received from the terminal device to generate a video to be displayed.

(7)
The information processing device according to (4) or (5), in which
the video processing unit renders the 3D model on the basis of the relative position information received from the display device to generate a video to be displayed.

(8)
The information processing device according to any one of (4) to (7), in which
the video processing unit performs processing of transmitting the video generated by rendering the 3D model to the terminal device.

(9)
The information processing device according to any one of (4) to (7), in which
the video processing unit performs processing of transmitting the video generated by rendering the 3D model to the display device.

(10)
The information processing device according to any one of (1) to (9), in which
the video processing unit
performs virtual video addition processing in which an additional virtual video is included together with the video obtained from the 3D model and a video of the object in a captured video obtained by capturing the video displayed on the display device and the image of the object with the terminal device.

(11)
The information processing device according to (10), in which
the video processing unit
performs the virtual video addition processing in which the additional virtual video is included in the captured video in processing on each frame of the video at a time of being captured by the terminal device.

(12)
The information processing device according to (10) or (11), in which
the video processing unit
starts the virtual video addition processing in response to a predetermined operation on the terminal device.

(13)
The information processing device according to any one of (10) to (12), in which
the video processing unit
sets the virtual video addition processing on the basis of image recognition processing on the captured video.

(14)
The information processing device according to any one of (10) to (13), in which
the virtual video addition processing is processing of adding the additional virtual video to a layer to be overlaid on the video of the object in the captured video.

(15)

The information processing device according to any one of (10) to (14), in which the virtual video addition processing is processing of adding the additional virtual video to the video displayed on the display device, which is generated by rendering the 3D model.

(16)

The information processing device according to any one of (10) to (15), in which the video processing unit determines an object peripheral region in the captured video, and performs the virtual video addition processing on the basis of the determination.

(17)

The information processing device according to any one of (10) to (16), in which the video displayed on the display device and the captured video obtained by the terminal device that images the object are displayed and output on a display unit of the terminal device, the display unit includes a screen as an input unit, and the terminal device starts the virtual video addition processing in response to a touch operation on the input unit.

(18)

The information processing device according to any one of (1) to (16), in which the video displayed on the display device and the captured video obtained by the terminal device that images the object are displayed and output on the terminal device.

(19)

A video processing method including by an information processing device, performing video processing of rendering a 3D model on the basis of relative position information between a display device and a terminal device to generate a video to be displayed on the display device in a case where the terminal device captures an image of an object and the video displayed on the display device in a state in which the display device and the terminal device having an imaging function are associated with each other.

(20)

A program causing an information processing device to execute video processing of rendering a 3D model on the basis of relative position information between a display device and a terminal device to generate a video to be displayed on the display device in a case where the terminal device captures an image of an object and the video displayed on the display device in a state in which the display device and the terminal device having an imaging function are associated with each other.

REFERENCE SIGNS LIST

1 Terminal device
2 Display device
3 AR marker
4 Cloud server
5 3D background model
10, 12 Object
11, 11a, 11b Additional virtual video
16 Invalid region frame
31 Display size detection unit
32 Relative position detection unit
33 3D model management unit
34 Background layer rendering unit
35, 36 Communication control unit
37 Display control unit
38 Imaging unit
39 Display control unit
40 Communication control unit
44 Region detection unit
45 Input operation reception unit
46 Image recognition processing unit
47 Overlay layer rendering unit
48 Image synthesis unit
49 Filter processing unit
70 Information processing device
71 CPU
85 Video processing unit
vB Background video
vC Captured video
5 RP Relative position information

The invention claimed is:

1. An information processing device comprising:
circuitry configured to
   render a 3D model based on relative position information between a display device and a terminal device to generate a video to be displayed on the display device in a case where the terminal device captures an image of an object and the video displayed on the display device in a state in which the display device and the terminal device having an imaging function are associated with each other, and
   communicate with the display device regarding the video obtained by rendering the 3D model.

2. The information processing device according to claim 1,
   wherein the circuitry is provided in the terminal device, and
   wherein the circuitry communicates by transmitting the video obtained by rendering the 3D model to the display device.

3. The information processing device according to claim 1,
   wherein the circuitry is provided in the display device, and
   wherein the circuitry renders the 3D model based on the relative position information received from the terminal device to generate a video to be displayed.

4. The information processing device according to claim 1,
   wherein the circuitry is provided in an external device that is separate from both the terminal device and the display device,
   wherein the circuitry renders the 3D model based on the received relative position information to generate a video to be displayed on the display device, and
   wherein the circuitry transmits the generated video to the display device.

5. The information processing device according to claim 4,
   wherein the external device is a cloud server.

6. The information processing device according to claim 4,
   wherein the circuitry renders the 3D model based on the relative position information received from the terminal device to generate the video to be displayed.

7. The information processing device according to claim 4, wherein the circuitry renders the 3D model based on the relative position information received from the display device to generate the video to be displayed.

8. The information processing device according to claim 4, wherein the circuitry performs processing of transmitting the video generated by rendering the 3D model to the terminal device.

9. The information processing device according to claim 4, wherein the circuitry performs processing of transmitting the video generated by rendering the 3D model to the display device.

10. The information processing device according to claim 1, wherein the circuitry performs virtual video addition processing in which an additional virtual video is included together with the video obtained from the 3D model and a video of the object in a captured video obtained by capturing the video displayed on the display device and the image of the object with the terminal device.

11. The information processing device according to claim 10, wherein the circuitry performs the virtual video addition processing in which the additional virtual video is included in the captured video in processing on each frame of the video at a time of being captured by the terminal device.

12. The information processing device according to claim 10, wherein the circuitry starts the virtual video addition processing in response to a predetermined operation on the terminal device.

13. The information processing device according to claim 10, wherein the circuitry sets the virtual video addition processing based on image recognition processing on the captured video.

14. The information processing device according to claim 10, wherein the virtual video addition processing is processing of adding the additional virtual video to a layer to be overlaid on the video of the object in the captured video.

15. The information processing device according to claim 10, wherein the virtual video addition processing is processing of adding the additional virtual video to the video displayed on the display device, which is generated by rendering the 3D model.

16. The information processing device according to claim 10, wherein the circuitry is further configured to determine an object peripheral region in the captured video, and wherein the circuitry performs the virtual video addition processing based on the determined objected peripheral region.

17. The information processing device according to claim 10, wherein the video displayed on the display device and the captured video obtained by the terminal device that images the object are displayed and output on a display of the terminal device, wherein the display includes a screen configured to detect an input, and wherein the terminal device starts the virtual video addition processing in response to a touch operation on the input.

18. The information processing device according to claim 1, wherein the video displayed on the display device and the captured video obtained by the terminal device that images the object are displayed and output on the terminal device.

19. A video processing method, executed by at least one processor of an information processing device, the method comprising:

performing video processing of rendering a 3D model based on relative position information between a display device and a terminal device to generate a video to be displayed on the display device in a case where the terminal device captures an image of an object and the video displayed on the display device in a state in which the display device and the terminal device having an imaging function are associated with each other; and communicating with the display device regarding the video obtained by rendering the 3D model.

20. A non-transitory computer-readable storage medium having embodied thereon a program, which when executed by an information processing device of a computer causes the computer to execute a method, the method comprising:

performing video processing of rendering a 3D model based on relative position information between a display device and a terminal device to generate a video to be displayed on the display device in a case where the terminal device captures an image of an object and the video displayed on the display device in a state in which the display device and the terminal device having an imaging function are associated with each other; and communicating with the display device regarding the video obtained by rendering the 3D model.

\* \* \* \* \*